United States Patent
Hirakata

(10) Patent No.: US 10,181,295 B2
(45) Date of Patent: Jan. 15, 2019

(54) SEMICONDUCTOR DEVICE AND DISPLAY PANEL COMPRISING PIXEL HAVING PLURALITY OF DISPLAY ELEMENTS

(71) Applicant: Semiconductor Energy Laboratory Co., Ltd., Atsugi-shi, Kanagawa-ken (JP)

(72) Inventor: Yoshiharu Hirakata, Tochigi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 83 days.

(21) Appl. No.: 15/297,309

(22) Filed: Oct. 19, 2016

(65) Prior Publication Data

US 2017/0116929 A1 Apr. 27, 2017

(30) Foreign Application Priority Data

Oct. 23, 2015 (JP) .................. 2015-208559

(51) Int. Cl.
*G09G 3/34* (2006.01)
*G09G 3/20* (2006.01)
(Continued)

(52) U.S. Cl.
CPC ..... *G09G 3/3406* (2013.01); *G02F 1/133553* (2013.01); *G06F 3/042* (2013.01);
(Continued)

(58) Field of Classification Search
None
See application file for complete search history.

(56) References Cited

U.S. PATENT DOCUMENTS 6,556,260 B1 4/2003 Itou et al.
6,714,268 B2 3/2004 Wang et al.
(Continued)

FOREIGN PATENT DOCUMENTS

CN 001403856 A 3/2003
CN 001714380 A 12/2005
(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.
(Continued)

*Primary Examiner* — Ryan A Lubit
(74) *Attorney, Agent, or Firm* — Fish & Richardson P.C.

(57) ABSTRACT

A display panel includes a first display element, a first conductive film electrically connected to the first display element, a second conductive film including a region overlapping with the first conductive film, an insulating film including a region sandwiched between the second conductive film and the first conductive film, a pixel circuit electrically connected to the second conductive film, a second display element electrically connected to the pixel circuit, and a third display element electrically connected to the pixel circuit. In the structure, the insulating film has an opening, and the second conductive film is electrically connected to the first conductive film through the opening.

26 Claims, 28 Drawing Sheets

(51) Int. Cl.

| | | |
|---|---|---|
| *G09G 3/3208* | (2016.01) | |
| *G09G 3/3233* | (2016.01) | |
| *G09G 3/36* | (2006.01) | |
| *G06F 3/042* | (2006.01) | |
| *G06F 3/044* | (2006.01) | |
| *G02F 1/1335* | (2006.01) | |
| *G02F 1/133* | (2006.01) | |
| *G02F 1/1333* | (2006.01) | |
| *G02F 1/1337* | (2006.01) | |
| *G02F 1/137* | (2006.01) | |

(52) U.S. Cl.
CPC ............ *G06F 3/044* (2013.01); *G09G 3/2003* (2013.01); *G09G 3/3208* (2013.01); *G09G 3/3233* (2013.01); *G09G 3/36* (2013.01); *G09G 3/3648* (2013.01); *G02F 1/137* (2013.01); *G02F 1/1337* (2013.01); *G02F 1/13306* (2013.01); *G02F 1/13338* (2013.01); *G02F 1/133345* (2013.01); *G02F 1/133512* (2013.01); *G02F 1/133514* (2013.01); *G02F 2201/44* (2013.01); *G09G 2300/046* (2013.01)

(56) References Cited

U.S. PATENT DOCUMENTS

| | | |
|---|---|---|
| 6,912,021 B2 | 6/2005 | Kimura |
| 7,038,641 B2 | 5/2006 | Hirota et al. |
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,304,696 B2 | 12/2007 | Yamagishi |
| 7,385,654 B2 | 6/2008 | Mitsui et al. |
| 8,159,449 B2 | 4/2012 | Kimura et al. |
| 8,830,424 B2 | 9/2014 | Hirakata et al. |
| 9,189,997 B2 | 11/2015 | Kimura et al. |
| 9,349,325 B2 | 5/2016 | Yamazaki et al. |
| 2003/0052869 A1 | 3/2003 | Fujii et al. |
| 2003/0102801 A1 | 6/2003 | Senbonmatsu |
| 2003/0201960 A1 | 10/2003 | Fujieda |
| 2006/0072047 A1 | 4/2006 | Sekiguchi |
| 2007/0058099 A1* | 3/2007 | Eguchi ............... G02F 1/136227 349/43 |
| 2007/0064178 A1* | 3/2007 | Murai ............... G02F 1/133784 349/108 |
| 2008/0136990 A1* | 6/2008 | Kimura ............... H01L 27/1218 349/46 |
| 2008/0180618 A1 | 7/2008 | Fujieda |
| 2010/0171905 A1 | 7/2010 | Huang et al. |
| 2011/0013127 A1* | 1/2011 | Takahashi ......... G02F 1/133504 349/112 |
| 2011/0242021 A1 | 10/2011 | Jun et al. |
| 2012/0176570 A1 | 7/2012 | Yamazaki et al. |
| 2015/0279918 A1 | 10/2015 | Teraguchi et al. |
| 2016/0042702 A1 | 2/2016 | Hirakata et al. |
| 2016/0202814 A1* | 7/2016 | Lee .................. G06F 3/044 345/173 |
| 2016/0320666 A1* | 11/2016 | Kim .................. G02F 1/133553 |
| 2017/0075166 A1* | 3/2017 | Son .................. G02F 1/133512 |

FOREIGN PATENT DOCUMENTS

| | | |
|---|---|---|
| CN | 102214032 A | 10/2011 |
| JP | 2001-066593 A | 3/2001 |
| JP | 2002-140022 A | 5/2002 |
| JP | 2002-196702 A | 7/2002 |
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-279983 A | 10/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 4161574 B2 | 10/2008 |
| JP | 2010-066537 A | 3/2010 |
| JP | 2011-191750 A | 9/2011 |
| JP | 2011-221477 A | 11/2011 |
| JP | 2012-155320 A | 8/2012 |
| JP | 2013-221965 A | 10/2013 |
| KR | 2003-0022049 A | 3/2003 |
| KR | 10-1073147 | 10/2011 |
| KR | 2012-0081943 A | 7/2012 |
| TW | 588185 | 5/2004 |
| TW | 201027174 | 7/2010 |
| TW | 201135556 | 10/2011 |
| WO | WO-2004/053819 | 6/2004 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

International Search Report (Application No. PCT/IB2016/056043) dated Dec. 27, 2016.

Written Opinion (Application No. PCT/IB2016/056043) dated Dec. 27, 2016.

* cited by examiner

FIG. 6A
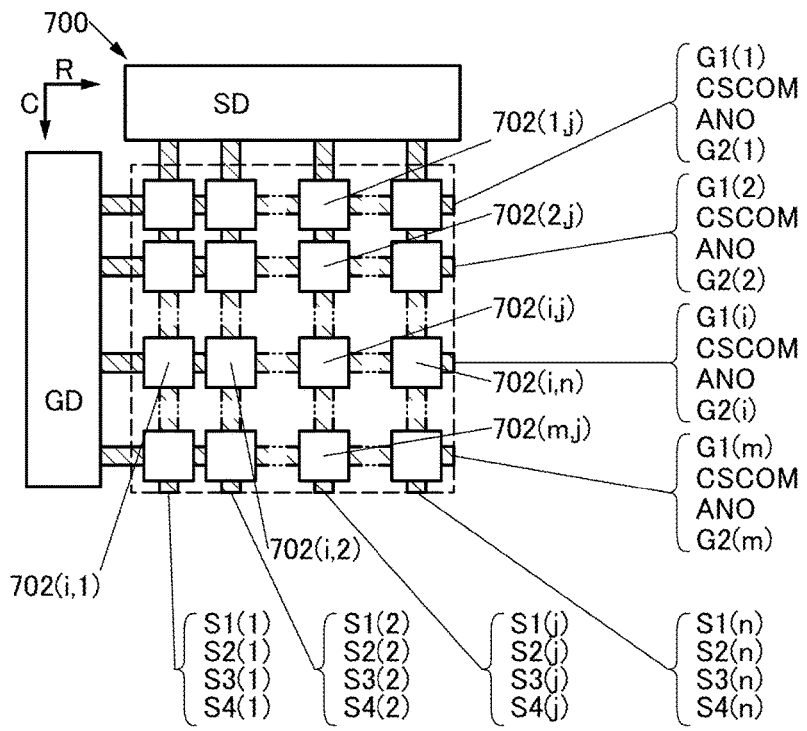
FIG. 6B1
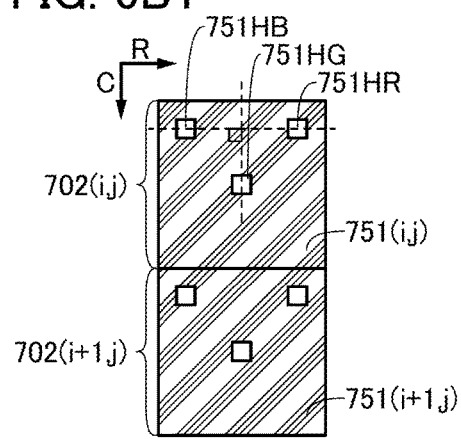
FIG. 6B2
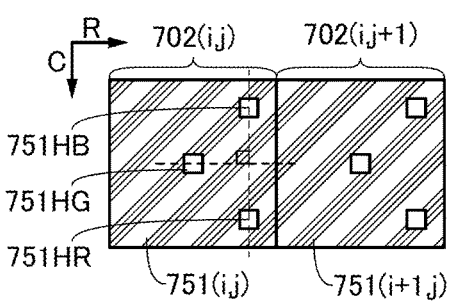
FIG. 6C
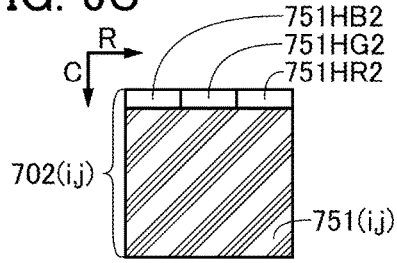

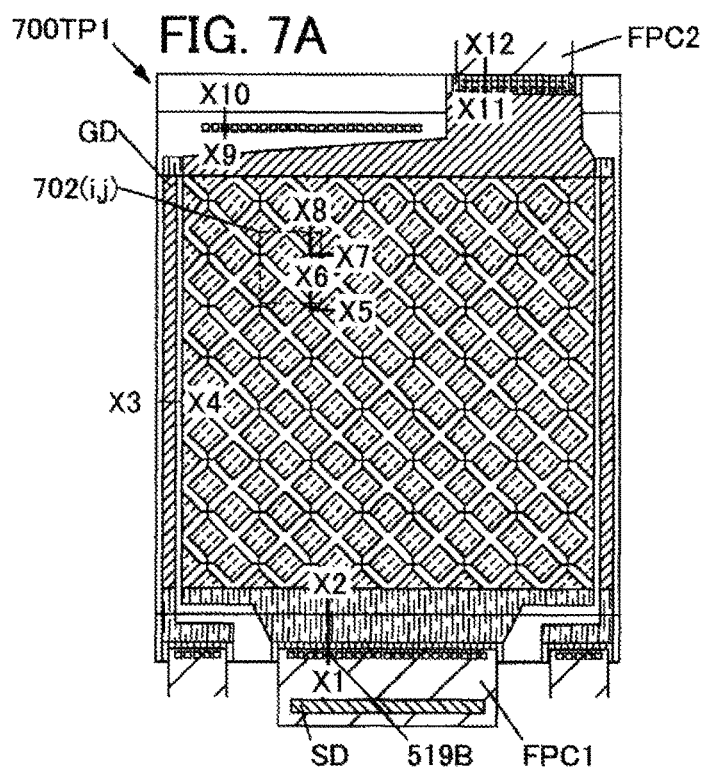
FIG. 7A
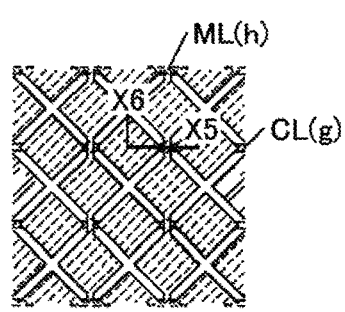
FIG. 7B1
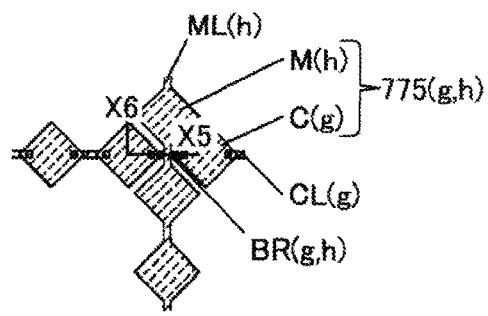
FIG. 7B2

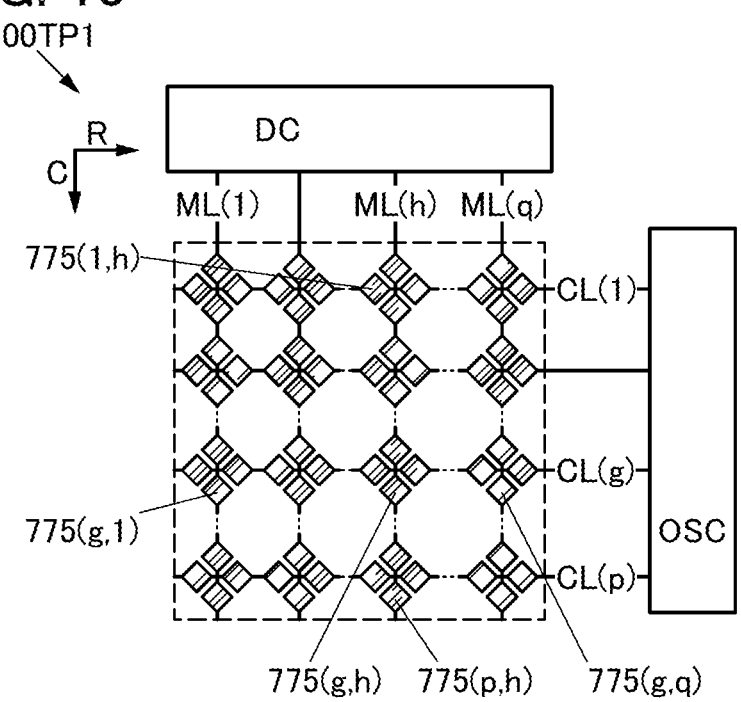

FIG. 11A
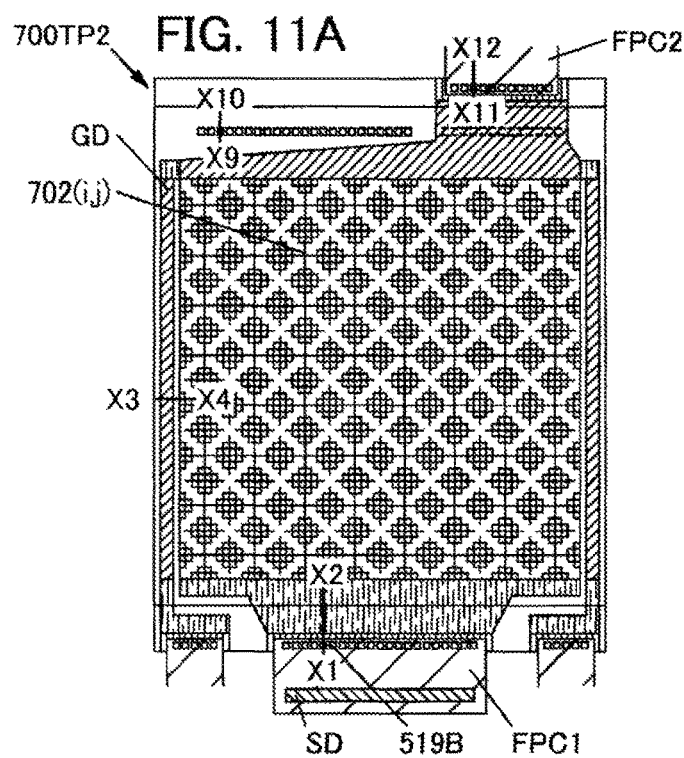
FIG. 11B1
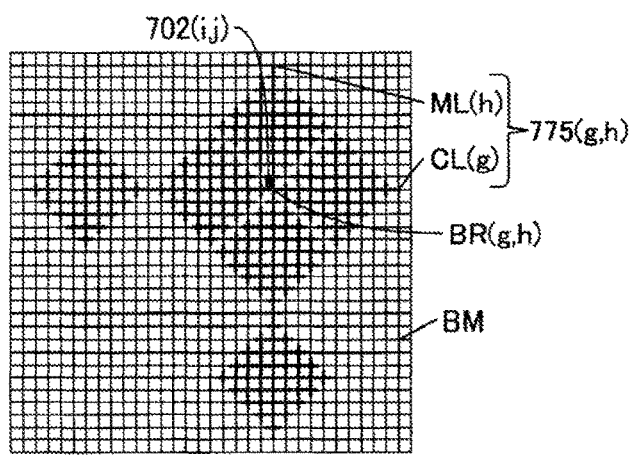
FIG. 11B2
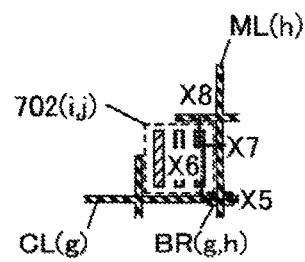

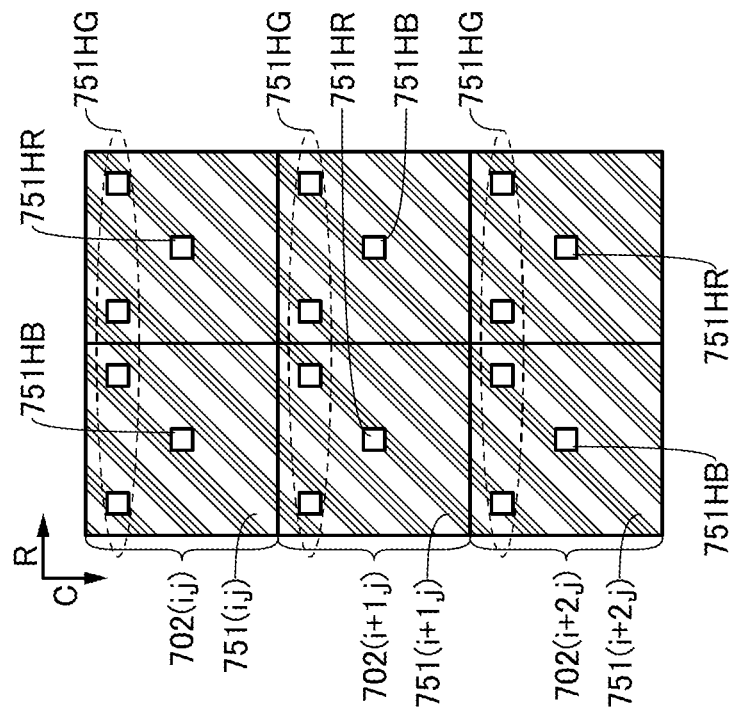

SEMICONDUCTOR DEVICE AND DISPLAY PANEL COMPRISING PIXEL HAVING PLURALITY OF DISPLAY ELEMENTS

TECHNICAL FIELD

One embodiment of the present invention relates to a display panel, an input/output device, a data processing device, or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

A liquid crystal display device in which a light-condensing means and a pixel electrode are provided on the same surface side of a substrate and a region transmitting visible light in the pixel electrode is provided to overlap with an optical axis of the light-condensing means, and a liquid crystal display device which includes an anisotropic light-condensing means having a condensing direction X and a non-condensing direction Y that is along a longitudinal direction of a region transmitting visible light in the pixel electrode are known (Patent Document 1).

REFERENCE

Patent Document

[Patent Document 1] Japanese Published Patent Application No. 2011-191750

DISCLOSURE OF INVENTION

An object of one embodiment of the present invention is to provide a novel display panel that is highly convenient or reliable. Another object is to provide a novel input/output device that is highly convenient or reliable. Another object of one embodiment of the present invention is to provide a method for manufacturing a novel display panel that is highly convenient or reliable. Another object is to provide a novel display panel, a novel input/output device, a method for manufacturing a novel display panel, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) An embodiment of the present invention is a display panel including a signal line and a pixel.

The pixel is electrically connected to the signal line. The pixel includes a pixel circuit, a second conductive film, a first conductive film, an insulating film, a first display element, a second display element, and a third display element, The pixel circuit is electrically connected to the signal line.

The second conductive film is electrically connected to the pixel circuit.

The first conductive film includes a region overlapping with the second conductive film.

The insulating film includes a region sandwiched between the second conductive film and the first conductive film. The insulating film has an opening in a region sandwiched between the first conductive film and the second conductive film, The second conductive film is electrically connected to the first conductive film through the opening.

The first display element is electrically connected to the first conductive film.

The second display element is electrically connected to the pixel circuit, and the third display element is electrically connected to the pixel circuit.

The first display element includes a reflective film and is configured to control the intensity of reflected light.

The second display element is configured to emit light toward the insulating film, and the third display element is configured to emit light toward the insulating film.

The reflective film has a shape including a region that does not block light emitted from the second display element or light emitted from the third display element.

The display panel of one embodiment of the present invention includes a first display element, a first conductive film electrically connected to the first display element, a second conductive film including a region overlapping with the first conductive film, an insulating film including a region sandwiched between the second conductive film and the first conductive film, a pixel circuit electrically connected to the second conductive film, a second display element electrically connected to the pixel circuit, and a third display element electrically connected to the pixel circuit. The insulating film has an opening. The second conductive film is electrically connected to the first conductive film through the opening.

(2) An embodiment of the present invention is the above-described display device in which the reflective film includes a single opening or a plurality of openings, the second display element is configured to emit light toward the single opening or the plurality of openings, and the third display element is configured to emit light toward the single opening or the plurality of openings.

Thus, for example, the first display element and the second and third display elements that perform display using a method different from that of the first display element can be driven using the pixel circuit that can be formed in the same process. Furthermore, using the insulating film, impurity diffusion between the first display element and the second display element or between the first display element and the third display element can be suppressed. Thus, a novel display panel that is highly convenient or reliable can be provided.

(3) An embodiment of the present invention is the above-described display device in which the second display element is provided so that display using the second display element can be seen from part of a region from which display using the first display element can be seen, and the third display element is provided so that display using the third display element can be seen from part of the region from which display using the first display element can be seen.

Thus, the display using the second display element and the display using the third display element can be seen from part of the region from which the display using the first display element can be seen. Alternatively, a user can see the display without changing the attitude or the like of the display panel. Thus, a novel display panel that is highly convenient or reliable can be provided.

(4) An embodiment of the present invention is the above-described display device in which the third display element is configured to display a color different from a color displayed by the second display element.

(5) An embodiment of the present invention is a display panel in which the pixel includes a fourth display element.

The fourth display element is electrically connected to the pixel circuit. The fourth display element is configured to emit light toward the insulating film.

The fourth display element is configured to display a color different from the color displayed by the second display element, and the fourth display element is configured to display a color different from the color displayed by the third display element.

The second display element is configured to display blue, green, or red.

The third display element is configured to display blue, green, or red.

The fourth display element is configured to display blue, green, or red.

The display panel of one embodiment of the present invention includes a pixel and a signal line electrically connected to the pixel. The pixel includes a first display element provided with a reflective film having openings, second and third display elements that emit light toward the openings, and a pixel circuit electrically connected to the first to third display elements.

Accordingly, display using the first display element or multicolor or full-color display using the second display element or the third display element can be performed. Thus, a novel display panel that is highly convenient or reliable can be provided.

(6) An embodiment of the present invention is the above-described display panel in which the reflective film includes a first opening and a second opening.

The first opening transmits light emitted from the second display element. The second opening transmits light emitted from the third display element.

The second opening is provided neither on a line that extends in a row direction through the first opening nor on a line that extends in a column direction through the first opening.

(7) An embodiment of the present invention is the above-described display panel in which the reflective film includes a first opening, a second opening, and a third opening.

The first opening transmits light emitted from the second display element.

The second opening transmits light emitted from the third display element.

The third opening transmits light emitted from the fourth display element.

The third opening is provided on a line that extends in a row direction or a column direction through the first opening, and the second opening is provided on a line that is perpendicular to the line between the first opening and the third opening.

Thus, the third display element that displays a color different from that displayed by the second display element can be provided easily near the second display element. Thus, a novel display panel that is highly convenient or reliable can be provided.

(8) An embodiment of the present invention is the above-described display panel which includes a group of pixels, another group of pixels, and a scan line.

The group of pixels include the pixel and are provided in a row direction.

The another group of pixels include the pixel and are provided in a column direction that intersects the row direction.

The scan line is electrically connected to the group of pixels provided in the row direction, and the another group of pixels provided in the column direction are electrically connected to the signal line.

(9) An embodiment of the present invention is an input/output device including the above-described display panel and an input portion.

The input portion includes a region overlapping with the display panel. The input portion is configured to detect an object that comes in the vicinity of the region overlapping with the display panel.

The input portion includes a control line, a signal line, and a sensing element.

The control line extends in a row direction, and the signal line extends in a column direction that intersects the row direction.

The sensing element has a light-transmitting property. The sensing element includes a first electrode electrically connected to the control line and a second electrode electrically connected to the signal line.

The second electrode is provided so that an electric field part of which is blocked by the object that comes in the vicinity of the region overlapping with the display panel is generated between the second electrode and the first electrode.

One embodiment of the present invention includes a sensing element that has a light-transmitting property in a region overlapping with a pixel. Thus, an object that comes in the vicinity of a region overlapping with a display panel can be detected. As a result, a novel input/output device that is highly convenient or reliable can be provided.

(10) An embodiment of the present invention is a data processing device which includes at least one of a keyboard, a hardware button, a pointing device, a touch sensor, an illuminance sensor, an imaging device, an audio input device, a viewpoint input device, and an attitude determination device, and the above-described display panel.

Thus, power consumption can be reduced and excellent visibility can be ensured even in a bright place. As a result, a novel data processing device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where a current, a voltage, or a potential can be supplied or transmitted. Accordingly, connection means not only direct connection but also indirect connection through a circuit element such as a wiring, a resistor, a diode, or a transistor so that a current, a potential, or a voltage can be supplied or transmitted.

In this specification, even when different components are connected to each other in a circuit diagram, there is actually a case where one conductive film has functions of a plurality of components such as a case where part of a wiring serves as an electrode. The term "connection" in this specification also means such a case where one conductive film has functions of a plurality of components.

Further, in this specification, one of a first electrode and a second electrode of a transistor refers to a source electrode and the other refers to a drain electrode.

According to one embodiment of the present invention, a novel display panel that is highly convenient or reliable can be provided. Furthermore, a novel input/output device that is highly convenient or reliable can be provided. Furthermore, a method for manufacturing a novel display panel that is highly convenient or reliable can be provided. Furthermore, a novel display panel, a novel input/output device, a method for manufacturing a novel display panel, or a novel semiconductor device can be provided.

Note that the descriptions of these effects do not disturb the existence of other effects. One embodiment of the present invention does not necessarily have all the effects listed above. Other effects will be apparent from and can be derived from the description of the specification, the drawings, the claims, and the like.

BRIEF DESCRIPTION OF DRAWINGS

In the accompanying drawings:
FIGS. 6A, 6B1, 6B2, and 6C are block diagrams illustrating structures of a display panel of an embodiment;
FIGS. 7A, 7B1, and 7B2 illustrate a structure of an input/output device of an embodiment;
FIG. 10 illustrates a structure of sensing elements in an input/output device of an embodiment;
FIGS. 11A, 11B1, and 11B2 illustrate a structure of an input/output device of an embodiment;
FIG. 28 is a schematic view illustrating a structure of a reflective film of a display panel of an embodiment.

BEST MODE FOR CARRYING OUT THE INVENTION

Figure 1A:
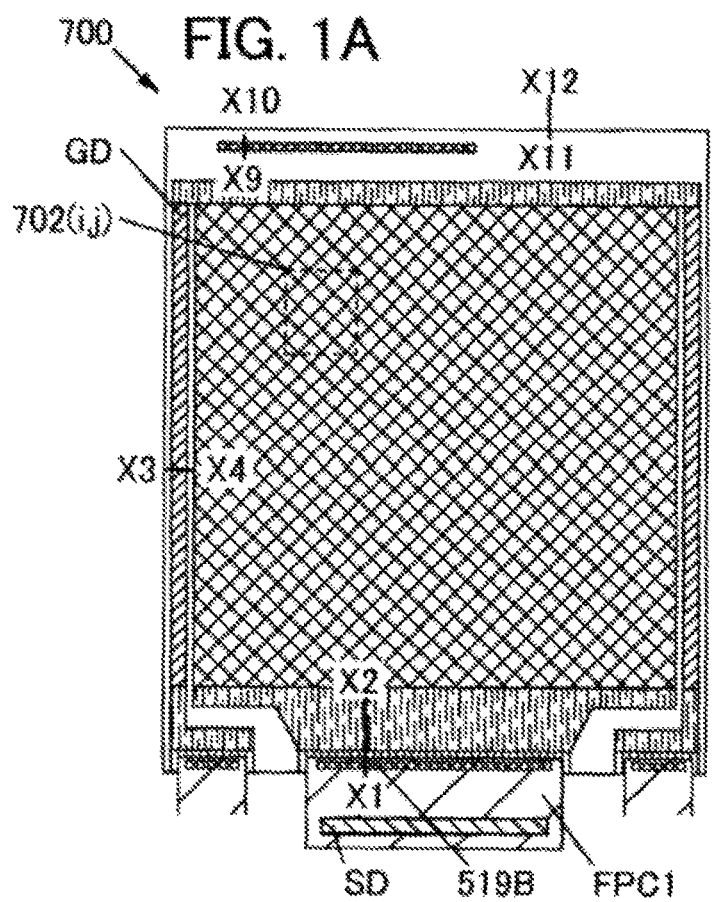
FIGS. 1A and 1B illustrate a structure of a display panel of an embodiment.

A display panel of one embodiment of the present invention includes a first display element, a first conductive film electrically connected to the first display element, a second conductive film including a region overlapping with the first conductive film, an insulating film including a region sandwiched between the second conductive film and the first conductive film, a pixel circuit electrically connected to the second conductive film, a second display element electrically connected to the pixel circuit, and a third display element electrically connected to the pixel circuit. The insulating film has an opening. The second conductive film is electrically connected to the first conductive film through the opening.

Thus, for example, the first display element and the second and third display elements that perform display using a method different from that of the first display element can be driven using the pixel circuit that can be formed in the same process. Furthermore, using the insulating film, impurity diffusion between the first display element and the second display element or between the first display element and the third display element can be suppressed. Thus, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments. Note that in structures of the invention described below, the same portions or portions having similar functions are denoted by the same reference numerals in different drawings, and a description thereof is not repeated.

Embodiment 1

In this embodiment, a structure of a display panel of one embodiment of the present invention will be described with reference to FIGS. 1A and 1B, FIGS. 2A and 2B, FIGS. 3A and 3B, FIGS. 4A and 4B, FIG. 5, and FIGS. 6A, 6B1, 6B2, and 6C.

Figure 1B:
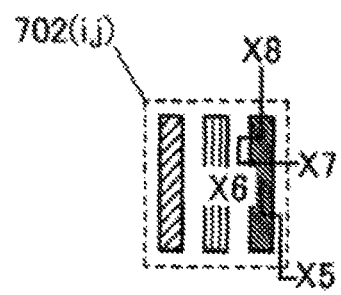

FIGS. 1A and 1B and FIGS. 2A and 2B illustrate a structure of a display panel of one embodiment of the present invention. FIG. 1A is a top view of the display panel of one embodiment of the present invention. FIG. 1B illustrates part of FIG. 1A.

Figure 2A:
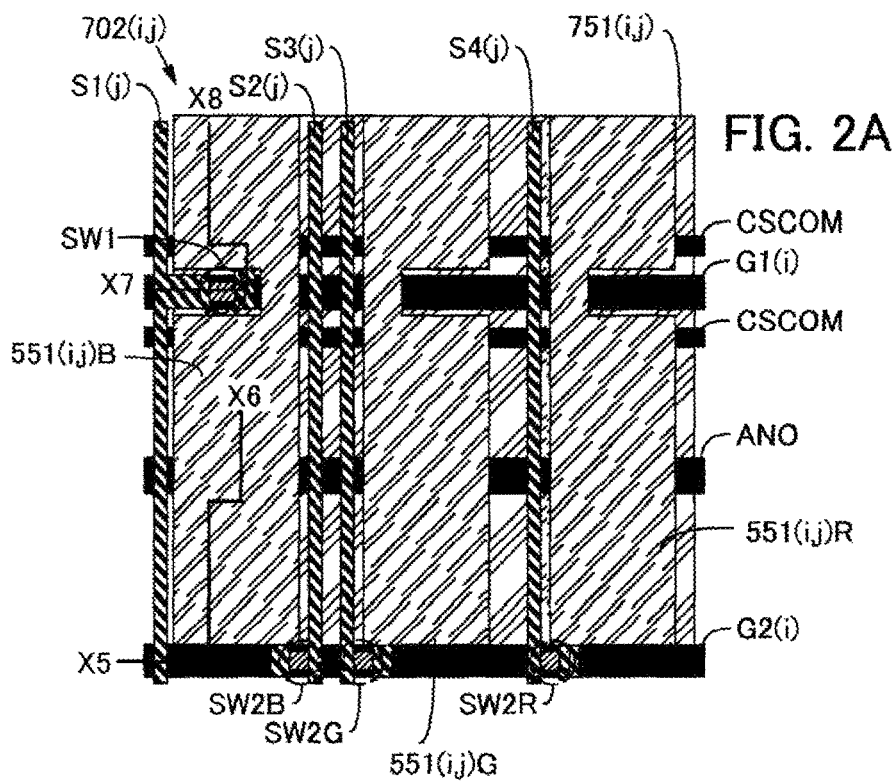
FIGS. 2A and 2B illustrate a structure of a pixel of a display panel of an embodiment.
Figure 2B:
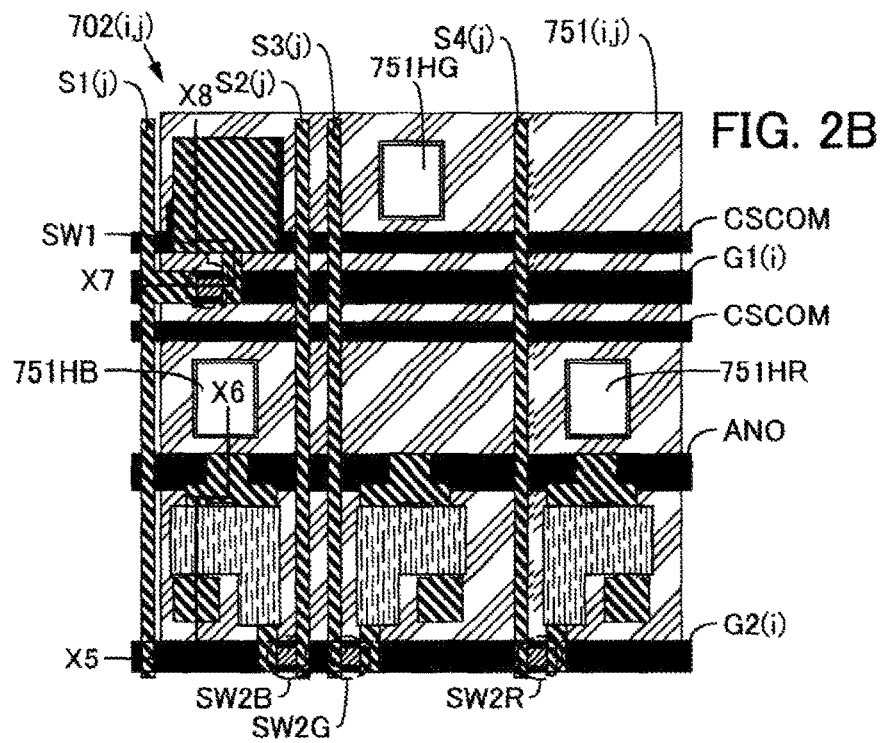

FIG. 2A is a bottom view illustrating part of the structure of FIG. 1A. FIG. 2B is a bottom view illustrating the part of the structure illustrated in FIG. 2A in which some components are omitted.

Figure 3A:
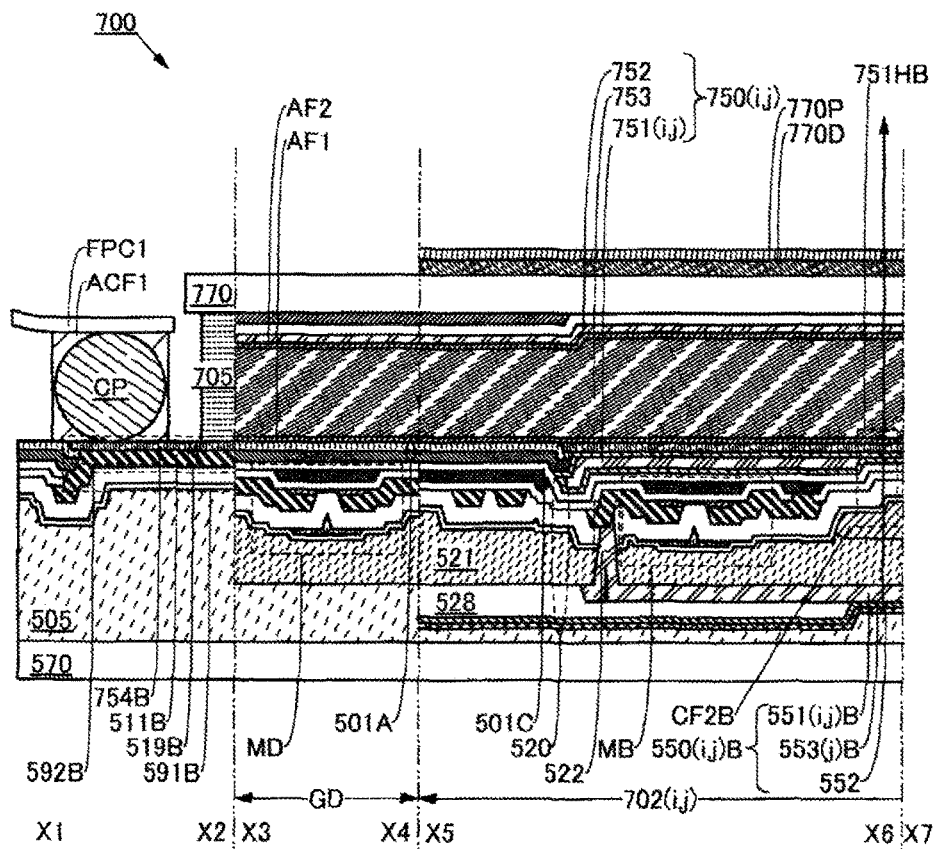
FIGS. 3A and 3B are cross-sectional views illustrating a structure of a cross section of a display panel according to an embodiment.
Figure 3B:
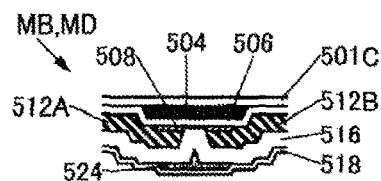

FIGS. 3A and 3B and FIGS. 4A and 4B are cross-sectional views illustrating the structure of the display panel of one embodiment of the present invention. FIG. 3A is a cross-sectional view taken along cutting plane lines X1-X2, X3-X4, and X5-X6 in FIGS. 1A and 1B, and FIG. 3B illustrates part of FIG. 3A.

Figure 4A:
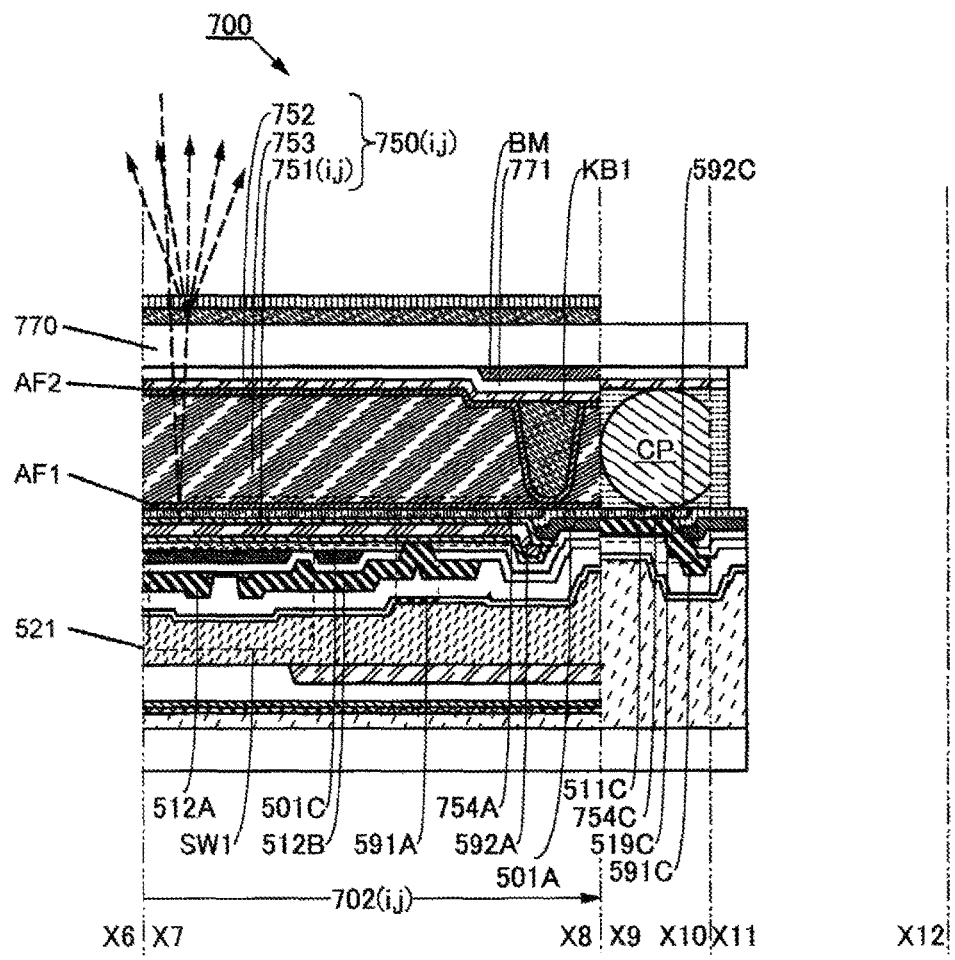
FIGS. 4A and 4B are cross-sectional views illustrating a structure of a cross section of a display panel according to an embodiment.
Figure 4B:
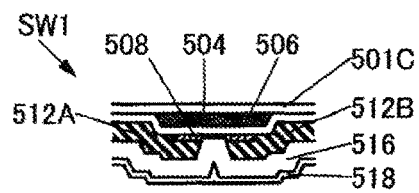

FIG. 4A is a cross-sectional view taken along cutting plane lines X7-X8, X9-X10, and X11-X12 in FIGS. 1A and 1B, and FIG. 4B illustrates part of FIG. 4A.

Figure 5:
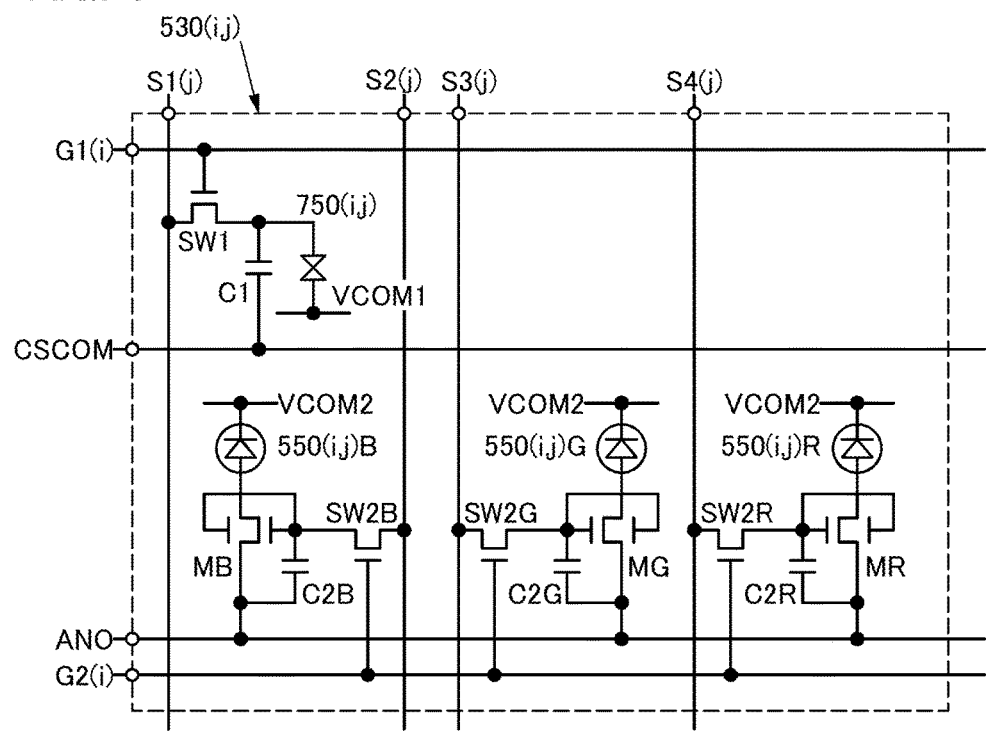
FIG. 5 is a circuit diagram illustrating a structure of a display panel of an embodiment.

FIG. 5 is a circuit diagram illustrating a structure of a pixel circuit included in a display panel of an embodiment of the present invention.

FIGS. 6A, 6B1, 6B2, and 6C are block diagrams illustrating the arrangement of pixels, wirings, and the like that can be used in a display panel of one embodiment of the present invention. FIGS. 6B1, 6B2, and 6C schematically illustrate the arrangement of a reflective film that can be used in the display panel of one embodiment of the present invention and openings provided in the reflective film.

Note that in this specification, an integral variable of 1 or more may be used for reference numerals. For example, "(p)" where p is an integral variable of 1 or more may be used for part of a reference numeral that specifies any one of components (p components in maximum). For another example, "(m, n)" where m and n are each an integral variable of 1 or more may be used for part of a reference numeral that specifies any one of components (m×n components in maximum).

<Structural Example 1 of Display Panel>

A display panel 700 described in this embodiment includes a signal line 1(j) and a pixel 702(i, j). The pixel 702(i, j) is electrically connected to the signal line S1(j) (see FIG. 2A).

The pixel 702(i, j) includes a pixel circuit 530(i, j), a second conductive film, a first conductive film, an insulating film 501C, a first display element 750(i, j), a second display element 550(i, j)B, and a third display element 550(i, j)G (see FIGS. 3A and 3B, FIGS. 4A and 4B, and FIG. 5). For example, the second conductive film can be used as a conductive film 512B serving as a source electrode or a drain electrode of a transistor that can be used as a switch SW1. Furthermore, for example, the first conductive film can be used as a first electrode 751(i, j) of the first display element 750(i, j).

The pixel circuit 530(i, j) is electrically connected to the signal line SW). Note that a conductive film 512A is electrically connected to the signal line S1(j) (see FIG. 4A and FIG. 5). Furthermore, for example, the transistor in which the second conductive film is used as the conductive film 512B serving as a source electrode or a drain electrode can be used as the switch SW1 of the pixel circuit 530(i, j).

The second conductive film is electrically connected to the pixel circuit 530(i, j).

The first conductive film has a region overlapping with the second conductive film.

The insulating film 501C includes a region sandwiched between the second conductive film and the first conductive film. The insulating film 501C has an opening 591A in the region sandwiched between the first conductive film and the second conductive film. Furthermore, the insulating film 501C includes a region sandwiched between an insulating film 501A and a third conductive film 511B. Moreover, the insulating film 501C has an opening 591B in the region sandwiched between the insulating film 501A and the third conductive film 511B. The insulating film 501C has an opening 591C in a region sandwiched between the insulating film 501A and a conductive film 511C.

The second conductive film is electrically connected to the first conductive film through the opening 591A. For example, the conductive film 512B is electrically connected to the first electrode 751(i, j) which also serves as the first conductive film. The first conductive film electrically connected to the second conductive film through the opening 591A provided in the insulating film 501C can be referred to as a through electrode.

The first display element 750(i, j) is electrically connected to the first conductive film.

The second display element 550(i, j)B is electrically connected to the pixel circuit 530(i, j).

The third display element 550(i, j)G is electrically connected to the pixel circuit 530(i, j).

The first display element 750(i, j) includes a reflective film and has a function of controlling the intensity of reflected light. For example, the reflective film can be used as the first electrode 751(i, j).

The second display element 550(i, j)B has a function of emitting light toward the insulating film 501C.

The third display element 550(i, j)G has a function of emitting light toward the insulating film 501C.

The reflective film has a shape including a region that does not block light emitted from the second display element 550(*i, j*)B or light emitted from the third display element 550(*i, j*)G.

The reflective film of the display panel 700 described in this embodiment has a first opening 751HB and a second opening 751HG (see FIG. 2B). The second display element 550(*i, j*)B has a function of emitting light toward the first opening 751HB, and the third display element 550(*i, j*)G has a function of emitting light toward the second opening 751HG.

For example, the reflective film can be formed using a material having a shape in which an end portion is cut off so as to form a region 751HB2 that does not block light emitted from the second display element 550(*i, j*)B, a region 751HG2 that does not block light emitted from the third display element 550(*i, j*)G, or a region 751HR2 that does not block light emitted from a fourth display element 550(*i, j*)R (see FIG. 6C). Specifically, the first electrode 751(*i, j*) whose end portion is cut off so as to be shorter in the column direction (the direction indicated by the arrow C in the drawing) can be used as the reflective film.

The display panel described in this embodiment includes a first display element, a first conductive film electrically connected to the first display element, a second conductive film including a region overlapping with the first conductive film, an insulating film including a region sandwiched between the second conductive film and the first conductive film, a pixel circuit electrically connected to the second conductive film, a second display element electrically connected to the pixel circuit, and a third display element electrically connected to the pixel circuit. The insulating film has an opening. The second conductive film is electrically connected to the first conductive film through the opening.

Thus, for example, the first display element and the second and third display elements that perform display using a method different from that of the first display element can be driven using the pixel circuit that can be formed in the same process. Furthermore, using the insulating film, impurity diffusion between the first display element and the second display element or between the first display element and the third display element can be suppressed. Thus, a novel display panel that is highly convenient or reliable can be provided.

The second display element 550(*i, j*)B of the display panel 700 described in this embodiment is provided so that the display using the second display element 550(*i, j*)B can be seen from part of a region from which the display using the first display element 750(*i, j*) can be seen, and the third display element 550(*i, j*)G is provided so that the display using the third display element 550(*i, j*)G can be seen from part of the region from which the display using the first display element 750(*i, j*) can be seen.

Thus, the display using the second display element and the display using the third display element can be seen from part of the region from which the display using the first display element can be seen. Alternatively, a user can view the display without changing the attitude or the like of the display panel. Thus, a novel display panel that is highly convenient or reliable can be provided.

The third display element 550(*i, j*)G of the display panel 700 described in this embodiment has a function of displaying a color different from the color displayed by the second display element 550(*i, j*)B. For example, a display element having a function of displaying blue is used as the second display element 550(*i, j*)B, and a display element having a function of displaying green is used as the third display element 550(*i, j*)G.

The pixel 702(*i, j*) of the display panel 700 described in this embodiment is provided with the fourth display element 550(*i, j*)R. The fourth display element 550(*i, j*)R is electrically connected to the pixel circuit 530(*i, j*) and has a function of emitting light toward the insulating film 501C.

The fourth display element 550(*i, j*)R has a function of displaying a color different from the color displayed by the second display element 550(*i, j*)B. The fourth display element 550(*i, j*)R has a function of displaying a color different from the color displayed by the third display element 550(*i, j*)G.

The second display element 550(*i, j*)B has a function of displaying blue, green, or red, the third display element 550(*i, j*)G has a function of displaying blue, green, or red, and the fourth display element 550(*i, j*)R has a function of displaying blue, green, or red. For example, a display element having a function of displaying blue may be used as the second display element 550(*i, j*)B, a display element having a function of displaying green may be used as the third display element 550(*i, j*)G, and a display element having a function of displaying red may be used as the fourth display element 550(*i, j*)R.

The display panel described in this embodiment includes a pixel and a signal line electrically connected to the pixel. The pixel includes a first display element provided with a reflective film having openings, second and third display elements that emit light toward the openings, and a pixel circuit electrically connected to the first to third display elements. For example, a single-color display element or a monochrome display element is used as the first display element 750(*i, j*), and a group of display elements capable of full-color display are used as the second display element 550(*i, j*)B, the third display element 550(*i, j*)G, and the fourth display element 550(*i, j*)R. Furthermore, a structure not provided with a coloring film between a substrate 770 and the first display element 750(*i, j*) is used. Alternatively, a structure in which a coloring film is sandwiched between the substrate 770 and the first display element 750(*i, j*) and in which the first display element is a reflective display element including a region not overlapping with the coloring film is used.

Thus, display can be performed using the first display element. Furthermore, display can be performed using the second display element or the third display element. Moreover, single-color or monochrome display or full-color display can be performed using one display panel. In addition, the aperture ratio of the first display element can be increased. In particular, when a reflective display element including a region not overlapping with a coloring film is used as the first display element, bright display can be performed while suppressing power consumption. Thus, a novel display panel that is highly convenient or reliable can be provided.

The reflective film of the display panel 700 described in this embodiment is provided with the first opening 751HB and the second opening 751HG (see FIG. 2B, 6B1, or 6B2). The reflective film in which the first opening 751HB and the second opening 751HG are formed can be used as the first electrode 751(*i, j*), for example.

The first opening 751HB transmits light emitted from the second display element 550(*i, j*)B, and the second opening 751HG transmits light emitted from the third display element 550(*i, j*)G (see FIG. 3A).

The second opening 751HG is provided neither on a line that extends in the row direction (the direction indicated by an arrow R in the drawing) through the first opening 751HB nor on a line that extends in the column direction (the direction indicated by the arrow C in the drawing) through the first opening 751HB (see FIG. 6B1 or 6B2).

Alternatively, the reflective film of the display panel 700 described in this embodiment is provided with the first opening 751HB, the second opening 751HG, and a third opening 751HR. For example, the reflective film in which the first opening 751HB, the second opening 751HG, and the third opening 751HR are formed can be used as the first electrode 751($i$, $j$).

The first opening 751HB transmits light emitted from the second display element 550($i$, $j$)B, the second opening 751HG transmits light emitted from the third display element 550($i$, $j$)G, and the third opening 751HR transmits light emitted from the fourth display element 550($i$, $j$)R.

The third opening 751HR is provided on a line that extends in the row or column direction through the first opening 751HB.

The second opening 751HG is provided on a line that is perpendicular to the above-mentioned line between the first opening 751HB and the third opening 751HR.

Thus, the third display element that displays a color different from that displayed by the second display element can be provided easily near the second display element. Thus, a novel display panel that is highly convenient or reliable can be provided.

The reflective film of the display panel 700 described in this embodiment includes a region overlapping with a region located between the second display element 550($i$, $j$)B and the third display element 550($i$, $j$)G. For example, the first electrode 751($i$, $j$) used as a reflective film includes a region overlapping with the region located between the second display element 550($i$, $j$)B and the third display element 550($i$, $j$)G. Accordingly, the area of the reflective film can be large as compared with the structure in which reflective films are provided separately in both a region overlapping with the second display element 550($i$, $j$)B and a region overlapping with the third display element 550($i$, $j$)G.

The display panel 700 described in this embodiment includes a group of pixels 702($i$, 1) to 702($i$, $n$), another group of pixels 702($i$, $j$) to 702($m$, $j$), and a scan line G1($i$) (see FIG. 6A). Note that i is an integer greater than or equal to 1 and less than or equal to m, j is an integer greater than or equal to 1 and less than or equal to n, and m and n are each an integer greater than or equal to 1.

The group of pixels 702($i$, 1) to 702($i$, $n$) include the pixel 702($i$, $j$) and are provided in the row direction (the direction indicated by the arrow R in the drawing).

The another group of pixels 702($i$, $j$) to 702($m$, $j$) include the pixel 702($i$, $j$) and are provided in the column direction (the direction indicated by the arrow C in the drawing) that intersects the row direction.

The scan line G1($i$) is electrically connected to the group of pixels 702($i$, 1) to 702($i$, $n$) provided in the row direction.

The another group of pixels 702($i$, $j$) to 702($m$, $j$) provided in the column direction are electrically connected to the signal line S1($j$).

The display panel described in this embodiment includes the insulating film 501A.

The insulating film 501A has a first opening 592A and a second opening 592B. Furthermore, the insulating film 501A has an opening 592C (see FIG. 3A and FIG. 4A).

The first opening 592A includes a region overlapping with a first intermediate film 754A and the first electrode 751($i$, $j$) or a region overlapping with the first intermediate film 754A and the insulating film 501C.

The second opening 592B includes a region overlapping with a second intermediate film 754B and the third conductive film 511B. Furthermore, the opening 592C includes a region overlapping with an intermediate film 754C.

The insulating film 501A includes a region sandwiched between the first intermediate film 754A and the insulating film 501C along the periphery of the first opening 592A, and the insulating film 501A includes a region sandwiched between the second intermediate film 754B and the third conductive film 511B along the periphery of the second opening 592B.

The display panel described in this embodiment includes a scan line G2($i$), a wiring CSCOM, a wiring ANO, a signal line S2($j$), a signal line S3($j$), and a signal line S4($j$) (see FIG. 6A).

The second display element 550($i$, $j$)B of the display panel described in this embodiment includes a third electrode 551($i$, $j$)B, a fourth electrode 552, and a layer 553($j$)B containing a light-emitting material.

In addition, the third display element 550($i$, $j$)G includes a third electrode 551($i$, $j$)G, the fourth electrode 552, and a layer 553($j$)G containing a light-emitting material.

Furthermore, the fourth display element 550($i$, $j$)R includes a third electrode 551($i$, $j$)R, the fourth electrode 552, and a layer 553($j$)R containing a light-emitting material.

The fourth electrode 552 includes a region overlapping with the third electrode 551($i$, $j$)B, a region overlapping with the third electrode 551($i$, $j$)G, and a region overlapping with the third electrode 551($i$, $j$)R.

The layer 553($j$)B containing a light-emitting material includes a region provided between the third electrode 551($i$, $j$)B and the fourth electrode 552.

The layer 553($j$)G containing a light-emitting material includes a region provided between the third electrode 551($i$, $j$)G and the fourth electrode 552.

The layer 553($j$)R containing a light-emitting material includes a region provided between the third electrode 551($i$, $j$)R and the fourth electrode 552.

The third electrode 551($i$, $j$)B is electrically connected to the pixel circuit 530($i$, $j$) at a connection portion 522. The third electrode 551($i$, $j$)G is electrically connected to the pixel circuit 530($i$, $j$) at a connection portion (not shown), and the third electrode 551($i$, $j$)R is electrically connected to the pixel circuit 530($i$, $j$) at a connection portion (not shown).

The first display element 750($i$, $j$) of the display panel described in this embodiment includes a layer 753 containing a liquid crystal material, the first electrode 751($i$, $j$), and a second electrode 752. The second electrode 752 is positioned such that an electric field which controls the alignment of the liquid crystal material is generated between the second electrode 752 and the first electrode 751($i$, $j$) (see FIG. 3A and FIG. 4A).

The display panel described in this embodiment includes an alignment film AF1 and an alignment film AF2. The alignment film AF2 is provided such that the layer 753 containing a liquid crystal material is interposed between the alignment film AF1 and the alignment film AF2.

The display panel described in this embodiment includes the first intermediate film 754A and the second intermediate film 754B.

The first intermediate film 754A includes a region which overlaps with the insulating film 501C with the first conductive film interposed therebetween, and the first intermediate film 754A includes a region in contact with the first electrode 751(*i*, *j*). The second intermediate film 754B includes a region in contact with the third conductive film 511B.

The display panel described in this embodiment includes a light-blocking film BM, an insulating film 771, a functional film 770P, and a functional film 770D. In addition, a coloring film CF2B is included.

The light-blocking film BM has an opening in a region overlapping with the first display element 750(*i*, *j*). The coloring film CF2B is provided between the insulating film 501C and the second display element 550(*i*, *j*)B and includes a region overlapping with the opening 751HB.

The display panel described in this embodiment includes a coloring film CF2G (not shown) and a coloring film CF2R (not shown). The coloring film CF2G is provided between the insulating film 501C and the third display element 550(*i*, *j*)G and includes a region overlapping with the opening 751HG. The coloring film CF2R is provided between the insulating film 501C and the fourth display element 550(*i*, *j*)R and includes a region overlapping with the opening 751HR (see FIG. 6B1 or 6B2).

The insulating film 771 is provided between the light-blocking film BM and the layer 753 containing a liquid crystal material. This can prevent impurities from being diffused from the light-blocking film BM or the like to the layer 753 containing a liquid crystal material.

The functional film 770P includes a region overlapping with the first display element 750(*i*, *j*).

The functional film 770D includes a region overlapping with the first display element 750(*i*, *j*). The functional film 770D is provided so that the substrate 770 lies between the functional film 770D and the first display element 750(*i*, *j*). This can diffuse light reflected by the first display element 750(*i*, *j*), for example.

The display panel described in this embodiment includes a substrate 570, the substrate 770, and a functional layer 520.

The substrate 770 includes a region overlapping with the substrate 570.

The functional layer 520 includes a region provided between the substrate 570 and the substrate 770. The functional layer 520 includes the pixel circuit 530(*i*, *j*), the second display element 550(*i*, *j*)B, the third display element 550(*i*, *j*)G, the fourth display element 550(*i*, *j*)R, an insulating film 521, and an insulating film 528. The functional layer 520 includes an insulating film 518 and an insulating film 516 (see FIGS. 3A and 3B).

The insulating film 521 is provided between the pixel circuit 530(*i*, *j*) and the second display element 550(*i*, *j*)B.

The insulating film 528 is provided between the insulating film 521 and the substrate 570 and has openings in a region overlapping with the second display element 550(*i*, *j*)B, a region overlapping with the third display element 550(*i*, *j*)G, and a region overlapping with the fourth display element 550(*i*, *j*)R.

The insulating film 528 formed along the periphery of the third electrode 551(*i*, *j*)B can prevent a short circuit between the third electrode 551(*i*, *j*)B and the fourth electrode.

The insulating film 528 formed along the periphery of the third electrode 551(*i*, *j*)G can prevent a short circuit between the third electrode 551(*i*, *j*)G and the fourth electrode.

The insulating film 528 formed along the periphery of the third electrode 551(*i*, *j*)R can prevent a short circuit between the third electrode 551(*i*, *j*)R and the fourth electrode.

The insulating film 518 includes a region provided between the insulating film 521 and the pixel circuit 530(*i*, *j*), and the insulating film 516 includes a region provided between the insulating film 518 and the pixel circuit 530(*i*, *j*).

The display panel described in this embodiment also includes a bonding layer 505, a sealing material 705, and a structure body KB1.

The bonding layer 505 is provided between the functional layer 520 and the substrate 570, and has a function of bonding the functional layer 520 and the substrate 570 together.

The sealing material 705 is provided between the functional layer 520 and the substrate 770, and has a function of bonding the functional layer 520 and the substrate 770 together.

The structure body KB1 has a function of providing a certain space between the functional layer 520 and the substrate 770.

The display panel described in this embodiment includes a terminal 519B and a terminal 519C. The terminal 519B is electrically connected to the signal line S1(*j*), and the terminal 519C is electrically connected to a wiring VCOM1, for example.

The terminal 519B includes the conductive film 511B and the intermediate film 754B, and the intermediate film 754B includes a region in contact with the conductive film 511B. The terminal 519C includes the conductive film 511C and the intermediate film 754C, and the intermediate film 754C includes a region in contact with the conductive film 511C.

A conductive material CP is sandwiched between the terminal 519C and the second electrode 752, and electrically connects the terminal 519C and the second electrode 752. For example, a conductive particle can be used as the conductive material CP.

Moreover, the display panel described in this embodiment includes a driver circuit GD and a driver circuit SD (see FIGS. 1A and 1B and FIG. 6A).

The driver circuit GD is electrically connected to the scan line G1 (*i*). The driver circuit GD includes a transistor MD, for example. Specifically, a transistor including a semiconductor film that can be formed in the same process as the semiconductor film of the transistor included in the pixel circuit 530(*i*, *j*) can be used as the transistor MD (see FIGS. 3A and 3B).

The driver circuit SD is electrically connected to the signal line S1(*j*). The driver circuit SD is electrically connected to the terminal 519B, for example.

Individual components included in the display panel will be described below. Note that these components cannot be clearly distinguished and one component may also serve as another component or include part of another component.

For example, the first conductive film can be used as the first electrode 751(*i*, *j*). The first conductive film can be used as a reflective film.

In addition, the second conductive film can be used as the conductive film 512B serving as a source electrode or a drain electrode of the transistor.

Structural Example

The display panel of one embodiment of the present invention includes the substrate 570, the substrate 770, the structure body KB1, the sealing material 705, or the bonding layer 505.

In addition, the display panel of one embodiment of the present invention includes the functional layer 520, the insulating film 521, or the insulating film 528.

The display panel of one embodiment of the present invention also includes the signal line S1(j), the signal line S3(j), the signal line S4(j), the signal line S2(j), the scan line G1(i), the scan line G2(i), the wiring CSCOM, or the wiring ANO.

The display panel of one embodiment of the present invention also includes the first conductive film or the second conductive film.

The display panel of one embodiment of the present invention also includes the terminal 519B, the terminal 519C, the conductive film 511B, or the conductive film 511C.

The display panel of one embodiment of the present invention also includes the pixel circuit 530(i, j) or the switch SW1.

The display panel of one embodiment of the present invention also includes the first display element 750(i, j), the first electrode 751(i, j), the reflective film, the opening, the layer 753 containing a liquid crystal material, or the second electrode 752.

In addition, the display panel of one embodiment of the present invention includes the alignment film AF1, the alignment film AF2, the coloring film CF2B, the light-blocking film BM, the insulating film 771, the functional film 770P, or the functional film 770D.

In addition, the display panel of one embodiment of the present invention includes the second display element 550(i, j)B, the third electrode 551(i, j)B, the fourth electrode 552, or the layer 553(j)B containing a light-emitting material.

In addition, the display panel of one embodiment of the present invention includes the third display element 550(i, j)G, the third electrode 551(i, j)G, or the layer 553(j)R containing a light-emitting material.

In addition, the display panel of one embodiment of the present invention includes the fourth display element 550(i, j)R, the third electrode 551(i, j)R, or the layer 553(j)R containing a light-emitting material.

The display panel of one embodiment of the present invention also includes the insulating film 501A and the insulating film 501C.

The display panel of one embodiment of the present invention also includes the driver circuit GD or the driver circuit SD.

<<Substrate 570>>

The substrate 570 or the like can be formed using a material having heat resistance high enough to withstand heat treatment in the manufacturing process. For example, a material with a thickness of less than or equal to 0.7 mm and more than or equal to 0.1 mm can be used as the substrate 570. Specifically, a substrate polished to a thickness of approximately 0.1 mm can be used.

For example, a large-sized glass substrate having any of the following sizes can be used as the substrate 570 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570 or the like, an organic material, an inorganic material, a composite material of an organic material and an inorganic material, or the like can be used. For example, an inorganic material such as glass, ceramic, or metal can be used for the substrate 570 or the like.

Specifically, non-alkali glass, soda-lime glass, potash glass, crystal glass, aluminosilicate glass, tempered glass, chemically tempered glass, quartz, sapphire, or the like can be used for the substrate 570 or the like. Specifically, an inorganic oxide film, an inorganic nitride film, an inorganic oxynitride film, or the like can be used for the substrate 570 or the like. For example, a silicon oxide film, a silicon nitride film, a silicon oxynitride film, an aluminum oxide film, or the like can be used for the substrate 570 or the like. Stainless steel, aluminum, or the like can be used for the substrate 570 or the like.

For example, a single crystal semiconductor substrate or a polycrystalline semiconductor substrate of silicon or silicon carbide, a compound semiconductor substrate of silicon germanium or the like, an SOI substrate, or the like can be used as the substrate 570 or the like. Thus, a semiconductor element can be provided over the substrate 570 or the like.

For example, an organic material such as a resin, a resin film, or plastic can be used for the substrate 570 or the like. Specifically, a resin film or a resin plate of polyester, polyolefin, polyamide, polyimide, polycarbonate, an acrylic resin, or the like can be used for the substrate 570 or the like.

For example, a composite material formed by attaching a metal plate, a thin glass plate, or a film of an inorganic material to a resin film or the like can be used for the substrate 570 or the like. For example, a composite material formed by dispersing a fibrous or particulate metal, glass, an inorganic material, or the like into a resin film can be used for the substrate 570 or the like. For example, a composite material formed by dispersing a fibrous or particulate resin, an organic material, or the like into an inorganic material can be used for the substrate 570 or the like.

Furthermore, a single-layer material or a layered material in which a plurality of layers are stacked can be used for the substrate 570 or the like. For example, a layered material in which a base, an insulating film that prevents diffusion of impurities contained in the base, and the like are stacked can be used for the substrate 570 or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the substrate 570 or the like. Alternatively, a layered material in which a resin and a film for preventing diffusion of impurities that penetrate the resin, such as a silicon oxide film, a silicon nitride film, or a silicon oxynitride film, are stacked can be used for the substrate 570 or the like.

Specifically, a resin film, a resin plate, a layered material, or the like of polyester, polyolefin, polyamide, polyimide, polycarbonate, an acrylic resin, or the like can be used for the substrate 570 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570 or the like.

Specifically, polyethylene terephthalate (PET), polyethylene naphthalate (PEN), polyethersulfone (PES), an acrylic resin, or the like can be used for the substrate 570 or the like.

Alternatively, paper, wood, or the like can be used for the substrate 570 or the like.

For example, a flexible substrate can be used as the substrate 570 or the like.

Note that a transistor, a capacitor, or the like can be directly formed on the substrate. Alternatively, a transistor, a capacitor, or the like can be formed on a substrate which is for use in the manufacturing process and can withstand heat applied in the manufacturing process, and then the transistor, the capacitor, or the like can be transferred to the substrate 570 or the like. Thus, a transistor, a capacitor, or the like can be formed over a flexible substrate, for example.

<<Substrate 770>>

For example, a light-transmitting material can be used for the substrate 770.

Specifically, any of the materials that can be used for the substrate 570 can be used for the substrate 770.

For example, aluminosilicate glass, tempered glass, chemically tempered glass, sapphire, or the like can be favorably used for the substrate 770 that is provided on the user side of the display panel. This can prevent damage or a crack of the display panel caused by the use thereof.

Moreover, a material having a thickness of more than or equal to 0.1 mm and less than or equal to 0.7 mm, for example, can be used for the substrate 770. Specifically, a substrate polished for reducing the thickness can be used. Thus, the functional film 770D can be provided near the first display element 750(i, j), which makes it possible to reduce an image blur and to display a clear image.

<<Structure Body KB1>>

The structure body KB1 or the like can be formed using an organic material, an inorganic material, or a composite material of an organic material and an inorganic material. Accordingly, a predetermined space can be provided between components between which the structure KB1 and the like are provided.

Specifically, for the structure body KB1, polyester, polyolefin, polyamide, polyimide, polycarbonate, polysiloxane, an acrylic resin, or the like, or a composite material of a plurality of resins selected from these can be used. Alternatively, a photosensitive material may be used.

<<Sealing Material 705>>

For the sealing material 705 or the like, an inorganic material, an organic material, a composite material of an inorganic material and an organic material, or the like can be used.

For example, an organic material such as a thermally fusible resin or a curable resin can be used for the sealing material 705 or the like.

For example, an organic material such as a reactive curable adhesive, a light curable adhesive, a thermosetting adhesive, and/or an anaerobic adhesive can be used for the sealing material 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the sealing material 705 or the like.

<<Bonding Layer 505>>

For example, any of the materials that can be used for the sealing material 705 can be used for the bonding layer 505.

<<Insulating Film 521>>

For example, an insulating inorganic material, an insulating organic material, or an insulating composite material containing an inorganic material and an organic material can be used for the insulating film 521 or the like.

Specifically, an inorganic oxide film, an inorganic nitride film, an inorganic oxynitride film, or a layered material obtained by stacking some of these films can be used as the insulating film 521 or the like. For example, a film including any of a silicon oxide film, a silicon nitride film, a silicon oxynitride film, an aluminum oxide film, and the like, or a film including a layered material obtained by stacking some of these films can be used as the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<<Insulating Film 528>>

For example, any of the materials that can be used for the insulating film 521 can be used for the insulating film 528 or the like. Specifically, a 1-mm-thick polyimide-containing film can be used as the insulating film 528.

<<Insulating Film 501A>>

For example, any of the materials that can be used for the insulating film 521 can be used for the insulating film 501A. For example, a material having a function of supplying hydrogen can be used for the insulating film 501A.

Specifically, a material obtained by stacking a material containing silicon and oxygen and a material containing silicon and nitrogen can be used for the insulating film 501A. For example, a material having a function of releasing hydrogen by heating or the like to supply the hydrogen to another component can be used for the insulating film 501A. Specifically, a material having a function of releasing hydrogen taken in the manufacturing process, by heating or the like, to supply the hydrogen to another component can be used for the insulating film 501A.

For example, a film containing silicon and oxygen that is formed by a chemical vapor deposition method using silane or the like as a source gas can be used as the insulating film 501A.

Specifically, a material obtained by stacking a material containing silicon and oxygen and having a thickness of more than or equal to 200 nm and less than or equal to 600 nm and a material containing silicon and nitrogen and having a thickness of approximately 200 nm can be used for the insulating film 501A.

<<Insulating Film 501C>>

For example, any of the materials that can be used for the insulating film 521 can be used for the insulating film 501C. Specifically, a material containing silicon and oxygen can be used for the insulating film 501C. Thus, diffusion of impurities into the pixel circuit, the second display element, or the like can be suppressed.

For example, a 200-nm-thick film containing silicon, oxygen, and nitrogen can be used as the insulating film 501C.

<<Intermediate Film 754A, Intermediate Film 754B, Intermediate Film 754C>>

For example, a film with a thickness greater than or equal to 10 nm and less than or equal to 500 nm, preferably greater than or equal to 10 nm and less than or equal to 100 nm can be used as the intermediate film 754A, the intermediate film 754B, or the intermediate film 754C. In this specification, the intermediate film 754A, the intermediate film 754B, or the intermediate film 754C is referred to as an intermediate film.

For example, a material having a function of allowing the passage of hydrogen or the supply of hydrogen can be used for the intermediate film.

For example, a conductive material can be used for the intermediate film.

For example, a light-transmitting material can be used for the intermediate film.

Specifically, a material containing indium and oxygen, a material containing indium, gallium, zinc, and oxygen, a material containing indium, tin, and oxygen, or the like can be used for the intermediate film. Note that these materials have a function of allowing the passage of hydrogen.

Specifically, a 50- or 100-nm-thick film containing indium, gallium, zinc, and oxygen can be used as the intermediate film.

Note that a material obtained by stacking films serving as an etching stopper can be used as the intermediate film. Specifically, a layered material obtained by stacking a 50-nm-thick film containing indium, gallium, zinc, and oxygen and a 20-nm-thick film containing indium, tin, and oxygen, in this order, can be used for the intermediate film.

<<Wiring, Terminal, Conductive Film>>

A conductive material can be used for the wiring or the like. Specifically, the conductive material can be used for the signal line S1($j$), the signal line S2($j$), the signal line S3($j$), the signal line S4($j$), the scan line G1($i$), the scan line G2($i$), the wiring CSCOM, the wiring ANO, the terminal 519B, the terminal 519C, a terminal 719, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

For example, a film including a metal nanowire can be used for the wiring or the like. Specifically, a nanowire including silver can be used.

Specifically, a conductive high molecule can be used for the wiring or the like.

Note that the terminal 519B can be electrically connected to a flexible printed circuit FPC1 using a conductive material ACF1, for example.

<<First Conductive Film, Second Conductive Film>>

For example, any of the materials that can be used for the wiring or the like can be used for the first conductive film or the second conductive film.

Alternatively, the first electrode 751($i$, $j$), the wiring, or the like can be used for the first conductive film.

For example, the conductive film 512B serving as a source electrode or a drain electrode of a transistor that can be used as the switch SW1, or the wiring or the like can be used for the second conductive film.

<<Pixel Circuit 530($i$, $j$)>>

The pixel circuit 530($i$, $j$) is electrically connected to the signal line S1($j$), the signal line S2($j$), the signal line S3($j$), the signal line S4($j$), the scan line G1($i$), the scan line G2($i$), the wiring CSCOM, and the wiring ANO (see FIG. 5).

The pixel circuit 530($i$, $j$) includes the switch SW1 and a capacitor C1.

The pixel circuit 530($i$, $j$) includes a switch SW2B, a transistor MB, a capacitor C2B, a switch SW2G, a transistor MG, a capacitor C2G, a switch SW2R, a transistor MR, and a capacitor C2R.

For example, a transistor including a gate electrode electrically connected to the scan line G1($i$) and a first electrode electrically connected to the signal line S1($j$) can be used as the switch SW1.

The capacitor C1 includes a first electrode electrically connected to a second electrode of the transistor used as the switch SW1 and a second electrode electrically connected to the wiring CSCOM.

For example, a transistor including a gate electrode electrically connected to the scan line G2($i$) and a first electrode electrically connected to the signal line S2($j$) can be used as the switch SW2B.

For example, a transistor including a gate electrode electrically connected to the scan line G2($i$) and a first electrode electrically connected to the signal line S3($j$) can be used as the switch SW2G.

For example, a transistor including a gate electrode electrically connected to the scan line G2($i$) and a first electrode electrically connected to the signal line S4($j$) can be used as the switch SW2R.

The transistor MB includes a gate electrode electrically connected to the second electrode of the transistor used as the switch SW2B and includes a first electrode electrically connected to the wiring ANO.

The transistor MG includes a gate electrode electrically connected to a second electrode of the transistor used as the switch SW2G and a first electrode electrically connected to the wiring ANO.

The transistor MR includes a gate electrode electrically connected to a second electrode of the transistor used as the switch SW2R and a first electrode electrically connected to the wiring ANO.

Note that a transistor including a conductive film provided such that a semiconductor film is sandwiched between a gate electrode and the conductive film can be used as the transistor MB. For example, a conductive film electrically connected to a wiring that can supply the same potential as that of the gate electrode of the transistor MB can be used.

Note that a transistor including a conductive film provided such that a semiconductor film is sandwiched between a gate electrode and the conductive film can be used as the transistor MG. For example, a conductive film electrically connected to a wiring that can supply the same potential as that of the gate electrode of the transistor MG can be used.

Note that a transistor including a conductive film provided such that a semiconductor film is sandwiched between a gate electrode and the conductive film can be used as the transistor MR. For example, a conductive film electrically connected to a wiring that can supply the same potential as that of the gate electrode of the transistor MR can be used.

The capacitor C2B includes a first electrode electrically connected to a second electrode of the transistor used as the switch SW2B and a second electrode electrically connected to the first electrode of the transistor MB.

The capacitor C2G includes a first electrode electrically connected to a second electrode of the transistor used as the switch SW2G and a second electrode electrically connected to the first electrode of the transistor MG.

The capacitor C2R includes a first electrode electrically connected to the second electrode of the transistor used as the switch SW2R and a second electrode electrically connected to the first electrode of the transistor MR.

The first electrode and the second electrode of the first display element 750($i$, $j$) are electrically connected to the second electrode of the transistor used as the switch SW1 and the wiring VCOM1, respectively. This enables the first display element 750 to be driven.

Furthermore, the third electrode and the fourth electrode of the second display element 550($i$, $j$)B are electrically connected to the second electrode of the transistor MB and the wiring VCOM2, respectively. This enables the second display element 550($i$, $j$)B to be driven.

The third electrode and the fourth electrode of the third display element 550($i$, $j$)G are electrically connected to the second electrode of the transistor MG and the wiring VCOM2, respectively. This enables the third display element 550($i$, $j$)G to be driven.

The third electrode and the fourth electrode of the fourth display element 550($i$, $j$)R are electrically connected to the second electrode of the transistor MR and the wiring VCOM2, respectively. This enables the fourth display element 550($i$, $j$)R to be driven.

<<Switch SW1, Switch SW2B, Switch SW2G, Switch SW2R, Transistor MB, Transistor MG, Transistor MR, Transistor MD>>

For example, a bottom-gate or top-gate transistor or the like can be used as the switch SW1, the switch SW2B, the switch SW2G, the switch SW2R, the transistor MB, the transistor MG, the transistor MR, the transistor MD, or the like.

For example, a transistor including a semiconductor containing an element belonging to Group 14 in a semiconductor film can be used. Specifically, a semiconductor containing silicon can be used for a semiconductor film. For example, a transistor including single crystal silicon, polysilicon, microcrystalline silicon, amorphous silicon, or the like in a semiconductor film can be used.

For example, a transistor including an oxide semiconductor in a semiconductor film can be used. Specifically, an oxide semiconductor containing indium or an oxide semiconductor containing indium, gallium, and zinc can be used for a semiconductor film.

For example, a transistor whose leakage current in an off state is smaller than that of a transistor including amorphous silicon in a semiconductor film can be used as the switch SW1, the switch SW2B, the switch SW2G, the switch SW2R, the transistor MB, the transistor MG, the transistor MR, the transistor MD, or the like. Specifically, a transistor including an oxide semiconductor in a semiconductor film 508 can be used as the switch SW1, the switch SW2B, the switch SW2G, the switch SW2R, the transistor MB, the transistor MG, the transistor MR, the transistor MD, or the like.

Thus, a pixel circuit can hold an image signal for a longer time than a pixel circuit including a transistor that uses amorphous silicon for a semiconductor film. Specifically, a selection signal can be supplied at a frequency of lower than 30 Hz, preferably lower than 1 Hz, further preferably less than once per minute while flickering is suppressed. Consequently, eyestrain on a user of the data processing device can be reduced, and power consumption for driving can be reduced.

The transistor that can be used as the switch SW1 includes the semiconductor film 508 and a conductive film 504 including a region overlapping with the semiconductor film 508 (see FIG. 4B). The transistor that can be used as the switch SW1 includes the conductive film 512A and the conductive film 512B serving as a source electrode and a drain electrode.

Note that the conductive film 504 and the insulating film 506 serve as a gate electrode and a gate insulating film, respectively. The conductive film 512A has one of a function of a source electrode and a function of a drain electrode, and the conductive film 512B has the other.

A transistor including a conductive film 524 provided such that the semiconductor film 508 is sandwiched between the conductive film 504 and the conductive film 524 can be used as the transistor MB, the transistor MG, or the transistor MR (see FIG. 3B).

A conductive film in which a 10-nm-thick film containing tantalum and nitrogen and a 300-nm-thick film containing copper are stacked in this order can be used as the conductive film 504, for example.

A material in which a 400-nm-thick film containing silicon and nitrogen and a 200-nm-thick film containing silicon, oxygen, and nitrogen are stacked can be used for the insulating film 506, for example.

A 25-nm-thick film containing indium, gallium, and zinc can be used as the semiconductor film 508, for example.

A conductive film in which a 50-nm-thick film containing tungsten, a 400-nm-thick film containing aluminum, and a 100-nm-thick film containing titanium are stacked in this order can be used as the conductive film 512A or the conductive film 512B, for example.

<<First Display Element 750($i$, $j$)>>

For example, a display element having a function of controlling transmission or reflection of light can be used as the first display element 750($i$, $j$) or the like. For example, a combined structure of a polarizing plate and a liquid crystal element or a MEMS shutter display element can be used. Specifically, a reflective liquid crystal display element can be used as the first display element 750($i$, $j$). The use of a reflective display element leads to a reduction of power consumption of a display panel.

For example, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The first display element 750($i$, $j$) includes a first electrode, a second electrode, and a liquid crystal layer. The liquid crystal layer contains a liquid crystal material whose orientation is controlled by a voltage applied between the first electrode and the second electrode. For example, the orientation of the liquid crystal material can be controlled by an electric field in the thickness direction (also referred to as the vertical direction), the direction that crosses the vertical direction (the horizontal direction, or the diagonal direction) of the liquid crystal layer.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. Furthermore, a liquid crystal material which exhibits a cholesteric phase, a smectic phase, a cubic phase, a chiral nematic phase, an isotropic phase, or the like can be used. Furthermore, a liquid crystal material which exhibits a blue phase can be used.

<<First Electrode 751(i, j)>>

For example, the material that is used for the wiring or the like can be used for the first electrode 751(i, j). Specifically, a reflective film can be used for the first electrode 751(i, j). For example, a material in which a light-transmitting conductive material and a reflective film having an opening are stacked can be used for the first electrode 751(i, j).

<<Reflective Film>>

For example, a material that reflects visible light can be used for the reflective film. Specifically, a material containing silver can be used for the reflective film. For example, a material containing silver, palladium, and the like or a material containing silver, copper, and the like can be used for the reflective film.

The reflective film reflects light that passes through the layer 753 containing a liquid crystal material, for example. This allows the first display element 750 to serve as a reflective liquid crystal element. Furthermore, for example, a material with unevenness on its surface can be used for the reflective film. In that case, incident light can be reflected in various directions so that a white image can be displayed.

Note that the first electrode 751(i, j) is not necessarily used for the reflective film. For example, the reflective film can be provided between the layer 753 containing a liquid crystal material and the first electrode 751(i, j). Alternatively, the first electrode 751(i, j) having a light-transmitting property can be provided between the reflective film and the layer 753 containing a liquid crystal material.

<<Opening 751HB, Opening 751HG, Opening 751HR>>

The opening 751HB, the opening 751HG, or the opening 751HR may have a polygonal shape, a quadrangular shape, an elliptical shape, a circular shape, a cross shape, a stripe shape, a slit-like shape, or a checkered pattern.

Furthermore, a single opening or a group of openings can be used as the opening 751HB, the opening 751HG, or the opening 751HR.

If the ratio of the total area of the openings 751HB, 751HG, and 751HR to the total area except for the openings is too high, display performed using the first display element 750(i, j) is dark.

If the ratio of the total area of the opening 751HB to the total area except for the openings is too low, display performed using the second display element 550(i, j)B is dark. If the ratio of the total area of the opening 751HG to the total area except for the openings is too low, display performed using the third display element 550(i, j)G is dark. If the ratio of the total area of the opening 751HR to the total area except for the openings is too low, display performed using the fourth display element 550(i, j)R is dark.

<<Second Electrode 752>>

For example, a material having a visible-light-transmitting property and conductivity can be used for the second electrode 752.

For example, a conductive oxide, a metal film thin enough to transmit light, or a metal nanowire can be used for the second electrode 752.

Specifically, a conductive oxide containing indium can be used for the second electrode 752. Alternatively, a metal thin film with a thickness greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

The alignment films AF1 and AF2 can be formed using a material containing polyimide or the like, for example. Specifically, a material formed by rubbing treatment or an optical alignment technique so that a liquid crystal material has alignment in a predetermined direction can be used.

For example, a film containing soluble polyimide can be used as the alignment film AF1 or AF2. In this case, the temperature required in forming the alignment film AF1 or AF2 can be low. Accordingly, damage to other components at the time of forming the alignment film AF1 or AF2 can be suppressed.

<<Coloring Film CF2B, Coloring Film CF2G, Coloring Film CF2R>>

A material transmitting light of a predetermined color can be used for the coloring film CF2B, the coloring film CF2G, or the coloring film CF2R. Thus, the coloring film CF2B, the coloring film CF2G, or the coloring film CF2R can be used as a color filter, for example. Note that a material having a function of converting the emitted light to a predetermined color light can be used for the coloring film. Specifically, quantum dots can be used for the coloring film CF2B, the coloring film CF2G, or the coloring film CF2R. Thus, display with high color purity can be achieved.

For example, a material that transmits blue light can be used for the coloring film CF2B. A material that transmits green light can be used for the coloring film CF2G. Furthermore, a material that transmits red light can be used for the coloring film CF2R. Furthermore, a material that transmits yellow light, a material that transmits white light, or the like can be used for a coloring film.

<<Light-Blocking Film BM>>

The light-blocking film BM can be formed with a material that prevents light transmission and can thus be used as a black matrix, for example.

<<Insulating Film 771>>

The insulating film 771 can be formed of polyimide, an epoxy resin, an acrylic resin, or the like, for example.

<<Functional Film 770P, Functional Film 770D>>

For example, an anti-reflection film, a polarizing film, a retardation film, a light diffusion film, a condensing film, or the like can be used as the functional film 770P or the functional film 770D.

Specifically, a film containing a dichromatic pigment can be used as the functional film 770P or the functional film 770D. Furthermore, a material having a pillar-shaped structure with an axis in a direction that intersects a surface of the substrate can be used for the functional film 770P or the functional film 770D. This makes it easy to transmit light in a direction along the axis and to scatter light in the other directions.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used as the functional film 770P. Further, a light diffusion film can be used as the functional film 770D.

<<Second Display Element 550($i, j$)B, Third Display Element 550($i, j$)G, Fourth Display Element 550($i, j$)R>>

For example, the second display element 550($i, j$)B, the third display element 550($i, j$)G, or the fourth display element 550($i, j$)R can be a light-emitting element. Specifically, an organic electroluminescent element, an inorganic electroluminescent element, a light-emitting diode, or the like can be used as the second display element 550($i, j$)B, the third display element 550($i, j$)G, or the fourth display element 550($i, j$)R.

For example, a light-emitting organic compound can be used for the layer 553($j$)B containing a light-emitting material, the layer 553($j$)G containing a light-emitting material, or the layer 553($j$)R containing a light-emitting material.

For example, quantum dots can be used for the layer 553($j$)B containing a light-emitting material, the layer 553($j$)G containing a light-emitting material, or the layer 553($j$)R containing a light-emitting material. Accordingly, the half width becomes narrow, and light of a bright color can be emitted.

For example, a layered material for emitting blue light, green light, or red light, or the like can be used for the layer 553($j$)B containing a light-emitting material, the layer 553($j$)G containing a light-emitting material, or the layer 553($j$)R containing a light-emitting material.

For example, a belt-like layered material that extends in the column direction along the signal line S2($j$) can be used for the layer 553($j$)B containing a light-emitting material. Furthermore, a belt-like layered material that extends in the column direction along the signal line S3($j$) can be used for the layer 553($j$)G containing a light-emitting material. Furthermore, a belt-like layered material that extends in the column direction along the signal line S4($j$) can be used for the layer 553($j$)R containing a light-emitting material.

Alternatively, a layered material for emitting white light can be used for the layer 553($j$)B containing a light-emitting material, the layer 553($j$)G containing a light-emitting material, or the layer 553($j$)R containing a light-emitting material. Specifically, a layered material in which a layer containing a light-emitting material including a fluorescent material that emits blue light, and a layer containing a material that is other than a fluorescent material and that emits green light and/or red light or a layer containing a material that is other than a fluorescent material and that emits yellow light are stacked can be used for the layer 553($j$)B containing a light-emitting material, the layer 553($j$)G containing a light-emitting material, or the layer 553($j$)R containing a light-emitting material.

For example, a material that can be used for the wiring or the like can be used for the third electrode 551($i, j$)B, the third electrode 551($i, j$)G, or the third electrode 551($i, j$)R.

For example, a material that transmits visible light selected from materials that can be used for the wiring or the like can be used for the third electrode 551($i, j$)B, the third electrode 551($i, j$)G, or the third electrode 551($i, j$)R.

Specifically, conductive oxide, indium-containing conductive oxide, indium oxide, indium tin oxide, indium zinc oxide, zinc oxide, zinc oxide to which gallium is added, or the like can be used for the third electrode 551($i, j$)B, the third electrode 551($i, j$)G, or the third electrode 551($i, j$)R. Alternatively, a metal film that is thin enough to transmit light can be used as the third electrode 551($i, j$)B, the third electrode 551($i, j$)G, or the third electrode 551($i, j$)R. Further alternatively, a metal film that transmits part of light and reflects another part of light can be used as the third electrode 551($i, j$)B, the third electrode 551($i, j$)G, or the third electrode 551($i, j$)R. Thus, the second display element 550($i, j$)B, the third display element 550($i, j$)G, or the fourth display element 550($i, j$)R can be provided with a microcavity structure. Consequently, light of a predetermined wavelength can be extracted more efficiently than light of the other wavelengths.

For example, a material that can be used for the wiring or the like can be used for the fourth electrode 552. Specifically, a material that reflects visible light can be used for the fourth electrode 552.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed in the same process as the semiconductor film of the transistor MB can be used.

As the transistor MD, a transistor having a different structure from the transistor that can be used as the switch SW1 can be used. Specifically, a transistor including the conductive film 524 can be used as the transistor MD (see FIG. 3B).

The conductive film 524 is provided such that the semiconductor film 508 is sandwiched between the conductive films 504 and 524. The insulating film 516 is provided between the conductive film 524 and the semiconductor film 508. The insulating film 506 is provided between the semiconductor film 508 and the conductive film 504. For example, the conductive film 524 is electrically connected to a wiring that supplies the same potential as that supplied to the conductive film 504.

Note that the transistor MD can have the same structure as the transistor MB.

<<Driver Circuit SD>>

For example, an integrated circuit can be used as the driver circuit SD. Specifically, an integrated circuit formed over a silicon substrate can be used as the driver circuit SD.

For example, the driver circuit SD can be mounted on the terminal 519B by a chip on glass (COG) method. Specifically, an anisotropic conductive film can be used to mount an integrated circuit on the terminal 519B. Alternatively, a chip on film (COF) may be used to mount an integrated circuit on the terminal 519B.

<Method for Controlling Resistivity of Oxide Semiconductor Film>

A method for controlling the resistivity of an oxide semiconductor film will be described.

An oxide semiconductor film with a certain resistivity can be used as the semiconductor film 508, the conductive film 524, or the like.

For example, a method for controlling the concentration of impurities such as hydrogen and water contained in the oxide semiconductor film and/or the oxygen vacancies in the film can be used as the method for controlling the resistivity of an oxide semiconductor film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, or Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, whereby hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, further preferably greater than or equal to $5 \times 10^{20}$ atoms/cm$^3$ can be suitably used for the conductive film 524.

Meanwhile, an oxide semiconductor with a high resistivity can be used for a semiconductor film where a channel of a transistor is formed, specifically, the semiconductor film 508.

For example, an insulating film containing oxygen, in other words, an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}$/cm$^3$, preferably lower than $1 \times 10^{11}$/cm$^3$, further preferably lower than $1 \times 10^{10}$/cm$^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1 \times 10^6$ μm and a channel length L of 10 μm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V.

The transistor in which a channel region is formed in the oxide semiconductor film that is a highly purified intrinsic or substantially highly purified intrinsic oxide semiconductor film can have a small change in electrical characteristics and high reliability.

Specifically, an oxide semiconductor whose hydrogen concentration measured by secondary ion mass spectrometry (SIMS) is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, further preferably lower than $5 \times 10^{18}$ atoms/cm$^3$, further preferably lower than or equal to $1 \times 10^{18}$ atoms/cm$^3$, further preferably lower than or equal to $5 \times 10^{17}$ atoms/cm$^3$, further preferably lower than or equal to $1 \times 10^{16}$ atoms/cm$^3$ can be favorably used as a semiconductor where a channel of a transistor is formed.

Note that an oxide semiconductor film that has a higher hydrogen concentration and/or a larger number of oxygen vacancies and that has a lower resistivity than the semiconductor film 508 is used as the conductive film 524.

A film whose hydrogen concentration is twice or more, preferably ten times or more that of the semiconductor film 508 can be used as the conductive film 524.

A film whose resistivity is greater than or equal to $1 \times 10^{-8}$ times and less than $1 \times 10^{-1}$ times that of the semiconductor film 508 can be used as the conductive film 524.

Specifically, a film whose resistivity is higher than or equal to $1 \times 10^{-3}$ Ωcm and lower than $1 \times 10^4$ Ωcm, preferably higher than or equal to $1 \times 10^{-3}$ Ωcm and lower than $1 \times 10^{-1}$ Ωcm can be used as the conductive film 524.

<Structural Example 2 of Display Panel>

Another structure of an input/output device of one embodiment of the present invention is described with reference to FIG. 25.

Figure 25:
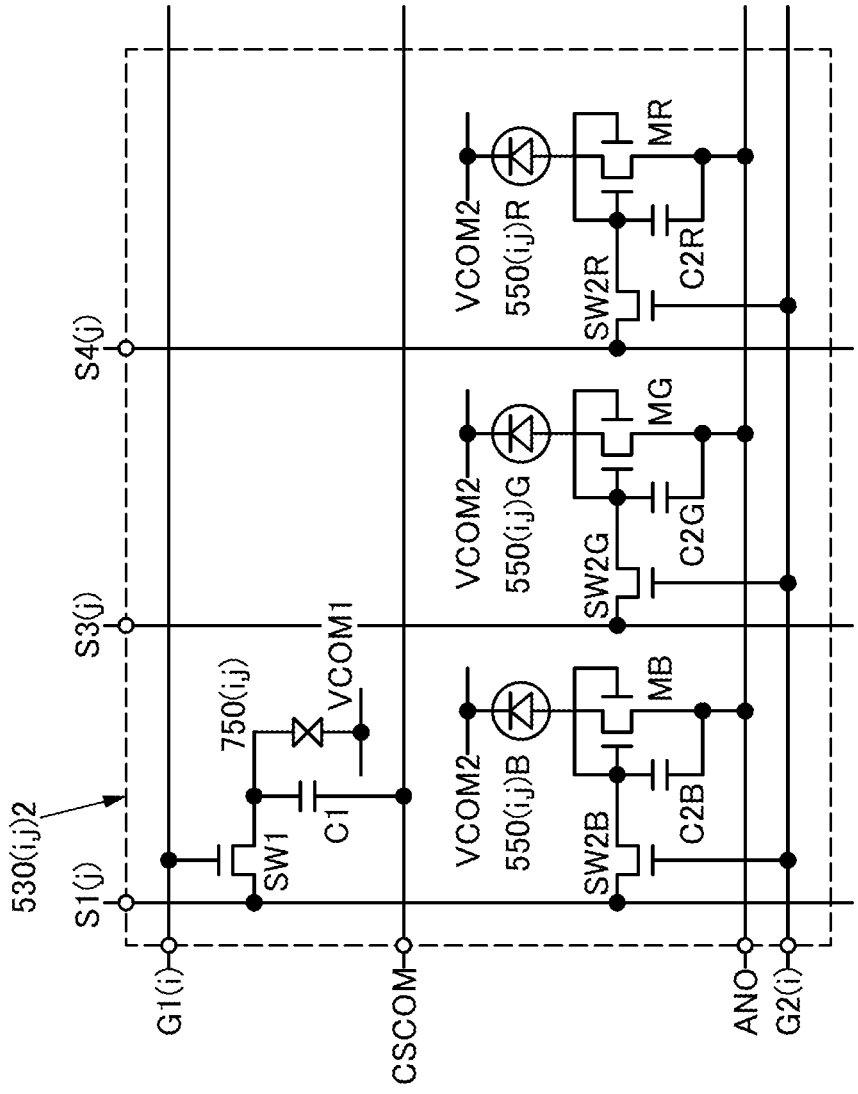
FIG. 25 is a circuit diagram illustrating a structure of a display panel of an embodiment.

FIG. 25 is a circuit diagram illustrating a structure of a pixel circuit 530(i, j)2 that can be used in a display panel of one embodiment of the present invention.

The pixel circuit 530(i, j)2 is different from the pixel circuit 530(i, j) described with reference to FIG. 5 in that a first electrode of the switch SW2B is electrically connected not to the signal line S2(j) but to the signal line S1(j).

<Structural Example 3 of Display Panel>

Another structure of an input/output device of one embodiment of the present invention is described with reference to FIG. 26.

Figure 26:
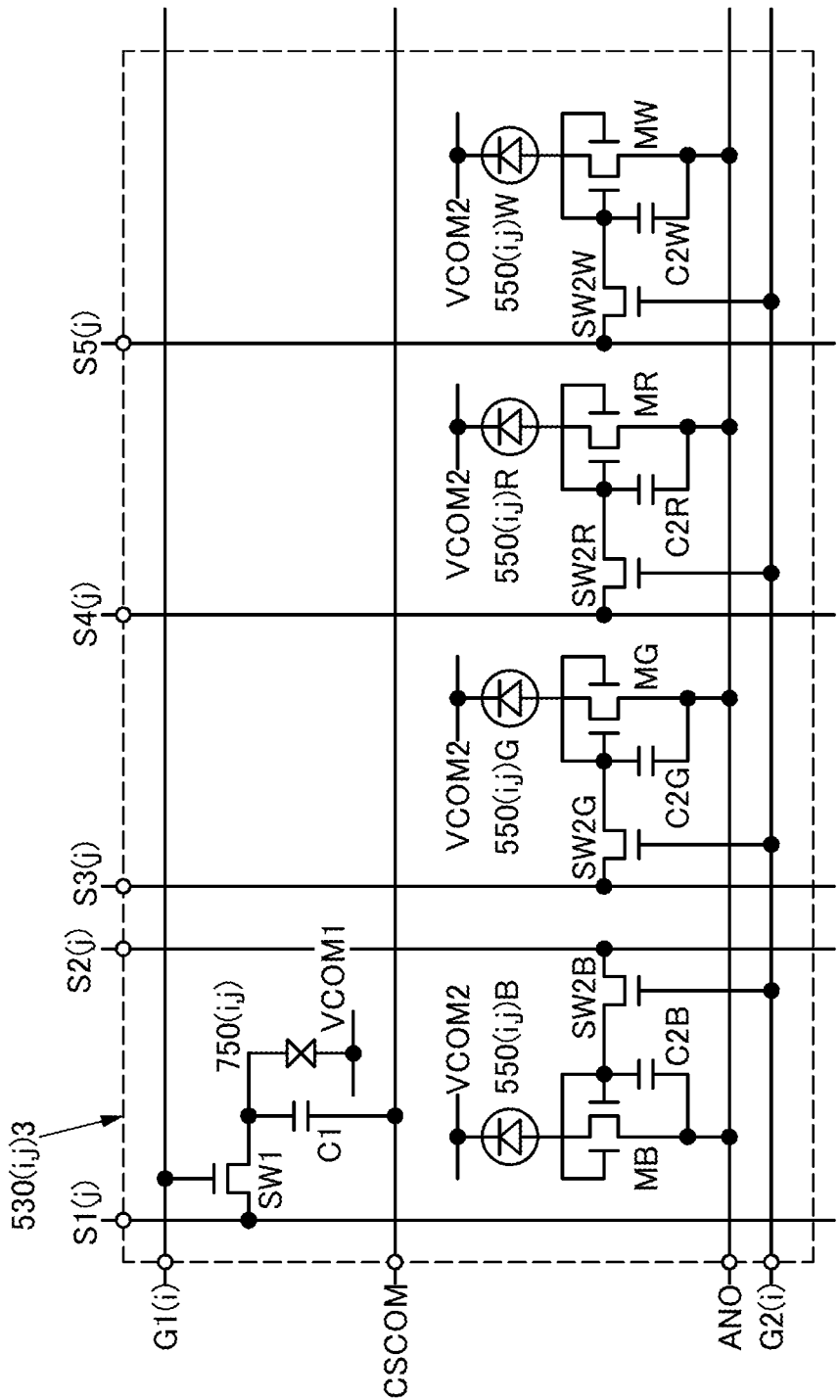
FIG. 26 is a circuit diagram illustrating a structure of a display panel of an embodiment.

FIG. 26 is a circuit diagram illustrating a structure of a pixel circuit 530(i, j)3 that can be used in a display panel of one embodiment of the present invention.

The input/output device of this structural example is different from the pixel circuit 530(i, j) described with reference to FIG. 5 in that a signal line S5(j) and a display element 550(i, j)W are included, the pixel circuit 530(i, j)3 is electrically connected to the signal line S5(j), and a switch SW2W, a transistor MW, and a capacitor C2W are included. Different structures will be described in detail below, and the above description is referred to for the other similar structures.

For example, a transistor including a gate electrode electrically connected to the scan line G2(i) and a first electrode electrically connected to the signal line S5(j) can be used as the switch SW2W.

The transistor MW includes a gate electrode electrically connected to the second electrode of the transistor used as the switch SW2W and includes a first electrode electrically connected to the wiring ANO.

The capacitor C2W includes a first electrode electrically connected to a second electrode of the transistor used as the switch SW2W and a second electrode electrically connected to the first electrode of the transistor MW.

Note that a first electrode of the display element 550(i, j)W is electrically connected to a second electrode of the transistor MW, and a second electrode of the display element 550(i, j)W is electrically connected to the wiring VCOM2. This enables the display element 550(i, j)W to be driven.

<Structural Example 4 of Display Panel>

Another structure of an input/output device of one embodiment of the present invention is described with reference to FIG. 27.

Figure 27:
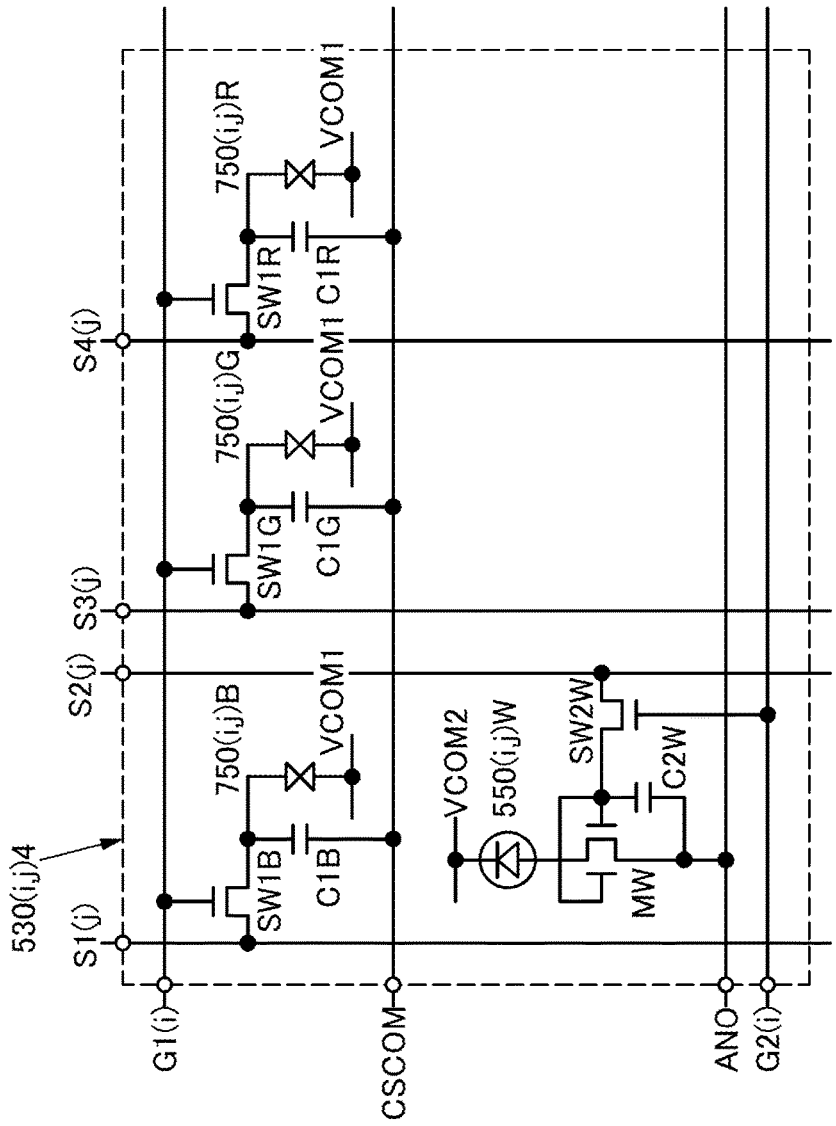
FIG. 27 is a circuit diagram illustrating a structure of a display panel of an embodiment.

FIG. 27 is a circuit diagram illustrating a structure of a pixel circuit 530(i, j)4 that can be used in a display panel of one embodiment of the present invention.

The pixel circuit of this structural example is different from the pixel circuit 530(i, j) described with reference to FIG. 5 in that the display panel includes a display element 750(i, j)B, a display element 750(i, j)G, a display element 750(i, j)R, and the display element 550(i, j)W, and that the pixel circuit 530(i, j)4 including a switch SW1B, a capacitor C1B, a switch SW1G, a capacitor C1G, a switch SW1R, a capacitor C1R, the switch SW2W, the transistor MW, and the capacitor C2W is included.

For example, a transistor including a gate electrode electrically connected to the scan line G1(i) and a first electrode electrically connected to the signal line S1(j) can be used as the switch SW1B.

For example, a transistor including a gate electrode electrically connected to the scan line G1(i) and a first electrode electrically connected to the signal line S2(j) can be used as the switch SW1G.

For example, a transistor including a gate electrode electrically connected to the scan line G1(i) and a first electrode electrically connected to the signal line S3(j) can be used as the switch SW1R.

The capacitor C1B includes a first electrode electrically connected to a second electrode of the transistor used as the switch SW1B and a second electrode electrically connected to the wiring CSCOM.

The capacitor C1G includes a first electrode electrically connected to a second electrode of the transistor used as the switch SW1G and a second electrode electrically connected to the wiring CSCOM.

The capacitor C1R includes a first electrode electrically connected to a second electrode of the transistor used as the switch SW1R and a second electrode electrically connected to the wiring CSCOM.

For example, a transistor including a gate electrode electrically connected to the scan line G2(i) and a first electrode electrically connected to the signal line S2(j) can be used as the switch SW2W.

The transistor MW includes the gate electrode electrically connected to the second electrode of the transistor used as the switch SW2W and the first electrode electrically connected to the wiring ANO.

The capacitor C2W includes a first electrode electrically connected to the second electrode of the transistor used as the switch SW2W and the second electrode electrically connected to the first electrode of the transistor MW.

Note that the first electrode of the display element 550(i, j)W is electrically connected to the second electrode of the transistor MW, and the second electrode of the display element 550(i, j)W is electrically connected to the wiring VCOM2. This enables the display element 550(i, j)W to be driven.

<Structural Example 5 of Display Panel>

Another structure of an input/output device of one embodiment of the present invention is described with reference to FIG. 28.

FIG. 28 schematically illustrates a reflective film that can be used in the display panel of one embodiment of the present invention, the arrangement of openings provided in the reflective film, and the color arrangement of light emitted from light-emitting elements toward the openings.

The reflective film is different from that described with reference to FIG. 6B1 in the color arrangement of light emitted from light-emitting elements toward the openings. Different structures will be described in detail below, and the above description is referred to for the other similar structures.

For example, a display element that emits blue light is provided so as to overlap with the opening 751HB. A display element that emits green light is provided so as to overlap with the opening 751HG. Furthermore, a display element that emits red light is provided so as to overlap with the opening 751HR.

Thus, the third display element that displays a color different from that displayed by the second display element can be provided easily near the second display element. Thus, a novel display panel that is highly convenient or reliable can be provided.

Note that this embodiment can be combined with any of the other embodiments in this specification as appropriate.

Embodiment 2

In this embodiment, a structure of an input/output device of one embodiment of the present invention is described with reference to FIGS. 7A, 7B1, and 7B2, FIGS. 8A and 8B, FIGS. 9A and 9B, and FIG. 10.

FIGS. 7A, 7B1, and 7B2 illustrate a structure of an input/output device 700TP1 of one embodiment of the present invention. FIG. 7A is a top view illustrating the input/output device 700TP1 of one embodiment of the present invention. FIG. 7B1 is a top view illustrating part of FIG. 7A, and FIG. 7B2 is a top view illustrating the part illustrated in FIG. 7B1 in which some components are omitted.

Figure 8A:
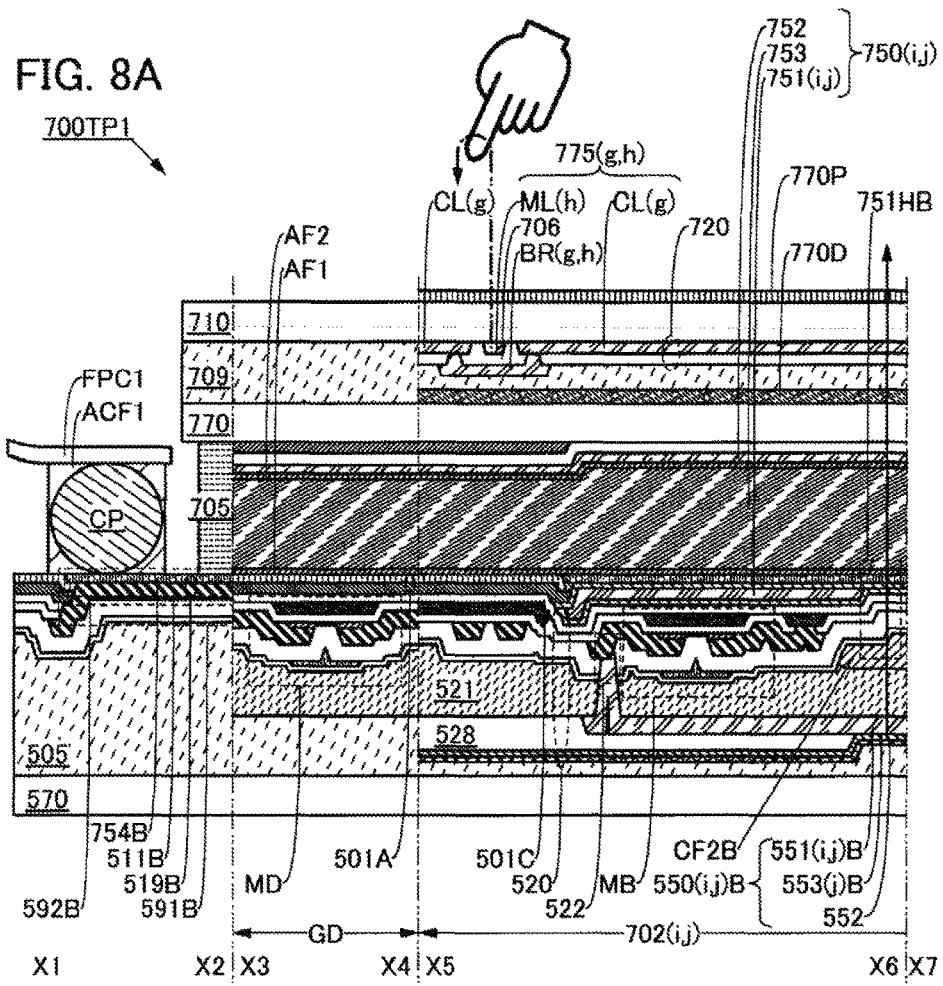
FIGS. 8A and 8B are cross-sectional views illustrating a structure of a cross section of an input/output device of an embodiment.
Figure 8B:
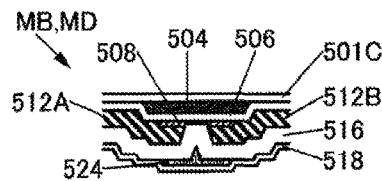

FIGS. 8A and 8B illustrate a structure of the input/output device 700TP1 of one embodiment of the present invention. FIG. 8A is a cross-sectional view taken along cutting plane lines X1-X2, X3-X4, and X5-X6 in FIG. 7A, and FIG. 8B is a cross-sectional view illustrating part of the structure of the input/output device 700TP1.

Figure 9A:
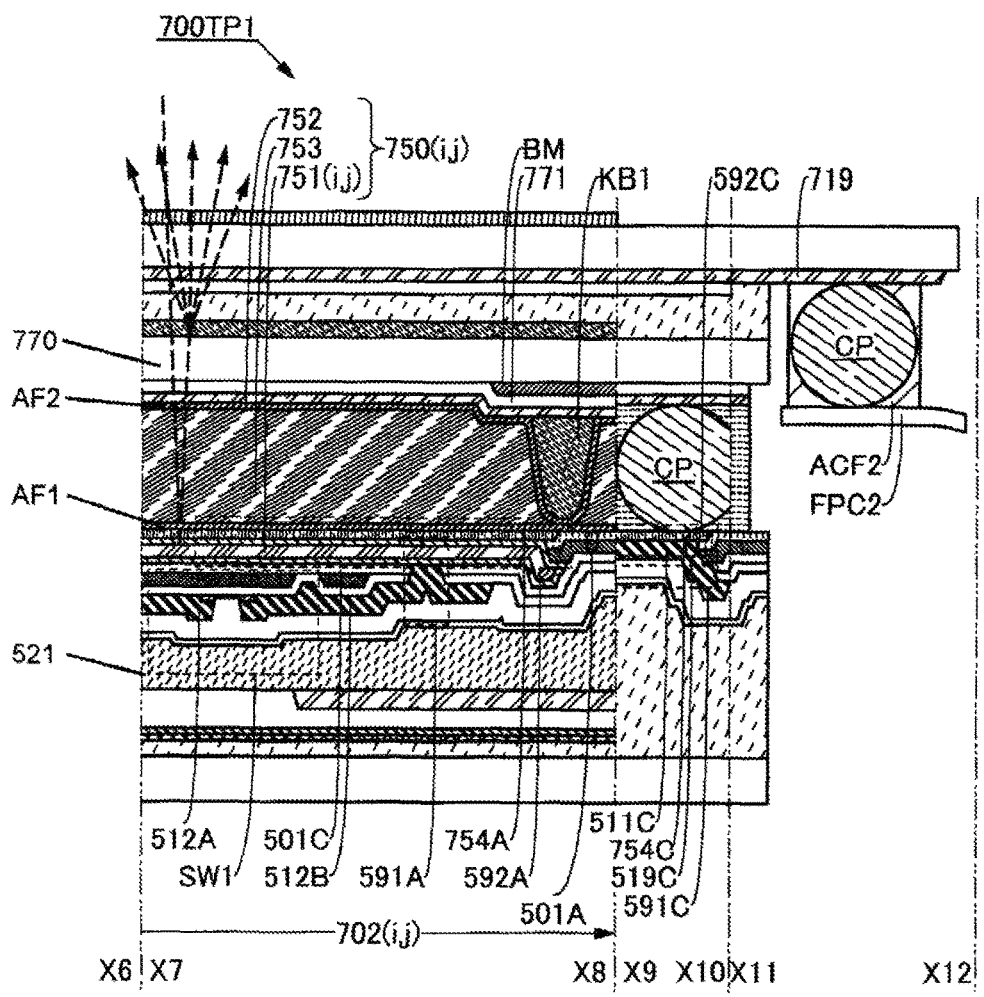
FIGS. 9A and 9B are cross-sectional views illustrating a structure of a cross section of an input/output device of an embodiment.
Figure 9B:
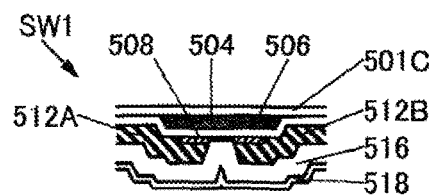

FIGS. 9A and 9B illustrate a structure of the input/output device 700TP1 of one embodiment of the present invention. FIG. 9A is a cross-sectional view taken along cutting plane lines X7-X8, X9-X10, and X11-X12 in FIG. 7A, and FIG. 9B is a cross-sectional view illustrating part of the structure of the input/output device 700TP1.

FIG. 10 is a block diagram of an input portion of an input/output device of one embodiment of the present invention.

<Structural Example 1 of Input/Output Device>

The input/output device 700TP1 described in this embodiment includes a display panel and an input portion (see FIG. 8A and FIG. 9A). For example, the display panel described in Embodiment 1 can be used for the input/output device.

The input portion includes a region overlapping with the display panel. The input portion has a function of detecting an object that comes in the vicinity of the region overlapping with the display panel. The input portion includes a control line CL(g), a signal line ML(h), and a sensing element 775(g, h) (see FIG. 8A).

The control line CL(g) extends in the row direction, and the signal line ML(h) extends in the column direction (see FIG. 10).

The sensing element 775(g, h) has a light-transmitting property. The sensing element 775(g, h) includes a first electrode C(g) electrically connected to the control line CL(g) and a second electrode M(h) electrically connected to the signal line ML(h) (see FIG. 7B2).

The second electrode M(h) is provided so that an electric field part of which is blocked by an object that comes in the vicinity of the region overlapping with the display panel is generated between the second electrode M(h) and the first electrode C(g) (see FIG. 8A and FIG. 10).

The input/output device described in this embodiment includes a sensing element that has a light-transmitting property in a region overlapping with a pixel. Thus, an object that comes in the vicinity of a region overlapping with a display panel can be detected. As a result, a novel input/output device that is highly convenient or reliable can be provided.

The input portion of the input/output device described in this embodiment includes a substrate 710 and a bonding layer 709 (see FIG. 8A).

The substrate 710 is provided so that the sensing element 775(g, h) is sandwiched between the substrate 710 and the substrate 770.

The bonding layer 709 is provided between the substrate 770 and the sensing element 775(g, h) and has a function of bonding the substrate 770 and the sensing element 775(g, h) together.

The functional film 770P is provided so that the sensing element 775(g, h) is sandwiched between the functional film 770P and the first display element 750(i, j). Thus, the intensity of light reflected by the sensing element 775(g, h) can be reduced, for example.

The input/output device described in this embodiment includes a group of sensing elements 775(g, 1) to 775(g, q) and another group of sensing elements 775(1, h) to 775(p, h) (see FIG. 10). Note that g is an integer greater than or equal to 1 and less than or equal to p, h is an integer greater than or equal to 1 and less than or equal to q, and p and q are each an integer greater than or equal to 1.

The group of sensing elements 775(g, 1) to 775(g, q) include the sensing element 775(g, h) and are provided in the row direction (the direction indicated by the arrow R in the drawing).

The another group of sensing elements 775(1, h) to 775(p, h) include the sensing element 775(g, h) and are provided in the column direction (the direction indicated by the arrow C in the drawing) that intersects the row direction.

The group of sensing elements 775(g, 1) to 775(g, q) provided in the row direction include the first electrode C(g) that is electrically connected to the control line CL(g).

The another group of sensing elements 775(1, h) to 775(p, h) provided in the column direction include the second electrode M(h) that is electrically connected to the signal line ML(h).

The control line CL(g) of the input/output device described in this embodiment includes a conductive film BR(g, h) (see FIG. 8A). The conductive film BR(g, h) includes a region overlapping with the signal line ML(h).

An insulating film 706 is provided between the signal line ML(h) and the conductive film BR(g, h). Thus, a short circuit between the signal line ML(h) and the conductive film BR(g, h) can be prevented.

The input/output device described in this embodiment includes an oscillator circuit OSC and a detection circuit DC (see FIG. 10).

The oscillator circuit OSC is electrically connected to the control line CL(g) and has a function of supplying a search signal. For example, a rectangular wave, a sawtooth wave, a triangular wave, or the like can be used as the search signal.

The detection circuit DC is electrically connected to the signal line ML(h) and has a function of supplying a search signal on the basis of a change in the potential of the signal line ML(h).

Individual components included in the input/output device are described below. Note that these components cannot be clearly distinguished and one component may also serve as another component or include part of another component.

For example, a control line electrically connected to a sensing element serves as both the control line and an electrode of the sensing element. Furthermore, a control line electrically connected to a sensing element serves as both the signal line and an electrode of the sensing element.

The input/output device is different from the display panel described in Embodiment 1 with reference to FIGS. 1A to 6C in including the input portion. Different structures will be described in detail below, and the above description is referred to for the other similar structures.

Structural Example 1

The input/output device described in this embodiment includes the display panel described in Embodiment 1, the substrate 710, and a functional layer 720 (see FIG. 7A and FIG. 8A).

The functional layer 720 includes a region between the substrate 770 and the substrate 710. The functional layer 720 includes the sensing element 775(g, h) and the insulating film 706.

The input/output device described in this embodiment also includes the bonding layer 709.

The bonding layer 709 lies between the functional layer 720 and the substrate 770 and has a function of bonding the functional layer 720 and the substrate 770 together.

The input/output device described in this embodiment also includes the terminal 719. The terminal 719 is electrically connected to the sensing element 775(g, h).

<<Substrate 710>>

A light-transmitting material can be used for the substrate 710, for example. Specifically, a material selected from the materials that can be used for the substrate 570 can be used for the substrate 710.

For example, aluminosilicate glass, tempered glass, chemically tempered glass, sapphire, or the like can be favorably used for the substrate 710 that is provided on the user side of the display panel. This can prevent damage or a crack of the display panel caused by the use thereof.

<<Sensing Element 775(g, h)>>

As the sensing element 775(g, h), an element that senses electrostatic capacitance, illuminance, magnetic force, a radio wave, pressure, or the like and supplies data based on the sensed physical value can be used, for example.

Specifically, a capacitor, a photoelectric conversion element, a magnetic sensing element, a piezoelectric element, a resonator, or the like can be used as the sensing element 775(g, h).

When a finger or the like having a higher dielectric constant than that of the air approaches a conductive film in the air, for example, electrostatic capacitance between the finger or the like and the conductive film changes. This electrostatic capacitance change can be sensed, and the sensed data can be supplied. Specifically, a self-capacitive sensing element can be used.

The first electrode C(g) and the second electrode M(h) can be used for the sensing element, for example. Specifically, the first electrode C(g) to which a search signal is supplied and the second electrode M(h) that is positioned so that an electric field part of which is blocked by an approaching object is generated between the second electrode M(h) and the first electrode C(g) can be used. Thus, the electric field that is changed when blocked by the approaching object can be sensed using the potential of the signal line ML(h), and a sensor signal can be supplied. As a result, the approaching object that blocks the electric field can be sensed. Specifically, a mutual capacitive sensing element can be used.

<<Control Line CL(g), Signal Line ML(h), Conductive Film BR(g, h)>>

For the control line CL(g), the signal line ML(h), or the conductive film BR(g, h), a material having a visible-light-transmitting property and conductivity can be used, for example.

Specifically, a material used for the second electrode 752 can be used for the control line CL(g), the signal line ML(h), or the conductive film BR(g, h).

<<Insulating Film 706>>

A material that can be used for the insulating film 521 can be used for the insulating film 706 or the like, for example. Specifically, a film containing silicon and oxygen can be used for the insulating film 706.

<<Terminal 719>>

A material that can be used for the wiring or the like can be used for the terminal 719, for example. Note that the terminal 719 can be electrically connected to a flexible printed circuit FPC2 using a conductive material ACF2, for example (see FIG. 9A).

Note that a search signal can be supplied to the control line CL(g) using the terminal 719. Alternatively, a sensor signal can be supplied from the signal line ML(h).

<<Bonding Layer 709>>

A material that can be used for the sealing material 705 can be used for the bonding layer 709, for example.

<Structure Example 2 of Input/Output Device>

Another structure of the input/output device of one embodiment of the present invention will be described with reference to FIGS. 11A, 11B1, and 11B2, FIGS. 12A and 12B, and FIG. 13.

FIGS. 11A, 11B1, and 11B2 illustrate the structure of an input/output device 700TP2 of one embodiment of the present invention. FIG. 11A is a top view of the input/output device 700TP2 of one embodiment of the present invention. FIG. 11B1 is a schematic diagram illustrating part of an input portion of the input/output device of one embodiment of the present invention. FIG. 11B2 is a schematic diagram illustrating part of FIG. 11B1.

Figure 12A:
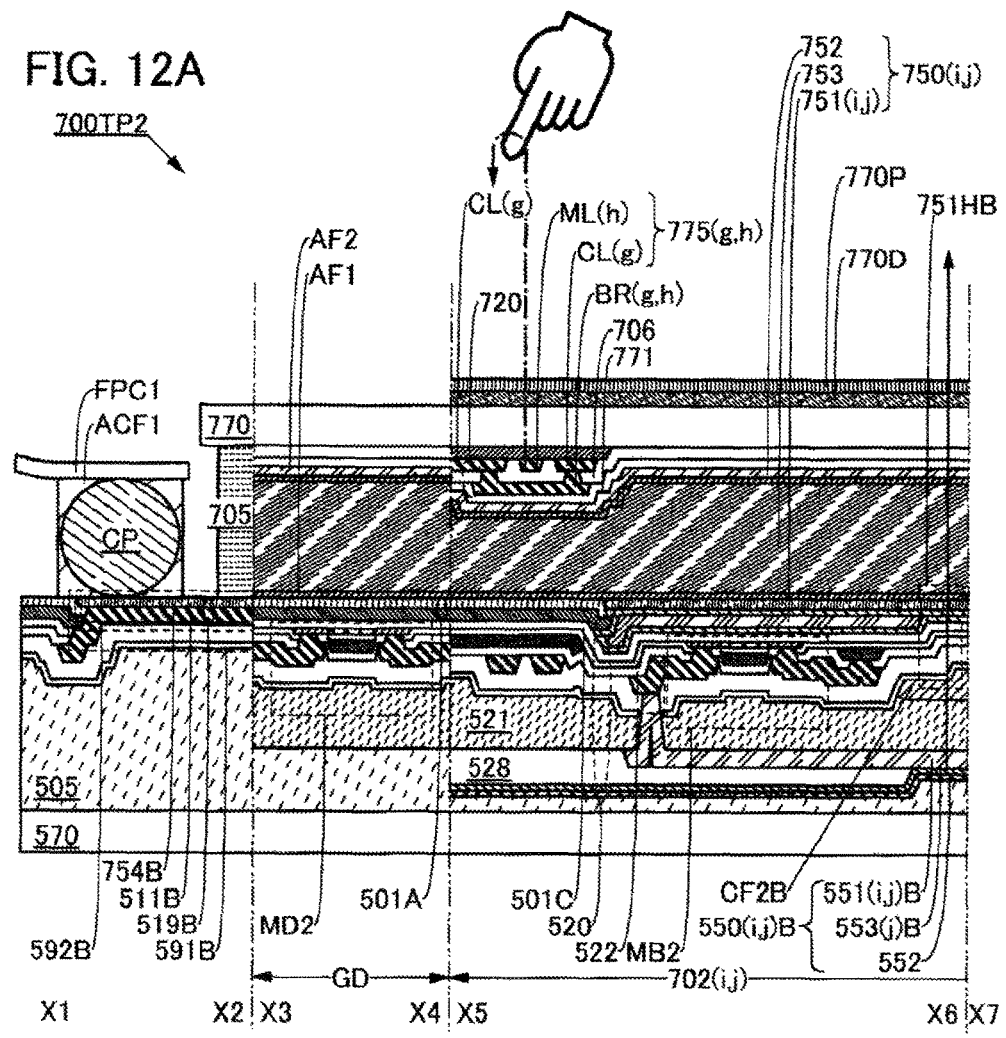
FIGS. 12A and 12B are cross-sectional views illustrating a structure of a cross section of an input/output device of an embodiment.
Figure 12B:
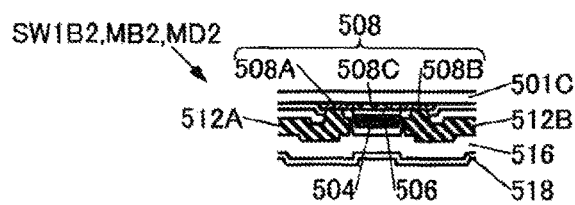

FIGS. 12A and 12B illustrate the structure of the input/output device 700TP2 of one embodiment of the present invention. FIG. 12A is a cross-sectional view taken along cutting plane lines X1-X2, X3-X4 in FIG. 11A and a cutting plane line X5-X6 in FIG. 11B2. FIG. 12B is a cross-sectional view illustrating part of the structure illustrated in FIG. 12A.

Figure 13:
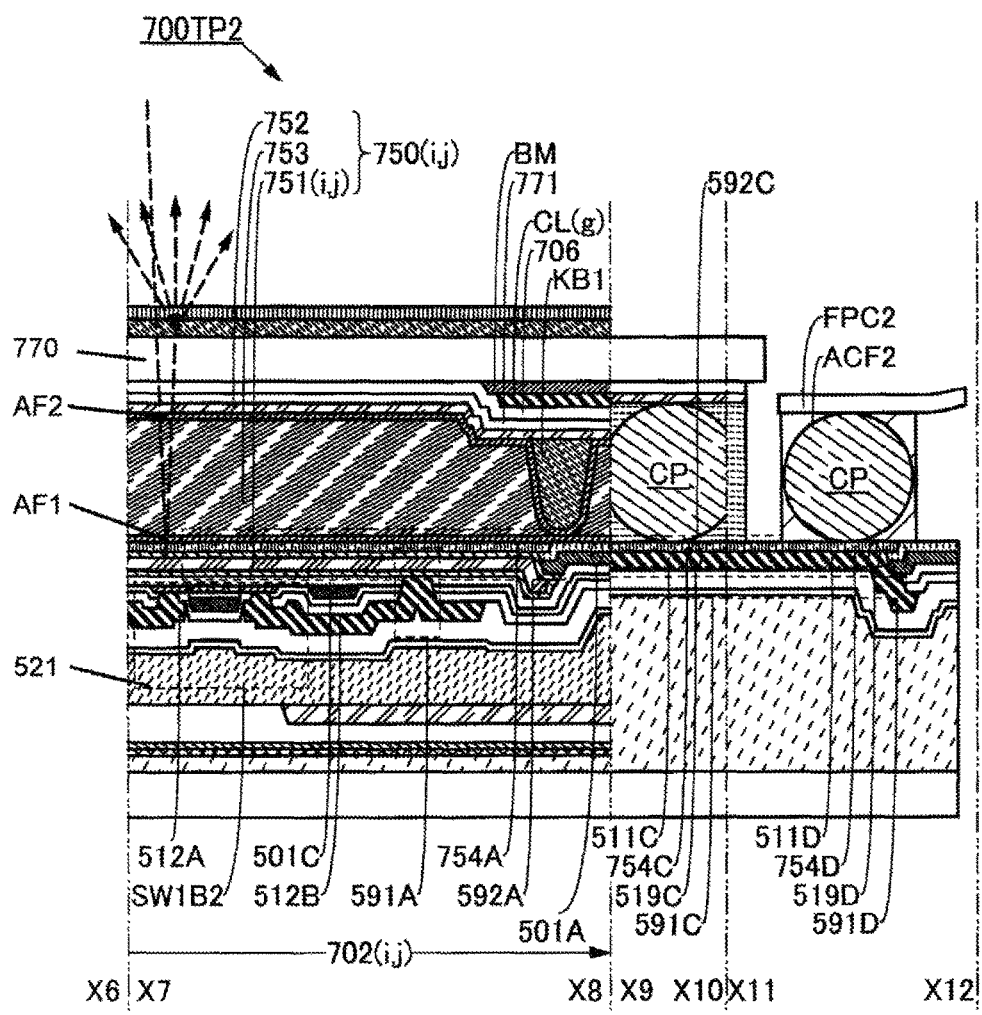
FIG. 13 is a cross-sectional view illustrating a structure of a display panel of an embodiment.

FIG. 13 illustrates the structure of the input/output device 700TP2 of one embodiment of the present invention. FIG. 13 is a cross-sectional view taken along a cutting plane line X7-X8 in FIG. 11B2 and cutting plane lines X9-X10 and X11-X12 in FIG. 11A.

Note that the input/output device 700TP2 is different from the input/output device 700TP1, which is described with reference to FIGS. 7A, 7B1, and 7B2, FIGS. 8A and 8B, FIGS. 9A and 9B, and FIGS. 10A, 10B1, and 10B2, in that a top-gate transistor is included; the functional layer 720 including the input portion is included in a region surrounded by the substrate 770, the insulating film 501C, and the sealing material 705; the first electrode C(g) including an opening in a region overlapping with the pixel is included; the second electrode M(h) including an opening in a region overlapping with the pixel is included; a conductive film 511D electrically connected to the control line CL(g) or the signal line ML(h) is included; and a terminal 519D electrically connected to the conductive film 511D is included. Here, the different portions will be described in detail, and the above description is referred to for the other similar portions.

In the input/output device 700TP2 described in this embodiment, the control line CL(g) is electrically connected to the first electrode C(g) provided with the opening, and the signal line ML(h) is electrically connected to the second electrode M(h) provided with the opening. The openings include the regions overlapping with the pixel. An opening of a conductive film included in the control line CL(g) includes a region overlapping with the pixel 702(i, j), for example (see FIGS. 11B1 and 11B2 and FIG. 12A). Note that the input/output device 700TPB further includes the light-blocking film BM between the sensing element 775(g, h) and the substrate 770 (see FIG. 8A). The light-blocking film BM has an opening in a region overlapping with the first display element 750(0. Moreover, the light-blocking film BM has a region overlapping with the sensing element 775(g,h).

In the input/output device 700TP2 described in this embodiment, the gap between the control line CL(g) and the second electrode 752 or between the signal line ML(h) and the second electrode 752 is greater than or equal to 0.2 μm and less than or equal to 16 μm, preferably greater than or equal to 1 μm and less than or equal to 8 μm, and further preferably greater than or equal to 2.5 μm and less than or equal to 4 μm.

The input/output device of one embodiment of the present invention includes the first electrode provided with the opening in the region overlapping with the pixel and the second electrode provided with the opening in the region overlapping with the pixel. Accordingly, an object that comes in the vicinity a region overlapping with the display panel can be sensed without disturbing display of the display panel. Furthermore, the thickness of the input/output device can be reduced. As a result, a novel input/output device that is highly convenient or highly reliable can be provided.

In the input/output device described in this embodiment, the functional layer 720 is provided in the region surrounded by the substrate 770, the insulating film 501C, and the sealing material 705. Thus, the input/output device can be formed without using the substrate 710 and the bonding layer 709.

The input/output device described in this embodiment includes the conductive film 511D (see FIG. 13).

Note that a conductive material CP or the like can be provided between the control line CL(g) and the conductive film 511D to electrically connect the control line CL(g) and the conductive film 511D. A conductive material or the like can be provided between the signal line ML(h) and the conductive film 511D to electrically connect the signal line ML(h) and the conductive film 511D.

The input/output device described in this embodiment also includes the terminal 519D electrically connected to the conductive film 511D. The terminal 519D is provided with the conductive film 511D and an intermediate film 754D, and the intermediate film 754D includes a region in contact with the conductive film 511D.

Note that the terminal 519D can be electrically connected to the flexible printed circuit FPC2 using the conductive material ACF2, for example (see FIG. 13). Accordingly, a search signal can be supplied to the control line CL(g) using the terminal 519D, or a sensor signal can be supplied from the signal line ML(h) using the terminal 519D, for example.
<<Conductive Film 511D>>

A material that can be used for the wiring or the like can be used for the conductive film 511D, for example.
<<Terminal 519D>>

A material that can be used for the wiring or the like can be used for the terminal 519D, for example. Specifically, the terminal 519D can have the same structure as the terminal 519B or the terminal 519C.
<<Switch SW1B2, Transistor MB2, Transistor MD2>>

A transistor that can be used as a switch SW1B2, a transistor MB2, and a transistor MD2 each include the conductive film 504 having a region overlapping with the insulating film 501C and the semiconductor film 508 having a region that lies between the insulating film 501C and the conductive film 504. Note that the conductive film 504 functions as a gate electrode (see FIG. 12B).

The semiconductor film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

The transistor MD2 includes the insulating film 506 between the third region 508C and the conductive film 504. Note that the insulating film 506 functions as a gate insulating film.

The first region 508A and the second region 508B have a lower resistivity than that of the third region 508C, and function as a source region and a drain region.

Note that, for example, the method for controlling the resistivity of an oxide semiconductor film, which is described in detail in Embodiment 1, can be used to form the first region 508A and the second region 508B in the semiconductor film 508. Specifically, plasma treatment using a gas containing a rare gas can be employed.

The conductive film 504 can be used as a mask, for example, in which case a part of the third region 508C can be self-aligned to an end portion of the conductive film 504.

The transistor MD2 includes the conductive film 512A and the conductive film 512B that are in contact with the first region 508A and the second region 508B, respectively. The conductive film 512A and the conductive film 512B function as a source electrode and a drain electrode.

A transistor that can be fabricated in the same process as the transistor MD2 can be used as the transistor MB2.

Note that this embodiment can be combined with any of the other embodiments in this specification as appropriate.

Embodiment 3

In this embodiment, the structure of a transistor that can be used for the display panel of one embodiment of the present invention is described with reference to FIGS. 14A to 14D.
<Structural Example of Semiconductor Device>

Figure 14A:
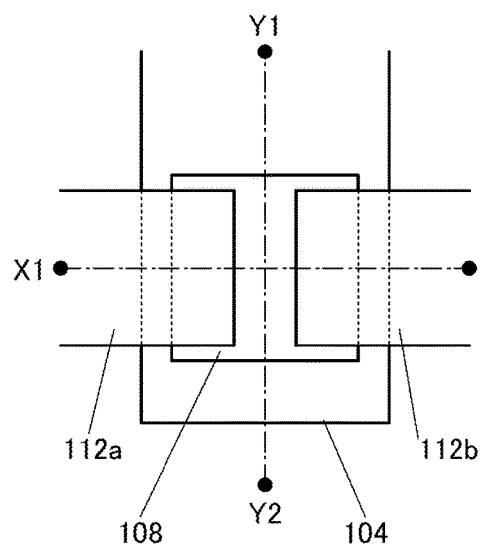
FIGS. 14A to 14D illustrate a structure of a transistor of an embodiment.

FIG. 14A is a top view of a transistor 100. FIG. 14C is a cross-sectional view taken along the cutting plane line X1-X2 in FIG. 14A. FIG. 14D is a cross-sectional view taken along the cutting plane line Y1-Y2 in FIG. 14A. Note that in FIG. 14A, some components of the transistor 100 (e.g., an insulating film serving as a gate insulating film) are not illustrated to avoid complexity. In some cases, the direction of the cutting plane line X1-X2 is referred to as a channel length direction and the direction of the cutting plane line Y1-Y2 is referred to as a channel width direction. As in FIG. 14A, some components might not be illustrated in some top views of transistors described below.

Note that the transistor 100 can be used in the display panel or the like described in Embodiment 1.

For example, when the transistor 100 is used as the switch SW1, a substrate 102, a conductive film 104, a stacked film of an insulating film 106 and an insulating film 107, an oxide semiconductor film 108, a conductive film 112a, a conductive film 112b, a stacked film of an insulating film 114 and an insulating film 116, and an insulating film 118 can be referred to as the insulating film 501C, the conductive film 504, the insulating film 506, the semiconductor film 508, the conductive film 512A, the conductive film 512B, the insulating film 516, and the insulating film 518, respectively.

The transistor 100 includes the conductive film 104 functioning as a gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108. Over the transistor 100, specifically, over the conductive films 112a and 112b and the oxide semiconductor film 108, the insulating films 114, 116, and 118 are provided. The insulating films 114, 116, and 118 function as protective insulating films for the transistor 100.

The oxide semiconductor film 108 includes an oxide semiconductor film 108a on the conductive film 104 side and an oxide semiconductor film 108b over the oxide semiconductor film 108a. The conductive film 104 serves as a gate electrode. Furthermore, the insulating films 106 and 107 function as gate insulating films of the transistor 100.

An In-M oxide (M is Ti, Ga, Sn, Y, Zr, La, Ce, Nd, or Hf) or an In-M-Zn oxide can be used for the oxide semiconductor film 108. It is particularly preferable to use an In-M-Zn oxide for the oxide semiconductor film 108.

The oxide semiconductor film 108a includes a first region in which the atomic proportion of In is larger than the atomic proportion of M. The oxide semiconductor film 108b includes a second region in which the atomic proportion of In is smaller than that in the oxide semiconductor film 108a. The second region includes a portion thinner than the first region.

The oxide semiconductor film 108a including the first region in which the atomic proportion of In is larger than that of M can increase the field-effect mobility (also simply referred to as mobility or μFE) of the transistor 100. Specifically, the field-effect mobility of the transistor 100 can exceed 10 cm²/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the oxide semiconductor film 108a including the first region in which the atomic proportion of In is larger than that of M makes it easier to change electrical characteristics of the transistor 100 in light irradiation. However, in the semiconductor device of one embodiment of the present invention, the oxide semiconductor film 108b is formed over the oxide semiconductor film 108a. In addition, the thickness of the channel region in the oxide semiconductor film 108b is smaller than the thickness of the oxide semiconductor film 108a.

Furthermore, the oxide semiconductor film 108b includes the second region in which the atomic proportion of In is smaller than that in the oxide semiconductor film 108a and thus has larger Eg than the oxide semiconductor film 108a. For this reason, the oxide semiconductor film 108 that is a layered structure of the oxide semiconductor film 108a and the oxide semiconductor film 108b has high resistance to a negative bias stress test with light irradiation.

The amount of light absorbed by the oxide semiconductor film 108 can be reduced during light irradiation. As a result, the change in electrical characteristics of the transistor 100 due to light irradiation can be reduced. In the semiconductor device of one embodiment of the present invention, the insulating film 114 or the insulating film 116 includes excess oxygen. This structure can further reduce the change in electrical characteristics of the transistor 100 due to light irradiation.

Here, the oxide semiconductor film 108 is described in detail with reference to FIG. 14B.

Figure 14B:
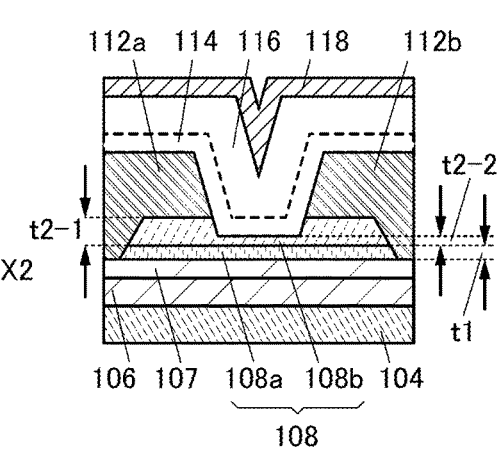
Figure 14C:
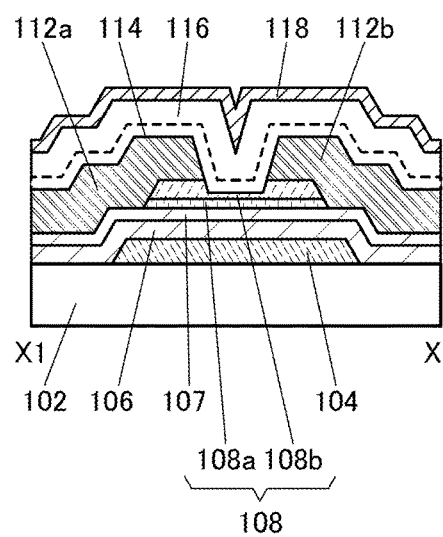
Figure 14D:
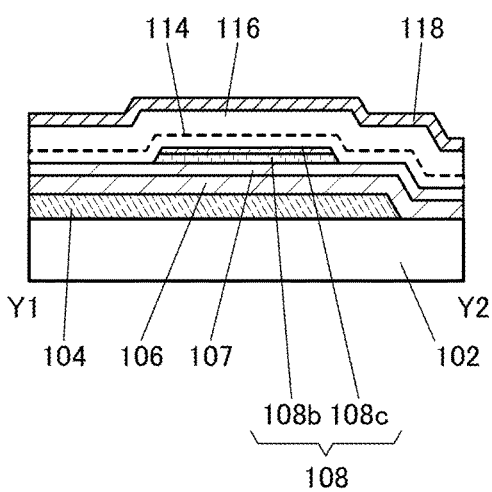

FIG. 14B is a cross-sectional enlarged view of the oxide semiconductor film 108 and the vicinity thereof in the transistor 100 illustrated in FIG. 14C.

In FIG. 14B, t1, t2-1, and t2-2 denote a thickness of the oxide semiconductor film 108a, one thickness of the oxide semiconductor film 108b, and the other thickness of the oxide semiconductor film 108b, respectively. The oxide semiconductor film 108b over the oxide semiconductor film 108a prevents the oxide semiconductor film 108a from being exposed to an etching gas, an etchant, or the like when the conductive films 112a and 112b are formed. This is why the oxide semiconductor film 108a is not or is hardly reduced in thickness. In contrast, in the oxide semiconductor film 108b, a portion not overlapping with the conductive films 112a and 112b is etched by formation of the conductive films 112a and 112b, so that a depression is formed in the etched region. In other words, a thickness of the oxide semiconductor film 108b in a region overlapping with the conductive films 112a and 112b is t2-1, and a thickness of the oxide semiconductor film 108b in a region not overlapping with the conductive films 112a and 112b is t2-2.

As for the relationships between the thicknesses of the oxide semiconductor film 108a and the oxide semiconductor film 108b, t2-1>t1>t2-2 is preferable. A transistor with the thickness relationships can have high field-effect mobility and less variation in threshold voltage in light irradiation.

When oxygen vacancies are formed in the oxide semiconductor film 108 included in the transistor 100, electrons serving as carriers are generated; as a result, the transistor 100 tends to be normally-on. Therefore, for stable transistor characteristics, it is important to reduce oxygen vacancies in the oxide semiconductor film 108, particularly oxygen vacancies in the oxide semiconductor film 108a. In the structure of the transistor of one embodiment of the present invention, excess oxygen is introduced into an insulating film over the oxide semiconductor film 108, here, the insulating film 114 and/or the insulating film 116 over the oxide semiconductor film 108, whereby oxygen is moved from the insulating film 114 and/or the insulating film 116 to the oxide semiconductor film 108 to fill oxygen vacancies in the oxide semiconductor film 108, particularly in the oxide semiconductor film 108a.

Note that it is preferable that the insulating films 114 and 116 each include a region (oxygen excess region) including oxygen in excess of that in the stoichiometric composition. In other words, the insulating films 114 and 116 are insulating films capable of releasing oxygen. Note that the oxygen excess region is formed in the insulating films 114 and 116 in such a manner that oxygen is introduced into the insulating films 114 and 116 after the deposition, for example. As a method for introducing oxygen, an ion implantation method, an ion doping method, a plasma immersion ion implantation method, plasma treatment, or the like may be employed.

In order to fill oxygen vacancies in the oxide semiconductor film 108a, the thickness of the portion including the channel region and the vicinity of the channel region in the oxide semiconductor film 108b is preferably small, and t2-2<t1 is preferably satisfied. For example, the thickness of the portion including the channel region and the vicinity of the channel region in the oxide semiconductor film 108b is preferably more than or equal to 1 nm and less than or equal to 20 nm, further preferably more than or equal to 3 nm and less than or equal to 10 nm.

Other constituent elements of the semiconductor device of this embodiment are described below in detail.

<<Substrate>>

There is no particular limitation on the property of a material and the like of the substrate 102 as long as the material has heat resistance enough to withstand at least heat treatment to be performed later. For example, a glass substrate, a ceramic substrate, a quartz substrate, or a sapphire substrate may be used as the substrate 102.

Alternatively, a single crystal semiconductor substrate or a polycrystalline semiconductor substrate of silicon or silicon carbide, a compound semiconductor substrate of silicon germanium, an SOI substrate, or the like can be used.

Alternatively, any of these substrates provided with a semiconductor element, an insulating film, or the like may be used as the substrate 102.

Note that in the case where a glass substrate is used as the substrate 102, a large substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured.

Alternatively, a flexible substrate may be used as the substrate 102, and the transistor 100 may be provided directly on the flexible substrate. Alternatively, a separation layer may be provided between the substrate 102 and the transistor 100. The separation layer can be used when part or the whole of a semiconductor device formed over the separation layer is separated from the substrate 102 and transferred onto another substrate. In such a case, the transistor 100 can be transferred to a substrate having low heat resistance or a flexible substrate as well.

<<Conductive Film Functioning as Gate Electrode, Source Electrode, and Drain Electrode>>

The conductive film 104 functioning as a gate electrode and the conductive films 112*a* and 112*b* functioning as a source electrode and a drain electrode, respectively, can each be formed using a metal element selected from chromium (Cr), copper (Cu), aluminum (Al), gold (Au), silver (Ag), zinc (Zn), molybdenum (Mo), tantalum (Ta), titanium (Ti), tungsten (W), manganese (Mn), nickel (Ni), iron (Fe), and cobalt (Co); an alloy including any of these metal elements as its component; an alloy including a combination of any of these metal elements; or the like.

Furthermore, the conductive films 104, 112*a*, and 112*b* may have a single-layer structure or a stacked-layer structure of two or more layers. For example, a single-layer structure of an aluminum film including silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order can be given. Alternatively, an alloy film or a nitride film in which aluminum and one or more elements selected from titanium, tantalum, tungsten, molybdenum, chromium, neodymium, and scandium are combined may be used.

The conductive films 104, 112*a*, and 112*b* can be formed using a light-transmitting conductive material such as indium tin oxide, indium oxide including tungsten oxide, indium zinc oxide including tungsten oxide, indium oxide including titanium oxide, indium tin oxide including titanium oxide, indium zinc oxide, or indium tin oxide to which silicon oxide is added.

A Cu—X alloy film (X is Mn, Ni, Cr, Fe, Co, Mo, Ta, or Ti) may be used for the conductive films 104, 112*a*, and 112*b*. Use of a Cu—X alloy film enables the manufacturing cost to be reduced because wet etching process can be used in the processing.

<<Insulating Film Functioning as Gate Insulating Film>>

As each of the insulating films 106 and 107 functioning as gate insulating films of the transistor 100, an insulating film including at least one of the following films formed by a plasma enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that instead of a stacked-layer structure of the insulating films 106 and 107, an insulating film of a single layer formed using a material selected from the above or an insulating film of three or more layers may be used.

The insulating film 106 has a function as a blocking film that inhibits penetration of oxygen. For example, in the case where excess oxygen is supplied to the insulating film 107, the insulating film 114, the insulating film 116, and/or the oxide semiconductor film 108, the insulating film 106 can inhibit penetration of oxygen.

Note that the insulating film 107 that is in contact with the oxide semiconductor film 108 functioning as a channel region of the transistor 100 is preferably an oxide insulating film and preferably includes a region including oxygen in excess of the stoichiometric composition (oxygen-excess region). In other words, the insulating film 107 is an insulating film capable of releasing oxygen. In order to provide the oxygen excess region in the insulating film 107, the insulating film 107 is formed in an oxygen atmosphere, for example. Alternatively, the oxygen excess region may be formed by introduction of oxygen into the insulating film 107 after the deposition. As a method for introducing oxygen, an ion implantation method, an ion doping method, a plasma immersion ion implantation method, plasma treatment, or the like may be employed.

In the case where hafnium oxide is used for the insulating film 107, the following effect is attained. Hafnium oxide has a higher dielectric constant than silicon oxide and silicon oxynitride. Therefore, by using hafnium oxide, the thickness of the insulating film 107 can be made large as compared with the case where silicon oxide is used; thus, leakage current due to tunnel current can be low. That is, it is possible to provide a transistor with a low off-state current. Moreover, hafnium oxide with a crystalline structure has higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited thereto.

In this embodiment, a silicon nitride film is formed as the insulating film 106, and a silicon oxide film is formed as the insulating film 107. The silicon nitride film has a higher dielectric constant than a silicon oxide film and needs a larger thickness for electrostatic capacitance equivalent to that of the silicon oxide film. Thus, when the silicon nitride film is included in the gate insulating film of the transistor 100, the physical thickness of the insulating film can be increased. This makes it possible to reduce a decrease in withstand voltage of the transistor 100 and furthermore to increase the withstand voltage, thereby reducing electrostatic discharge damage to the transistor 100.

<<Oxide Semiconductor Film>>

The oxide semiconductor film 108 can be formed using the materials described above.

In the case where the oxide semiconductor film 108 includes In-M-Zn oxide, it is preferable that the atomic ratio of metal elements of a sputtering target used for forming the In-M-Zn oxide satisfy In≥M and Zn≥M. As the atomic ratio of metal elements of such a sputtering target, In:M:Zn=1:1:1, In:M:Zn=1:1:1.2, In:M:Zn=2:1:3, In:M:Zn=3:1:2, and InM:Zn=4:2:4.1 are preferable.

In the case where the oxide semiconductor film 108 includes In-M-Zn oxide, it is preferable to use a target including polycrystalline In-M-Zn oxide as the sputtering target. The use of the target including polycrystalline In-M-Zn oxide facilitates formation of the oxide semiconductor film 108 having crystallinity. Note that the atomic ratios of metal elements in the formed oxide semiconductor film 108 vary from the above atomic ratio of metal elements of the sputtering target within a range of ±40% as an error. For example, when a sputtering target with an atomic ratio of In to Ga and Zn of 4:2:4.1 is used, the atomic ratio of In to Ga and Zn in the formed oxide semiconductor film 108 may be 4:2:3 or in the vicinity of 4:2:3.

The oxide semiconductor film 108a can be formed using the sputtering target having an atomic ratio of InM:Zn=2:1:3, InM:Zn=3:1:2, or In:M:Zn=4:2:4.1. The oxide semiconductor film 108b can be formed using the sputtering target having an atomic ratio of InM:Zn=1:1:1 or In:M:Zn=1:1:1.2. Note that the atomic ratio of metal elements in a sputtering target used for forming the oxide semiconductor film 108b does not necessarily satisfy In M and Zn and may satisfy In M and Zn<M, such as In:M:Zn=1:3:2.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the oxide semiconductor film 108a, and an oxide semiconductor film having an energy gap more than or equal to 2.5 eV and less than or equal to 3.5 eV is preferably used as the oxide semiconductor film 108b. Furthermore, the oxide semiconductor film 108b preferably has a higher energy gap than that of the oxide semiconductor film 108a.

Each thickness of the oxide semiconductor film 108a and the oxide semiconductor film 108b is more than or equal to 3 nm and less than or equal to 200 nm, preferably more than or equal to 3 nm and less than or equal to 100 nm, further preferably more than or equal to 3 nm and less than or equal to 50 nm. Note that the above-described thickness relationships between them are preferably satisfied.

An oxide semiconductor film with low carrier density is used as the oxide semiconductor film 108b. For example, the carrier density of the oxide semiconductor film 108b is lower than or equal to $1\times10^{17}$/cm$^3$, preferably lower than or equal to $1\times10^{15}$/cm$^3$, further preferably lower than or equal to $1\times10^{13}$/cm$^3$, still further preferably lower than or equal to $1\times10^{11}$/cm$^3$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor film 108a and the oxide semiconductor film 108b be set to be appropriate.

Note that it is preferable to use, as the oxide semiconductor film 108a and the oxide semiconductor film 108b, an oxide semiconductor film in which the impurity concentration is low and the density of defect states is low, in which case the transistor can have more excellent electrical characteristics. Here, the state in which the impurity concentration is low and the density of defect states is low (the number of oxygen vacancies is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1\times10^6$ μm and a channel length L of 10 μm, the off-state current can be less than or equal to the measurement limit of a semiconductor parameter analyzer, that is, less than or equal to $1\times10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, alkaline earth metal, and the like are given.

Hydrogen included in the oxide semiconductor film reacts with oxygen bonded to a metal atom to be water, and also causes oxygen vacancies in a lattice from which oxygen is released (or a portion from which oxygen is released). Due to entry of hydrogen into the oxygen vacancies, electrons serving as carriers are generated in some cases. Furthermore, in some cases, bonding of part of hydrogen to oxygen bonded to a metal atom causes generation of electrons serving as carriers. Thus, a transistor including an oxide semiconductor film that contains hydrogen is likely to be normally on. Accordingly, it is preferable that hydrogen be reduced as much as possible in the oxide semiconductor film 108. Specifically, in the oxide semiconductor film 108, the concentration of hydrogen that is measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, and further preferably lower than or equal to $1\times10^{16}$ atoms/cm$^3$.

When silicon or carbon that is one of elements belonging to Group 14 is included in the oxide semiconductor film 108a, oxygen vacancies are increased in the oxide semiconductor film 108a, and the oxide semiconductor film 108a becomes an n-type film. Thus, the concentration of silicon or carbon (the concentration is measured by SIMS) in the oxide semiconductor film 108a or the concentration of silicon or carbon (the concentration is measured by SIMS) in the vicinity of an interface with the oxide semiconductor film 108a is set to be lower than or equal to $2\times10^{18}$ atoms/cm$^3$, preferably lower than or equal to $2\times10^{17}$ atoms/cm$^3$.

In addition, the concentration of alkali metal or alkaline earth metal of the oxide semiconductor film 108a, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the oxide semiconductor film 108a.

Furthermore, when including nitrogen, the oxide semiconductor film 108a easily becomes n-type by generation of electrons serving as carriers and an increase of carrier density. Thus, a transistor including an oxide semiconductor film that contains nitrogen is likely to have normally-on characteristics. For this reason, nitrogen in the oxide semiconductor film is preferably reduced as much as possible;

the concentration of nitrogen that is measured by SIMS is preferably set to be, for example, lower than or equal to $5\times10^{18}$ atoms/cm$^3$.

Each of the oxide semiconductor films 108a and 108b may have a non-single-crystal structure. The non-single crystal structure includes a c-axis aligned crystalline oxide semiconductor (CAAC-OS), a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Film Functioning as Protective Insulating Film of Transistor>>

The insulating films 114 and 116 each have a function of supplying oxygen to the oxide semiconductor film 108. The insulating film 118 has a function as a protective insulating film of the transistor 100. The insulating films 114 and 116 include oxygen. Furthermore, the insulating film 114 is an insulating film that can transmit oxygen. The insulating film 114 also functions as a film that relieves damage to the oxide semiconductor film 108 at the time of forming the insulating film 116 in a later step.

A silicon oxide film, a silicon oxynitride film, or the like with a thickness greater than or equal to 5 nm and less than or equal to 150 nm, preferably greater than or equal to 5 nm and less than or equal to 50 nm can be used as the insulating film 114.

In addition, it is preferable that the number of defects in the insulating film 114 be small and typically, the spin density corresponding to a signal that appears at g=2.001 due to a dangling bond of silicon be lower than or equal to $3\times10^{17}$ spins/cm$^3$ by electron spin resonance (ESR) measurement. This is because if the density of defects in the insulating film 114 is high, oxygen is bonded to the defects and the amount of oxygen that transmits the insulating film 114 is decreased.

Note that all oxygen entering the insulating film 114 from the outside does not move to the outside of the insulating film 114 and some oxygen remains in the insulating film 114. Furthermore, movement of oxygen occurs in the insulating film 114 in some cases in such a manner that oxygen enters the insulating film 114 and oxygen included in the insulating film 114 moves to the outside of the insulating film 114. When an oxide insulating film that can transmit oxygen is formed as the insulating film 114, oxygen released from the insulating film 116 provided over the insulating film 114 can be moved to the oxide semiconductor film 108 through the insulating film 114.

Note that the insulating film 114 can be formed using an oxide insulating film having a low density of states due to nitrogen oxide. Note that the density of states due to nitrogen oxide can be formed between the energy of the valence band maximum ($E_{v\_os}$) and the energy of the conduction band minimum ($E_{c\_os}$) of the oxide semiconductor film. A silicon oxynitride film that releases less nitrogen oxide, an aluminum oxynitride film that releases less nitrogen oxide, and the like can be used as the above oxide insulating film.

Note that a silicon oxynitride film that releases less nitrogen oxide is a film of which the amount of released ammonia is larger than the amount of released nitrogen oxide in thermal desorption spectroscopy (TDS) analysis; the amount of released ammonia is typically greater than or equal to $1\times10^{18}$/cm$^3$ and less than or equal to $5\times10^{19}$/cm$^3$. Note that the amount of released ammonia is the amount of ammonia released by heat treatment with which the surface temperature of a film becomes higher than or equal to 50° C. and lower than or equal to 650° C., preferably higher than or equal to 50° C. and lower than or equal to 550° C.

Nitrogen oxide (NO$_x$; x is greater than 0 and less than or equal to 2, preferably greater than or equal to 1 and less than or equal to 2), typically NO$_2$ or NO, forms levels in the insulating film 114, for example. The level is positioned in the energy gap of the oxide semiconductor film 108. Therefore, when nitrogen oxide is diffused to the interface between the insulating film 114 and the oxide semiconductor film 108, an electron is in some cases trapped by the level on the insulating film 114 side. As a result, the trapped electron remains in the vicinity of the interface between the insulating film 114 and the oxide semiconductor film 108; thus, the threshold voltage of the transistor is shifted in the positive direction.

Nitrogen oxide reacts with ammonia and oxygen in heat treatment. Since nitrogen oxide included in the insulating film 114 reacts with ammonia included in the insulating film 116 in heat treatment, nitrogen oxide included in the insulating film 114 is reduced. Therefore, an electron is hardly trapped at the vicinity of the interface between the insulating film 114 and the oxide semiconductor film 108.

By using such an oxide insulating film, the insulating film 114 can reduce the shift in the threshold voltage of the transistor, which leads to a smaller change in the electrical characteristics of the transistor.

Note that in an ESR spectrum at 100 K or lower of the insulating film 114, by heat treatment of a manufacturing process of the transistor, typically heat treatment at a temperature higher than or equal to 300° C. and lower than 350° C., a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals that are obtained by ESR measurement using an X-band are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is lower than $1\times10^{18}$ spins/cm$^3$, typically higher than or equal to $1\times10^{17}$ spins/cm$^3$ and lower than $1\times10^{18}$ spins/cm$^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide (NO$_x$; x is greater than 0 and less than or equal to 2, preferably greater than or equal to 1 and less than or equal to 2). Typical examples of nitrogen oxide include nitrogen monoxide and nitrogen dioxide. In other words, the lower the total spin density of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is, the lower the content of nitrogen oxide in the oxide insulating film is.

The concentration of nitrogen of the above oxide insulating film measured by SIMS is lower than or equal to $6\times10^{20}$ atoms/cm$^3$.

The above oxide insulating film is formed by a PECVD method at a film surface temperature higher than or equal to 220° C. and lower than or equal to 350° C. using silane and dinitrogen monoxide, whereby a dense and hard film can be formed.

The insulating film 116 is formed using an oxide insulating film that contains oxygen in excess of that in the stoichiometric composition. Part of oxygen is released by heating from the oxide insulating film including oxygen in excess of that in the stoichiometric composition. The oxide insulating film including oxygen in excess of that in the stoichiometric composition is an oxide insulating film of which the amount of released oxygen converted into oxygen atoms is greater than or equal to $1.0\times10^{19}$ atoms/cm$^3$, preferably greater than or equal to $3.0\times10^{20}$ atoms/cm$^3$ in TDS analysis. Note that the temperature of the film surface in the TDS analysis is preferably higher than or equal to 100° C. and lower than or equal to 700° C., or higher than or equal to 100° C. and lower than or equal to 500° C.

A silicon oxide film, a silicon oxynitride film, or the like with a thickness greater than or equal to 30 nm and less than or equal to 500 nm, preferably greater than or equal to 50 nm and less than or equal to 400 nm can be used as the insulating film 116.

It is preferable that the number of defects in the insulating film 116 be small, and typically the spin density corresponding to a signal that appears at g=2.001 due to a dangling bond of silicon be lower than $1.5\times10^{18}$ spins/cm$^3$, preferably lower than or equal to $1\times10^{18}$ spins/cm$^3$ by ESR measurement. Note that the insulating film 116 is provided more apart from the oxide semiconductor film 108 than the insulating film 114 is; thus, the insulating film 116 may have higher density of defects than the insulating film 114.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114 may be employed.

The insulating film 118 includes nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118. A nitride insulating film, for example, can be used as the insulating film 118. The nitride insulating film is formed using silicon nitride, silicon nitride oxide, aluminum nitride, aluminum nitride oxide, or the like. Note that instead of the nitride insulating film having a blocking effect against oxygen, hydrogen, water, alkali metal, alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and the like can be given.

Although the variety of films such as the conductive films, the insulating films, and the oxide semiconductor films that are described above can be formed by a sputtering method or a PECVD method, such films may be formed by another method, e.g., a thermal chemical vapor deposition (CVD) method. Examples of the thermal CVD method include a metal organic chemical vapor deposition (MOCVD) method and an atomic layer deposition (ALD) method.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated a plurality of times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is In(CH$_3$)$_3$. The chemical formula of trimethylgallium is Ga(CH$_3$)$_3$. The chemical formula of dimethylzinc is Zn(CH$_3$)$_2$. Without limitation to the above combination, triethylgallium (chemical formula: Ga(C$_2$H$_5$)$_3$) can be used instead of trimethylgallium and diethylzinc (chemical formula: Zn(C$_2$H$_5$)$_2$) can be used instead of dimethylzinc.

For example, in the case where a hafnium oxide film is formed by a deposition apparatus using an ALD method, two kinds of gases, that is, ozone (O$_3$) as an oxidizer and a source gas that is obtained by vaporizing liquid containing a solvent and a hafnium precursor compound (e.g., a hafnium alkoxide or a hafnium amide such as tetrakis(dimethylamide)hafnium (TDMAH)) are used. Note that the chemical formula of tetrakis(dimethylamide)hafnium is Hf[N(CH$_3$)$_2$]$_4$. Examples of another material liquid include tetrakis(ethylmethylamide)hafnium.

For example, in the case where an aluminum oxide film is formed by a deposition apparatus using an ALD method, two kinds of gases, e.g., H$_2$O as an oxidizer and a source gas that is obtained by vaporizing liquid containing a solvent and an aluminum precursor compound (e.g., trimethylaluminum (TMA)) are used. Note that the chemical formula of trimethylaluminum is Al(CH$_3$)$_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., O$_2$ or dinitrogen monoxide) are supplied to react with the adsorbate.

For example, in the case where a tungsten film is formed using a deposition apparatus using an ALD method, a WF$_6$ gas and a B$_2$H$_6$ gas are sequentially introduced a plurality of times to form an initial tungsten film, and then a WF$_6$ gas and an H$_2$ gas are used, so that a tungsten film is formed. Note that a SiH$_4$ gas may be used instead of a B$_2$H$_6$ gas.

For example, in the case where an oxide semiconductor film, e.g., an In—Ga—Zn—O film is formed using a deposition apparatus using an ALD method, an In(CH$_3$)$_3$ gas and an O$_3$ gas are sequentially introduced a plurality of times to form an InO layer, a GaO layer is formed using a Ga(CH$_3$)$_3$ gas and an O$_3$ gas, and then a ZnO layer is formed using a Zn(CH$_3$)$_2$ gas and an O$_3$ gas. Note that the order of these layers is not limited to this example. A mixed compound layer such as an In—Ga—O layer, an In—Zn—O layer, or a Ga—Zn—O layer may be formed by mixing these gases. Note that although an H$_2$O gas that is obtained by bubbling water with an inert gas such as Ar may be used instead of an O$_3$ gas, it is preferable to use an O$_3$ gas, which does not contain H. Furthermore, instead of an In(CH$_3$)$_3$ gas, an In(C$_2$H$_5$)$_3$ gas may be used. Instead of a Ga(CH$_3$)$_3$ gas, a Ga(C$_2$H$_5$)$_3$ gas may be used. Furthermore, a Zn(CH$_3$)$_2$ gas may be used.

Note that this embodiment can be combined with any of the other embodiments in this specification as appropriate.

Embodiment 4

In this embodiment, the structure of a transistor that can be used in the display panel of one embodiment of the present invention is described with reference to FIGS. 15A to 15C.

<Structural Example of Semiconductor Device>

Figure 15A:
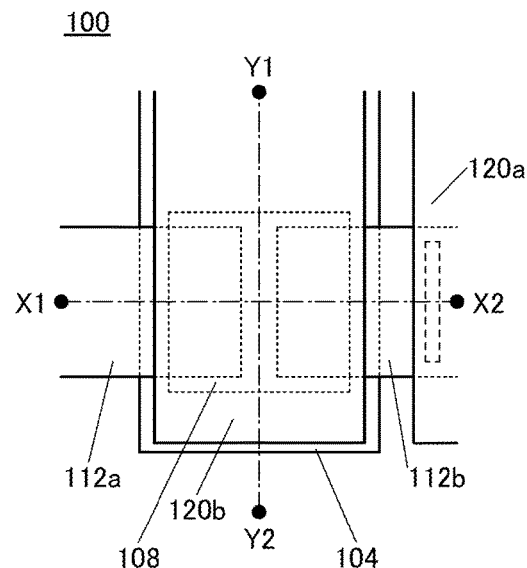
FIGS. 15A to 15C illustrate a structure of a transistor of an embodiment.
Figure 15B:
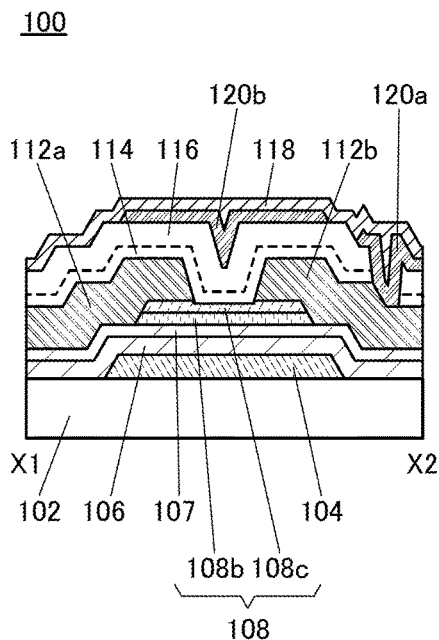
Figure 15C:
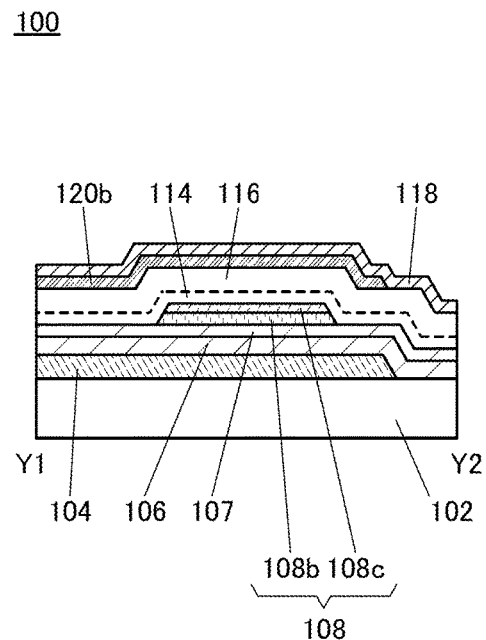

FIG. 15A is a top view of the transistor 100. FIG. 15B is a cross-sectional view taken along the cutting plane line X1-X2 in FIG. 15A. FIG. 15C is a cross-sectional view taken along the cutting plane line Y1-Y2 in FIG. 15A. Note that in FIG. 15A, some components of the transistor 100 (e.g., an insulating film serving as a gate insulating film) are not illustrated to avoid complexity. Furthermore, the direction of the cutting plane line X1-X2 may be called a channel length direction, and the direction of the cutting plane line Y1-Y2 may be called a channel width direction. As in FIG. 15A, some components are not illustrated in some cases in top views of transistors described below.

The transistor 100 can be used for the display panel or the like described in Embodiment 1.

For example, when the transistor 100 is used as the transistor MB or the transistor MD, the substrate 102, the conductive film 104, a stacked film of the insulating film 106 and the insulating film 107, the oxide semiconductor film 108, the conductive film 112a, the conductive film 112b, a stacked film of the insulating film 114 and the insulating film 116, the insulating film 118, and a conductive film 120b can be referred to as the insulating film 501C, the conductive film 504, the insulating film 506, the semiconductor film 508, the conductive film 512A, the conductive film 512B, the insulating film 516, the insulating film 518, and the conductive film 524, respectively.

The transistor 100 includes the conductive film 104 functioning as a first gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108, the insulating films 114 and 116 over the oxide semiconductor film 108 and the conductive films 112a and 112b, a conductive film 120a that is over the insulating film 116 and electrically connected to the conductive film 112b, the conductive film 120b over the insulating film 116, and the insulating film 118 over the insulating film 116 and the conductive films 120a and 120b.

The insulating films 106 and 107 function as a first gate insulating film of the transistor 100. The insulating films 114 and 116 function as a second gate insulating film of the transistor 100. The insulating film 118 functions as a protective insulating film of the transistor 100.

The conductive film 120b can be used as a second gate electrode of the transistor 100.

In the case where the transistor 100 is used in a display panel, the conductive film 120a can be used as an electrode of a display element, or the like.

The oxide semiconductor film 108 includes the oxide semiconductor film 108b (on the conductive film 104 side) that functions as a first gate electrode, and an oxide semiconductor film 108c over the oxide semiconductor film 108b. The oxide semiconductor films 108b and 108c contain In, M (M is Al, Ga, Y, or Sn), and Zn.

The oxide semiconductor film 108b preferably includes a region in which the atomic proportion of In is larger than the atomic proportion of M, for example. The oxide semiconductor film 108c preferably includes a region in which the atomic proportion of In is smaller than that in the oxide semiconductor film 108b.

The oxide semiconductor film 108b including the region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs, preferably exceed 30 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the oxide semiconductor film 108b including the region in which the atomic proportion of In is larger than that of M makes it easier to change electrical characteristics of the transistor 100 in light irradiation. However, in the semiconductor device of one embodiment of the present invention, the oxide semiconductor film 108c is formed over the oxide semiconductor film 108b. Furthermore, the oxide semiconductor film 108c including the region in which the atomic proportion of In is smaller than that in the oxide semiconductor film 108b has larger Eg than the oxide semiconductor film 108b. For this reason, the oxide semiconductor film 108 that is a layered structure of the oxide semiconductor film 108b and the oxide semiconductor film 108c has high resistance to a negative bias stress test with light irradiation.

Impurities such as hydrogen or moisture entering the channel region of the oxide semiconductor film 108, particularly the oxide semiconductor film 108b adversely affect the transistor characteristics and therefore cause a problem. Moreover, it is preferable that the amount of impurities such as hydrogen or moisture in the channel region of the oxide semiconductor film 108b be as small as possible. Furthermore, oxygen vacancies formed in the channel region in the oxide semiconductor film 108b adversely affect the transistor characteristics and therefore cause a problem. For example, oxygen vacancies formed in the channel region in the oxide semiconductor film 108b are bonded to hydrogen to serve as a carrier supply source. The carrier supply source generated in the channel region in the oxide semiconductor film 108b causes a change in the electrical characteristics, typically, shift in the threshold voltage, of the transistor 100 including the oxide semiconductor film 108b. Therefore, it is preferable that the amount of oxygen vacancies in the channel region of the oxide semiconductor film 108b be as small as possible.

In view of this, one embodiment of the present invention is a structure in which insulating films in contact with the oxide semiconductor film 108, specifically the insulating film 107 formed under the oxide semiconductor film 108 and the insulating films 114 and 116 formed over the oxide semiconductor film 108 include excess oxygen. Oxygen or excess oxygen is transferred from the insulating film 107 and the insulating films 114 and 116 to the oxide semiconductor film 108, whereby the oxygen vacancies in the oxide semiconductor film can be reduced. As a result, a change in electrical characteristics of the transistor 100, particularly a change in the transistor 100 due to light irradiation, can be reduced.

In one embodiment of the present invention, a manufacturing method is used in which the number of manufacturing steps is not increased or an increase in the number of manufacturing steps is extremely small, because the insulating film 107 and the insulating films 114 and 116 are made to contain excess oxygen. Thus, the transistors 100 can be manufactured with high yield.

Specifically, in a step of forming the oxide semiconductor film 108b, the oxide semiconductor film 108b is formed by a sputtering method in an atmosphere containing an oxygen gas, whereby oxygen or excess oxygen is added to the insulating film 107 over which the oxide semiconductor film 108b is formed.

Furthermore, in a step of forming the conductive films 120a and 120b, the conductive films 120a and 120b are formed by a sputtering method in an atmosphere containing an oxygen gas, whereby oxygen or excess oxygen is added to the insulating film 116 over which the conductive films 120a and 120b are formed. Note that in some cases, oxygen or excess oxygen is added also to the insulating film 114 and the oxide semiconductor film 108 under the insulating film 116 when oxygen or excess oxygen is added to the insulating film 116.

<Oxide Conductor>

Next, an oxide conductor is described. In a step of forming the conductive films 120a and 120b, the conductive films 120a and 120b serve as a protective film for suppressing release of oxygen from the insulating films 114 and 116. The conductive films 120a and 120b serve as semiconductors before a step of forming the insulating film 118 and serve as conductors after the step of forming the insulating film 118.

To allow the conductive films 120a and 120b to serve as conductors, an oxygen vacancy is formed in the conductive films 120a and 120b and hydrogen is added from the insulating film 118 to the oxygen vacancy, whereby a donor level is formed in the vicinity of the conduction band. As a result, the conductivity of each of the conductive films 120a and 120b is increased, so that the conductive films 120a and 120b become conductors. The conductive films 120a and 120b having become conductors can each be referred to as an oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small in an oxide conductor, and an oxide conductor has a visible light transmitting property comparable to that of an oxide semiconductor.

<Components of Semiconductor Device>

Components of the semiconductor device of this embodiment are described below in detail.

As materials described below, materials described in Embodiment 3 can be used.

The material that can be used for the substrate 102 described in Embodiment 3 can be used for the substrate 102 in this embodiment. Furthermore, the materials that can be used for the insulating films 106 and 107 described in Embodiment 3 can be used for the insulating films 106 and 107 in this embodiment.

In addition, the materials that can be used for the conductive films functioning as the gate electrode, the source electrode, and the drain electrode described in Embodiment 3 can be used for the conductive films functioning as the first gate electrode, the source electrode, and the drain electrode in this embodiment.

<<Oxide Semiconductor Film>>

The oxide semiconductor film 108 can be formed using the materials described above.

In the case where the oxide semiconductor film 108b includes In-M-Zn oxide, it is preferable that the atomic ratio of metal elements of a sputtering target used for forming the In-M-Zn oxide satisfy In >M. The atomic ratio between metal elements in such a sputtering target is, for example, In:M:Zn=2:1:3, In:M:Zn=3:1:2, or In:M:Zn=4:2:4.1.

In the case where the oxide semiconductor film 108c includes In-M-Zn oxide, it is preferable that the atomic ratio of metal elements of a sputtering target used for forming a film of the In-M-Zn oxide satisfy In≤M. The atomic ratio of metal elements in such a sputtering target is, for example, InM:Zn=1:1:1, In:M:Zn=1:1:1.2, In:M:Zn=1:3:2, InM:Zn=1:3:4, InM:Zn=1:3:6, or In:M:Zn=1:4:5.

In the case where the oxide semiconductor films 108b and 108c include In-M-Zn oxide, it is preferable to use a target including polycrystalline In-M-Zn oxide as the sputtering target. The use of the target including polycrystalline In-M-Zn oxide facilitates formation of the oxide semiconductor films 108b and 108c having crystallinity. Note that the atomic ratios of metal elements in each of the formed oxide semiconductor films 108b and 108c vary from the above atomic ratio of metal elements of the sputtering target within a range of ±40% as an error. For example, when a sputtering target of the oxide semiconductor film 108b with an atomic ratio of In to Ga and Zn of 4:2:4.1 is used, the atomic ratio of In to Ga and Zn in the formed oxide semiconductor film 108b may be 4:2:3 or in the vicinity of 4:2:3.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the oxide semiconductor film 108b, and an oxide semiconductor film having an energy gap more than or equal to 2.5 eV and less than or equal to 3.5 eV is preferably used as the oxide semiconductor film 108c. Furthermore, the oxide semiconductor film 108c preferably has a higher energy gap than the oxide semiconductor film 108b.

Each thickness of the oxide semiconductor film 108b and the oxide semiconductor film 108c is more than or equal to 3 nm and less than or equal to 200 nm, preferably more than or equal to 3 nm and less than or equal to 100 nm, further preferably more than or equal to 3 nm and less than or equal to 50 nm.

An oxide semiconductor film with low carrier density is used as the oxide semiconductor film 108c. For example, the carrier density of the oxide semiconductor film 108c is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor film 108b and the oxide semiconductor film 108c be set to be appropriate.

Note that it is preferable to use, as the oxide semiconductor film 108b and the oxide semiconductor film 108c, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1\times10^6$ μm and a channel length L of 10 μm, the off-state current can be less than or equal to the measurement limit of a semiconductor parameter analyzer, that is, less than or equal to $1\times10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, and alkaline earth metal are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film that contains hydrogen is likely to be normally on. Accordingly, it is preferable that hydrogen be reduced as much as possible in the oxide semiconductor film 108. Specifically, in the oxide semiconductor film 108, the concentration of hydrogen that is measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, and further preferably lower than or equal to $1\times10^{16}$ atoms/cm$^3$.

The oxide semiconductor film 108b preferably includes a region in which hydrogen concentration is smaller than that in the oxide semiconductor film 108c. A semiconductor device including the oxide semiconductor film 108b having the region in which hydrogen concentration is smaller than that in the oxide semiconductor film 108c can be increased in reliability.

When silicon or carbon that is one of elements belonging to Group 14 is included in the oxide semiconductor film 108b, oxygen vacancies are increased in the oxide semiconductor film 108b, and the oxide semiconductor film 108b becomes an n-type film. Thus, the concentration of silicon or carbon (the concentration is measured by SIMS) in the oxide semiconductor film 108b or the concentration of silicon or carbon (the concentration is measured by SIMS) in the vicinity of an interface with the oxide semiconductor film 108b is set to be lower than or equal to $2\times10^{18}$ atoms/cm$^3$, preferably lower than or equal to $2\times10^{17}$ atoms/cm$^3$.

In addition, the concentration of alkali metal or alkaline earth metal of the oxide semiconductor film 108b, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the oxide semiconductor film 108b.

Furthermore, when including nitrogen, the oxide semiconductor film 108b easily becomes n-type by generation of electrons serving as carriers and an increase of carrier density. Thus, a transistor including an oxide semiconductor film that contains nitrogen is likely to have normally-on characteristics. For this reason, nitrogen in the oxide semiconductor film is preferably reduced as much as possible; the concentration of nitrogen that is measured by SIMS is preferably set to be, for example, lower than or equal to $5\times10^{18}$ atoms/cm$^3$.

The oxide semiconductor film 108b and the oxide semiconductor film 108c may have a non-single-crystal structure. The non-single crystal structure includes CAAC-OS, a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Films Functioning as Second Gate Insulating Film>>

The insulating films 114 and 116 function as a second gate insulating film of the transistor 100. In addition, the insulating films 114 and 116 each have a function of supplying oxygen to the oxide semiconductor film 108. That is, the insulating films 114 and 116 contain oxygen. Furthermore, the insulating film 114 is an insulating film that can transmit oxygen. Note that the insulating film 114 also functions as a film that relieves damage to the oxide semiconductor film 108 at the time of forming the insulating film 116 in a later step.

For example, the insulating films 114 and 116 described in Embodiment 3 can be used as the insulating films 114 and 116 in this embodiment.

<<Oxide Semiconductor Film Functioning as Conductive Film and Oxide Semiconductor Film Functioning as Second Gate Electrode>>

The material of the oxide semiconductor film 108 described above can be used for the conductive film 120a functioning as a conductive film and the conductive film 120b functioning as the second gate electrode.

That is, the conductive film 120a functioning as a conductive film and the conductive film 120b functioning as a second gate electrode contain a metal element that is the same as that contained in the oxide semiconductor film 108 (the oxide semiconductor film 108b and the oxide semiconductor film 108c). For example, the conductive film 120a functioning as a second gate electrode and the oxide semiconductor film 108 (the oxide semiconductor film 108b and the oxide semiconductor film 108c) contain the same metal element; thus, the manufacturing cost can be reduced.

For example, in the case where the conductive film 120a functioning as a conductive film and the conductive film 120b functioning as a second gate electrode each include In-M-Zn oxide, the atomic ratio of metal elements in a sputtering target used for forming the In-M-Zn oxide preferably satisfies In≥M. The atomic ratio of metal elements in such a sputtering target is In:M:Zn=2:1:3, In:M:Zn=3:1:2, In:M:Zn=4:2:4.1, or the like.

The conductive film 120a functioning as a conductive film and the conductive film 120b functioning as a second gate electrode can each have a single-layer structure or a stacked-layer structure of two or more layers. Note that in the case where the conductive film 120a and the conductive film 120b each have a stacked-layer structure, the composition of the sputtering target is not limited to that described above.

<<Insulating Film Functioning as Protective Insulating Film of Transistor>>

The insulating film 118 serves as a protective insulating film of the transistor 100.

The insulating film 118 includes one or both of hydrogen and nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118.

The insulating film 118 has a function of supplying one or both of hydrogen and nitrogen to the conductive film 120a functioning as a conductive film and the conductive film 120b functioning as a second gate electrode. The insulating film 118 preferably includes hydrogen and has a function of supplying the hydrogen to the conductive films 120a and 120b. The conductive films 120a and 120b supplied with hydrogen from the insulating film 118 function as conductors.

A nitride insulating film, for example, can be used as the insulating film 118. The nitride insulating film is formed using silicon nitride, silicon nitride oxide, aluminum nitride, aluminum nitride oxide, or the like.

Although the variety of films such as the conductive films, the insulating films, and the oxide semiconductor films that are described above can be formed by a sputtering method or a PECVD method, such films may be formed by another method, e.g., a thermal CVD method. Examples of the thermal CVD method include an MOCVD method and an ALD method. Specifically, the methods described in Embodiment 3 can be used.

Note that this embodiment can be combined with any of the other embodiments in this specification as appropriate.

Embodiment 5

In this embodiment, a structure of a data processing device of one embodiment of the present invention is described with reference to FIGS. 16A to 16C, FIGS. 17A and 17B, and FIGS. 18A and 18B.

Figure 16A:
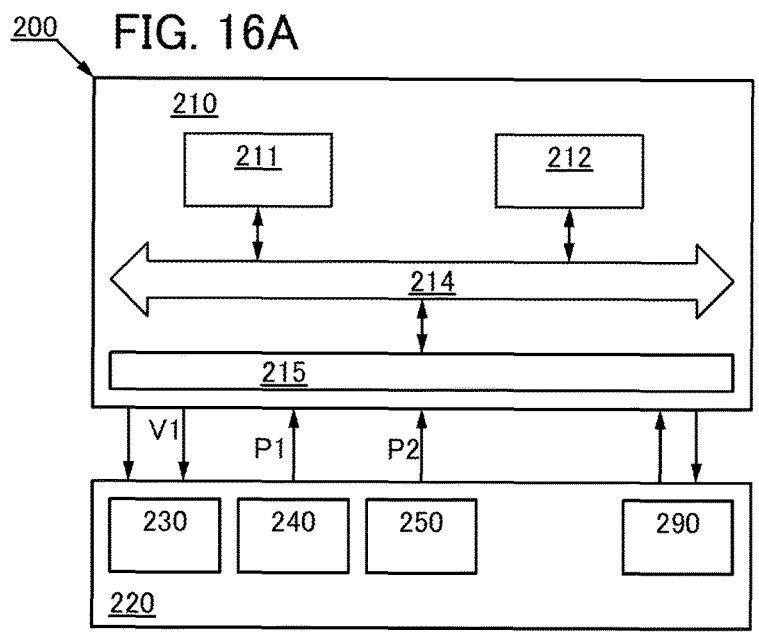
FIGS. 16A to 16C are a block diagram and projection views illustrating a structure of a data processing device of an embodiment.
Figure 16B:
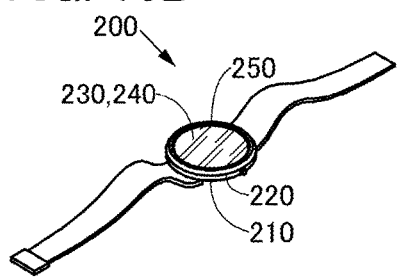
Figure 16C:
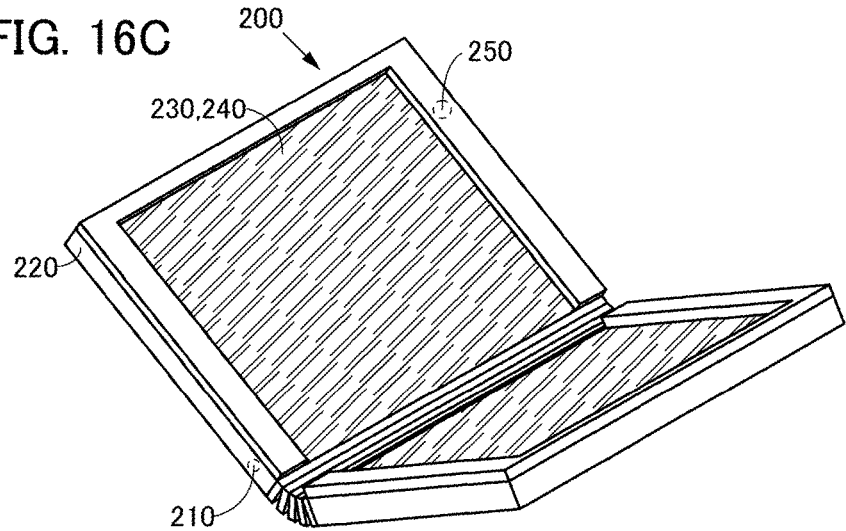

FIG. 16A is a block diagram illustrating a structure of a data processing device 200. FIGS. 16B and 16C are projection views illustrating examples of external views of the data processing device 200.

Figure 17A:
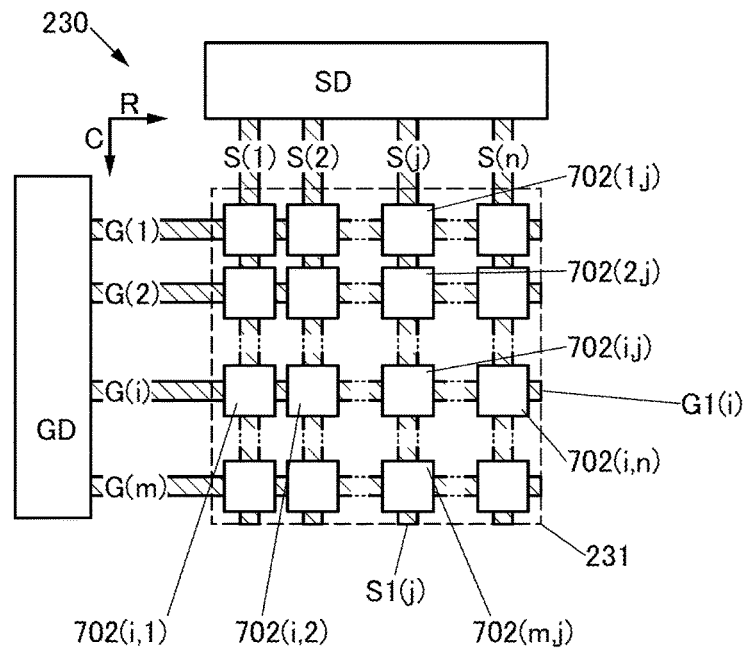
FIGS. 17A and 17B are block diagrams each illustrating a structure of a display portion of an embodiment.
Figure 17B:
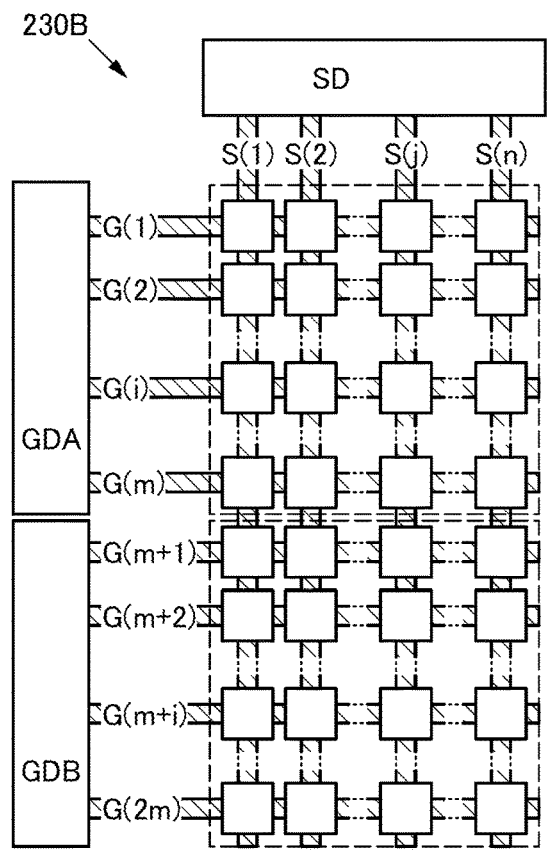

FIG. 17A is a block diagram illustrating a structure of a display portion 230. FIG. 17B is a block diagram illustrating a structure of a display portion 230B.

Figure 18A:
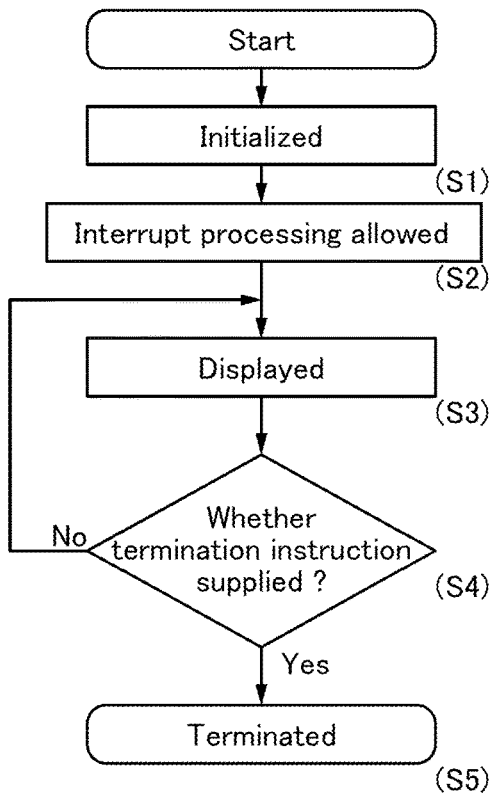
FIGS. 18A and 18B are flow charts each showing a program of an embodiment.
Figure 18B:
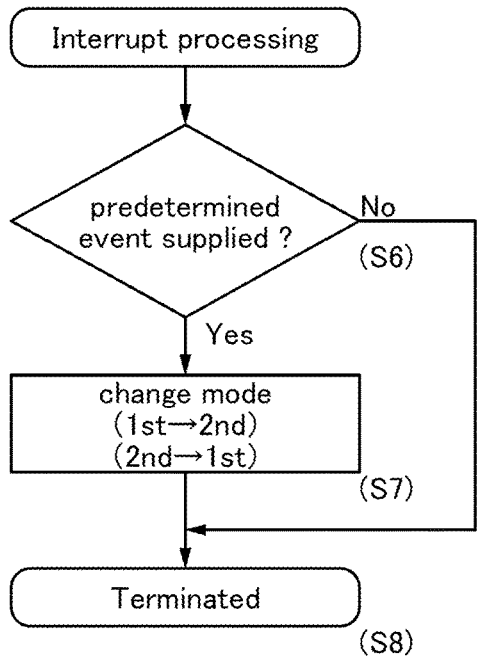

FIG. 18A is a flow chart showing main processing of the program of one embodiment of the present invention, and FIG. 18B is a flow chart showing interrupt processing.

<Structural Example of Data Processing Device>

The data processing device 200 described in this embodiment includes an input/output device 220 and an arithmetic device 210 (see FIG. 16A).

The input/output device 220 is configured to supply positional data P1 and pressure data and to receive image data V1 and control data. For example, a crown that can be pushed in a housing, a pressure sensor in contact with the crown or the like, or the like can be used.

The arithmetic device 210 is configured to receive the positional data P1 and the pressure data and to supply the image data V1 and the control data.

The arithmetic device 210 is configured to generate the control data in accordance with the pressure data. The arithmetic device 210 is configured to generate the image data V1 in accordance with the pressure data.

The input/output device 220 includes the display portion 230 that displays the image data V1, an input portion 240 that supplies the positional data P1, and a sensor portion 250 that supplies the pressure data.

The display portion 230 has a display panel. The sensor portion 250 includes a pressure sensor and is configured to generate the pressure data in accordance with a signal from the pressure sensor.

The arithmetic device 210 includes an arithmetic portion 211 and a memory portion 212.

The memory portion 212 stores a program executed by the arithmetic portion 211.

The program includes the step of selecting a first mode when pressure data exceeding a predetermined threshold is supplied and the step of selecting a second mode when pressure data exceeding a predetermined threshold is not supplied for more than a predetermined period.

The arithmetic portion 211 is configured to supply a control signal in the first mode that is different from a control signal supplied in the second mode.

The control signal includes a signal for refreshing display of the display panel.

The arithmetic device 210 is configured to supply the control signal in the second mode so that the frequency of refreshing the display of the display panel is lower than that in the first mode.

The above-described data processing device of one embodiment of the present invention includes the input/output device that supplies pressure data and the arithmetic device that supplies control data that varies in accordance with the pressure data.

With such a structure, the mode of the data processing device can be switched with the push, for example. Thus, a novel data processing device that is highly convenient or reliable can be provided.

<Structure>

The data processing device of one embodiment of the present invention includes the arithmetic device 210 or the input/output device 220.

<<Arithmetic Device 210>>

The arithmetic device 210 includes the arithmetic portion 211, the memory portion 212, a transmission path 214, and an input/output interface 215 (see FIG. 16A).

<<Arithmetic Portion 211>>

The arithmetic portion 211 is configured to, for example, execute a program. For example, a CPU described in Embodiment 7 can be used. In that case, power consumption can be sufficiently reduced.

<<Memory Portion 212>>

The memory portion 212 is configured to, for example, store the program executed by the arithmetic portion 211, initial data, setting data, an image, or the like.

Specifically, a hard disk, a flash memory, a memory including a transistor including an oxide semiconductor, or the like can be used.

<<Input/Output Interface 215, Transmission Path 214>>

The input/output interface 215 includes a terminal or a wiring and is configured to supply and receive data. For example, the input/output interface 215 can be electrically connected to the transmission path 214 and the input/output device 220.

The transmission path 214 includes a wiring and is configured to supply and receive data. For example, the transmission path 214 can be electrically connected to the input/output interface 215. In addition, the transmission path 214 can be electrically connected to the arithmetic portion 211, the memory portion 212, or the input/output interface 215.

<<Input/Output Device 220>>

The input/output device 220 includes the display portion 230, the input portion 240, the sensor portion 250, or a communication portion 290. For example, the input/output device described in Embodiment 2 can be used. Accordingly, power consumption can be reduced.

<<Display Portion 230>>

The display portion 230 includes a display region 231, a driver circuit GD, and a driver circuit SD (see FIG. 17A).

The display region 231 includes a group of pixels 702($i$, 1) to 702($i$, $n$), another group of pixels 702($i$, $j$) to 702($m$, $j$), and a scan line G1($i$) (see FIG. 17A). Note that i is an integer greater than or equal to 1 and less than or equal to m, j is an integer greater than or equal to 1 and less than or equal to n, and m and n are each an integer greater than or equal to 1. The group of pixels 702($i$, 1) to 702($i$, $n$) include the pixel 702($i$, $j$) and are provided in the row direction (the direction indicated by the arrow R in the drawing).

The another group of pixels 702($i$, $j$) to 702($m$, $j$) include the pixel 702($i$, $j$) and are provided in the column direction (the direction indicated by the arrow C in the drawing) that intersects the row direction.

The scan line G1($i$) is electrically connected to the group of pixels 702($i$, 1) to 702($i$, $n$) provided in the row direction.

The another group of pixels 702($i$, $j$) to 702($m$, $j$) provided in the column direction are electrically connected to the signal line S1($j$).

The display portion 230 can include a plurality of driver circuits. For example, the display portion 230B can include a driver circuit GDA and a driver circuit GDB (see FIG. 17B).

<<Driver Circuit GD>>

The driver circuit GD is configured to supply a selection signal in accordance with the control data.

For example, the driver circuit GD is configured to supply a selection signal to one scan line at a frequency of 30 Hz or higher, preferably 60 Hz or higher, in accordance with the control data. Accordingly, moving images can be smoothly displayed.

For example, the driver circuit GD is configured to supply a selection signal to one scan line at a frequency of lower than 30 Hz, preferably lower than 1 Hz, further preferably less than once per minute, in accordance with the control data. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<<Driver Circuit SD>>

The driver circuit SD is configured to supply an image signal in accordance with the image data V1.

<<Pixel 702($i,j$)>>

The pixel 702($i$, $j$) includes the first display element 750($i$, $j$), the second display element 550($i$, $j$)B, the third display element 550($i$, $j$)G, and the fourth display element 550($i$, $j$)R. Furthermore, the pixel 702($i$, $j$) includes a pixel circuit that drives the first display element 750($i$, $j$), the second display element 550($i$, $j$)B, the third display element 550($i$, $j$)G, and the fourth display element 550($i$, $j$)R. For example, the pixel structure that can be used for the display panel described in Embodiment 1 can be used for the pixel 702(*i*, *j*).

<<First Display Element 750(*i*, *j*)>>

For example, a display element having a function of controlling transmission or reflection of light can be used as the first display element 750(*i*, *j*). For example, a combined structure of a polarizing plate and a liquid crystal element or a MEMS shutter display element can be used. The use of a reflective display element can reduce power consumption of a display panel. Specifically, a reflective liquid crystal display element can be used as the first display element 750(*i*, *j*).

<<Second Display Element 550(*i*, *j*)B, Third Display Element 550(*i*, *j*)G, Fourth Display Element 550(*i*, *j*)R>>

A display element having a function of emitting light can be used as the second display element 550(*i*, *j*)B, the third display element 550(*i*, *j*)G, and the fourth display element 550(*i*, *j*)R, for example. Specifically, an organic EL element can be used.

<<Pixel Circuit>>

A pixel circuit including a circuit that is configured to drive the first display element 750(*i*, *j*), the second display element 550(*i*, *j*)B, the third display element 550(*i*, *j*)G, and the fourth display element 550(*i*, *j*)R can be used.

A switch, a transistor, a diode, a resistor, an inductor, a capacitor, or the like can be used in the pixel circuit.

For example, one or a plurality of transistors can be used as a switch. Alternatively, a plurality of transistors connected in parallel, in series, or in combination of parallel connection and series connection can be used as a switch.

<<Transistor>>

For example, semiconductor films formed at the same step can be used for transistors in the driver circuit and the pixel circuit.

For example, bottom-gate transistors, top-gate transistors, or the like can be used.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 14 can be used. Specifically, a semiconductor containing silicon can be used for a semiconductor film. For example, single crystal silicon, polysilicon, microcrystalline silicon, amorphous silicon, or the like can be used for the semiconductor film of the transistor.

Note that the temperature for forming a transistor using polysilicon as a semiconductor is lower than the temperature for forming a transistor using single crystal silicon as a semiconductor.

In addition, the transistor using polysilicon as a semiconductor has higher field-effect mobility than the transistor using amorphous silicon as a semiconductor, and therefore a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon in a semiconductor film can be used. Specifically, a transistor that uses an oxide semiconductor in a semiconductor film can be used.

A pixel circuit including the transistor that uses an oxide semiconductor in the semiconductor film can hold an image signal for a longer time than a pixel circuit including the transistor that uses amorphous silicon in a semiconductor film. Specifically, the selection signal can be supplied at a frequency of lower than 30 Hz, preferably lower than 1 Hz, further preferably less than once per minute while flickering is suppressed. Consequently, eyestrain on a user of the data processing device can be reduced, and power consumption for driving can be reduced.

Alternatively, for example, a transistor including a compound semiconductor can be used. Specifically, a semiconductor containing gallium arsenide can be used in a semiconductor film.

For example, a transistor including an organic semiconductor can be used. Specifically, an organic semiconductor containing any of polyacenes and graphene can be used in the semiconductor film.

<<Input Portion 240>>

A variety of human interfaces or the like can be used as the input portion 240 (see FIG. 16A).

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing a portion where image data is displayed by using a gesture of touching and moving his/her finger on the touch panel.

<<Sensor Portion 250>>

The sensor portion 250 is configured to supply sensing data P2, such as pressure data, by sensing its surroundings.

For example, a camera, an acceleration sensor, a direction sensor, a pressure sensor, a temperature sensor, a humidity sensor, an illuminance sensor, a global positioning system (GPS) signal receiving circuit, or the like can be used as the sensor portion 250.

<<Communication Portion 290>>

The communication portion 290 is configured to supply and acquire data to/from a network.

<Program>

The program of one embodiment of the present invention is composed of the following steps (see FIG. 18A).

<<First Step>>

In the first step, setting is initialized (see (S1) in FIG. 18A).

For example, predetermined image data that is to be displayed on starting and data for specifying a method of displaying the image data are acquired from the memory portion 212. Specifically, a still image can be used as the predetermined image data. A method of refreshing image data at a frequency lower than that in the case of using a moving image can be used as the method of displaying image data. For example, the second mode can be used as the method of displaying image data.

<<Second Step>>

In the second step, interrupt processing is allowed (see (S2) in FIG. 18A). Note that an arithmetic device allowed to execute the interrupt processing can perform the interrupt processing in parallel with the main processing. The arithmetic device that has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

<<Third Step>>

In the third step, image data is displayed in a mode selected in the first step or the interrupt processing (see (S3) in FIG. 18A). Note that the method of displaying image data is specified by the mode.

For example, the first mode or the second mode can be selected.

<<First Mode>>

Specifically, a method of supplying selection signals to a scan line at a frequency of 30 Hz or more, preferably 60 Hz or more, and performing display in accordance with the selection signals can be used in the first mode.

The supply of selection signals at a frequency of 30 Hz or more, preferably 60 Hz or more, can display a smooth moving image.

For example, when an image is refreshed at a frequency of 30 Hz or more, preferably 60 Hz or more, an image smoothly following the user's operation can be displayed on the data processing device 200 the user is operating.

<<Second Mode>>

Specifically, a method of supplying selection signals to a scan line at a frequency of less than 30 Hz, preferably less than 1 Hz, further preferably once a minute and performing display in accordance with the selection signals can be used in the second mode.

The supply of selection signals at a frequency of less than 30 Hz, preferably less than 1 Hz, further preferably once a minute, can perform display with flickers reduced. Furthermore, power consumption can be reduced.

For example, when a light-emitting element is used as the second display element, the light-emitting element can be configured to emit light in a pulsed manner so as to display image data. Specifically, an organic EL element can be configured to emit light in a pulsed manner, and its afterglow can be used for display. The organic EL element has excellent frequency characteristics; thus, time for driving the light-emitting element can be shortened, and thus power consumption can be reduced in some cases. Alternatively, heat generation can be inhibited, and thus the deterioration of the light-emitting element can be suppressed in some cases.

For example, when the data processing device 200 is used for a clock or watch, the display can be refreshed at a frequency of once a second or once a minute.

<<Fourth Step>>

In the fourth step, the program moves to the fifth step when a termination instruction is supplied, and the program moves to the third step when the termination instruction is not supplied (see (S4) in FIG. 18A).

For example, the termination instruction supplied in the interrupt processing can be used.

<<Fifth Step>>

In the fifth step, the program terminates (see (S5) in FIG. 18A).

<<Interrupt Processing>>

The interrupt processing includes sixth to eighth steps described below (see FIG. 18B).

<<Sixth Step>>

In the sixth step, the processing proceeds to the seventh step when a predetermined event has been supplied, whereas the processing proceeds to the eighth step when the predetermined event has not been supplied (see (S6) in FIG. 18B). For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than or equal to 0.5 seconds, still further preferably shorter than or equal to 0.1 seconds.

<<Seventh Step>>

In the seventh step, the mode is changed (see (S7) in FIG. 18B). Specifically, the mode is changed to the second mode when the first mode has been selected, or the mode is changed to the first mode when the second mode has been selected.

<<Eighth Step>>

In the eighth step, the interrupt processing terminates (see (S8) in FIG. 18B).

<<Predetermined Event>>

For example, the following events can be used: events supplied using a pointing device such as a mouse (e.g., "click" and "drag") and events supplied to a touch panel with a finger or the like used as a pointer (e.g., "tap", "drag", or "swipe").

For example, the position of a slide bar pointed by a pointer, the swipe speed, and the drag speed can be used as parameters assigned to an instruction associated with the predetermined event.

For example, data sensed by the sensor portion 250 is compared to the set threshold, and the compared results can be used for the event.

Specifically, a crown that can be pushed in a housing, a pressure sensor in contact with the crown or the like, or the like can be used as the sensor portion 250 (see FIG. 16B).

For example, a photoelectric conversion element provided in a housing can be used in the sensor portion 250 (see FIG. 16C).

<<Instruction Associated with Predetermined Event>>

For example, the termination instruction can be associated with a predetermined event.

For example, "page-turning instruction" for switching displayed image data from one to another can be associated with a predetermined event. Note that a parameter for determining the page-turning speed or the like when the "page-turning instruction" is executed can be supplied using the predetermined event.

For example, "scroll instruction" for moving the display position of part of image data and displaying another part continuing from that part can be associated with a predetermined event. Note that a parameter for determining the moving speed of the display position or the like when the "scroll instruction" is executed can be supplied using the predetermined event.

For example, an instruction for generating image data can be associated with a predetermined event. Note that the ambient luminance sensed by the sensor portion 250 may be used for a parameter for determining the brightness of a generated image.

For example, an instruction or the like for acquiring data distributed via a push service using the communication portion 290 can be associated with a predetermined event.

Note that positional data sensed by the sensor portion 250 may be used for the determination of the presence or absence of a qualification for acquiring data. Specifically, it may be determined that there is a qualification for acquiring data when the user is in a predetermined class room, school, conference room, office, or building. For example, educational materials can be fed from a classroom of, for example, a school or a university and displayed, so that the data processing device 200 can be used as a schoolbook or the like (see FIG. 16C). Alternatively, materials distributed from a conference room in, for example, a company can be received and displayed.

Note that this embodiment can be combined with any of the other embodiments in this specification as appropriate.

Embodiment 6

In this embodiment, a structure of a data processing device of one embodiment of the present invention will be described with reference to FIG. 19 and FIG. 20.

Figure 19:
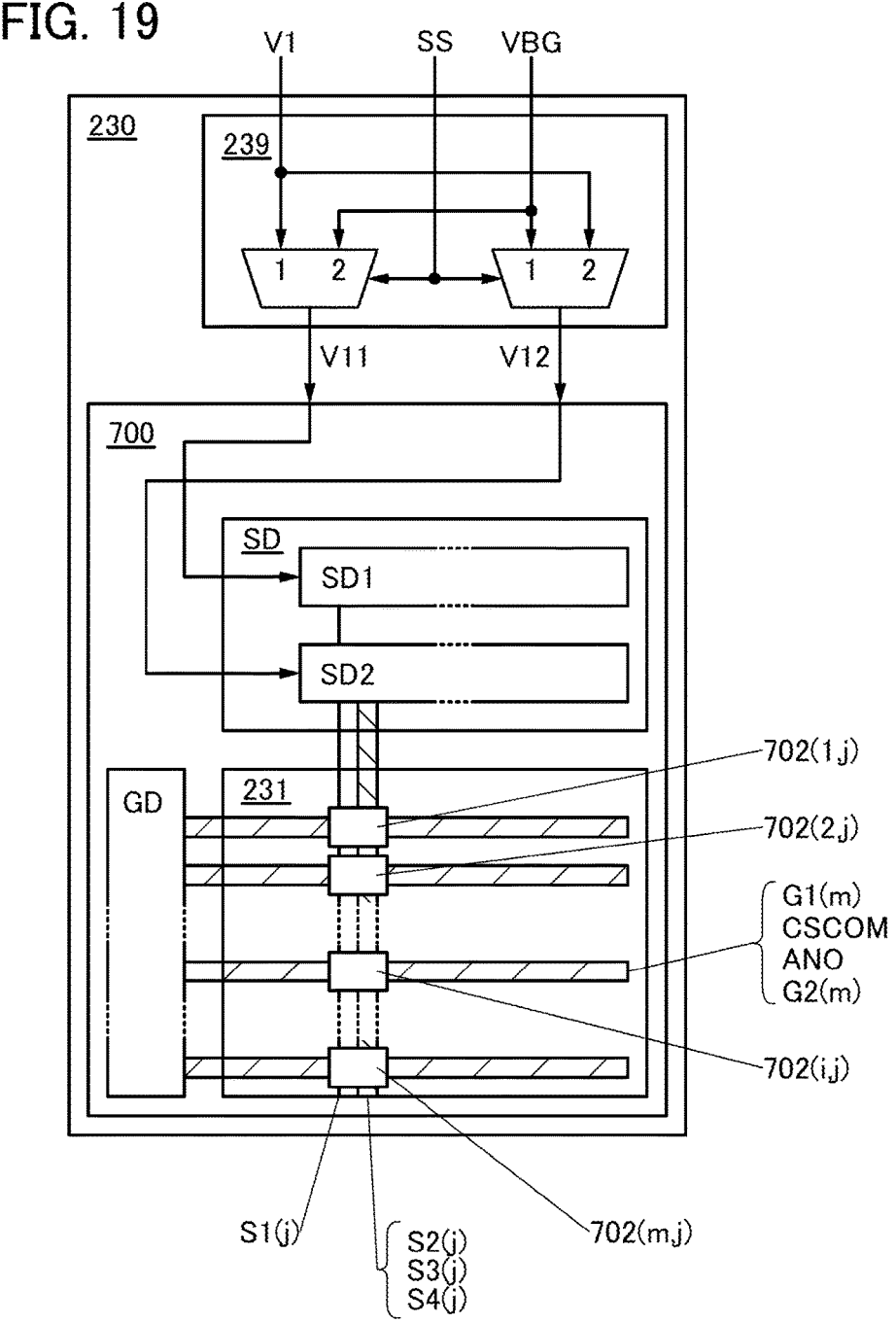
FIG. 19 is a block diagram illustrating a structure of a display portion of an embodiment.

FIG. 19 illustrates a structure of the data processing device of one embodiment of the present invention. FIG. 19 is a block diagram of the display portion 230 that can be used in the data processing device of one embodiment of the present invention.

Figure 20:
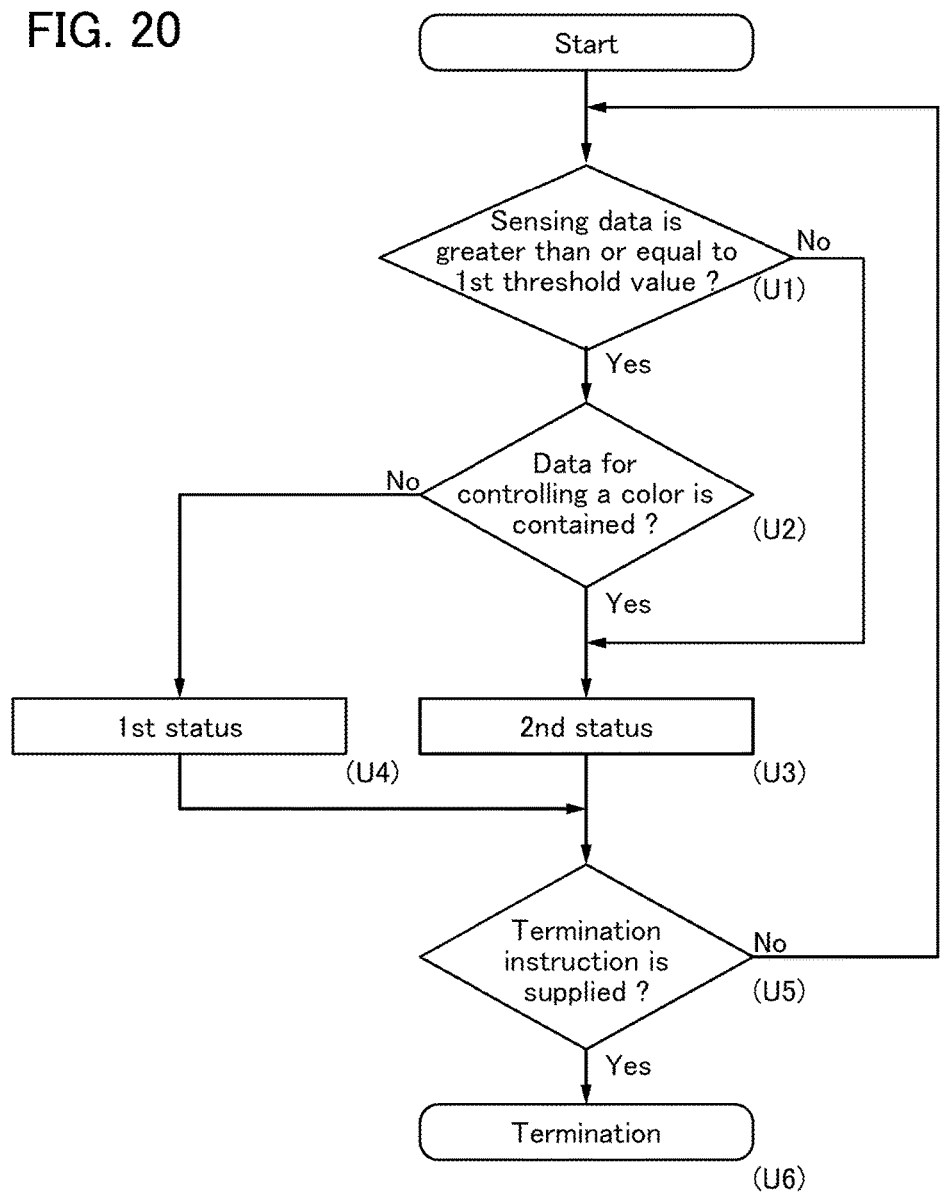
FIG. 20 is a flow chart showing a program of an embodiment.

FIG. 20 is a flow chart showing a program that can be used for the data processing device of one embodiment of the present invention.

<Structural Example of Data Processing Device>

Note that the data processing device described in this embodiment is different from the data processing device described in Embodiment 5 in that the display portion 230 includes a selection circuit 239. Different structures will be described in detail below, and the above description is referred to for the other similar structures.

The arithmetic device 210 of the data processing device described in this embodiment has a function of generating the image data V1 and control data SS (see FIG. 19). In addition, the arithmetic device 210 has a function of generating the control data SS on the basis of the sensing data P2 and the image data V1. Note that the control data SS includes a first status or a second status.

The display portion 230 includes the display panel 700 and the selection circuit 239.

The display panel 700 includes a first driver circuit SD1 and a second driver circuit SD2. The first driver circuit SD1 is electrically connected to the signal line S1(j), and the second driver circuit SD2 is electrically connected to the signal lines S2(j), S3(j), and S4(j).

The selection circuit 239 has a function of supplying the image data V1 to the first driver circuit SD1 and supplying the background data VBG to the second driver circuit SD2 when receiving the first-status control data SS. As the background data VBG, a black image, a white image, an image of a predetermined color, or a background image with a predetermined pattern can be used, for example. Specifically, an image with a color that can be displayed with a small amount of power can be selected to be used as the background data VBG. Alternatively, an image that can be displayed without decreasing the display quality of an image when displayed by a display element to which the image data V1 is supplied can be selected to be used as the background data VBG. For example, when a black image is used as the background data VBG, the display element to which the image data V1 is supplied can perform display with a high contrast.

The selection circuit 239 has a function of supplying the background data VBG to the first driver circuit SD1 and supplying the image data V1 to the second driver circuit SD2 when receiving the second-status control data SS.

The data processing device described in this embodiment includes the selection circuit which has a function of selecting the image data or the background data on the basis of the sensing data and the image data and supplying the selected data to a predetermined driver circuit. In this manner, one of the image data and the background data can be supplied to the first driver circuit and the other can be supplied to the second driver circuit. Thus, a novel data processing device that is highly convenient or reliable can be provided.

Furthermore, the arithmetic device 210 of the data processing device 200 described in this embodiment has a function of supplying the first-status control data SS when the sensing data P2 is greater than or equal to a predetermined threshold value.

The arithmetic device 210 has a function of supplying the first-status control data SS when the sensing data P2 is less than the predetermined threshold value and the image data does not contain data for controlling a color. For example, in the case where the image data contains data for only a black and white image, the first-status control data SS is supplied. Specifically, in the case where the image data contains only text data, for example, in the case of an e-book reader or the like, the first-status control data SS is supplied.

The arithmetic device 210 has a function of supplying the second-status control data SS when the sensing data P2 is less than the predetermined threshold value and the image data contains data for controlling a color.

The arithmetic device 210 has a function of supplying the second-status control data SS when the sensing data P2 is less than the predetermined threshold value. For example, illuminance data for an environment where the data processing device is used can be used as the sensing data P2. Specifically, the sensor portion 250 provided with an illuminance sensor can be used for the data processing device.

The data processing device described in this embodiment includes the arithmetic device which has a function of determining the status on the basis of the sensing data and the image data and supplying the control data for the determined status. Thus, the reflective display element or the light-emitting element is selected on the basis of the sensing data such as illuminance and the image data, and the image data can be displayed using the selected reflective display element or light-emitting element. As a result, a novel data processing device that is highly convenient or reliable can be provided.

The following describes components included in the data processing device 200. Note that these components cannot be clearly distinguished and one component also serves as another component or includes part of another component in some cases.

For example, the display portion 230 with which the input portion 240 overlaps serves as both the input portion 240 and the display portion 230.

Structural Example

The data processing device 200 includes the arithmetic device 210, the input/output device 220, the display portion 230, the sensor portion 250, or the input portion 240. For example, the data processing device of this embodiment can have a structure similar to that of the data processing device described in Embodiment 5.

<<Selection Circuit 239>>

In the selection circuit 239, a first multiplexer and a second multiplexer can be used, for example (see FIG. 19).

The first multiplexer includes a first input portion to which the image data V1 is supplied and a second input portion to which the background data VBG is supplied, and receives the control data SS. The first multiplexer outputs the image data V1 when receiving the first-status control data SS and outputs the background data VBG when receiving the second-status control data SS. Note that the data output from the first multiplexer is referred to as data V11.

The second multiplexer includes a first input portion to which the background data VBG is supplied and a second input portion to which the image data V1 is supplied, and receives the control data SS. The second multiplexer outputs the background data VBG when receiving the first-status control data SS and outputs the image data V1 when receiving the second-status control data SS. Note that the data output from the second multiplexer is referred to as data V12.

<<Driver Circuit SD1, Driver Circuit SD2>>

The driver circuit SD1 has a function of supplying an image signal on the basis of the data V11. The driver circuit SD2 has a function of supplying an image signal on the basis of the data V12. Note that, instead of the driver circuits SD1 and SD2, a driver circuit SD in which the driver circuits SD1 and SD2 are integrated can be used.

For example, any of a variety of sequential circuits, such as a shift register, can be used as the driver circuit SD1 or SD2.

Specifically, an integrated circuit formed on a silicon substrate can be used as the driver circuit SD.

The driver circuit SD1 has a function of generating a signal to be supplied to a pixel circuit electrically connected to the reflective display element, for example. Specifically, the driver circuit SD1 has a function of generating a signal whose polarity is inverted. Thus, for example, the reflective liquid crystal display element can be driven.

The driver circuit SD2 has a function of generating a signal to be supplied to a pixel circuit electrically connected to the light-emitting element, for example.

<<Program>>

For example, a program for determining the status of the control data SS on the basis of the sensing data P2 and the image data V1 can be used for the arithmetic device 210.

Specifically, a program including the following steps can be used.

<<First Step>>

When the sensing data P2 is greater than or equal to the predetermined threshold value in a first step, a second step is selected, and when the sensing data P2 is less than the predetermined threshold value in the first step, a third step is selected (see (U1) in FIG. 20).

For example, an illuminance sensor is used for the sensor portion 250 and the sensing data P2 about the illuminance is supplied to the sensor portion 250 to compare the sensing data P2 with the predetermined threshold value. Specifically, the illuminance of the environment at which display using the reflective display element becomes difficult, for example, the illuminance sensed by the illuminance sensor in a dim environment, can be used as the first threshold value.

<<Second Step>>

When the image data V1 contains data for controlling a color in the second step, the third step is selected, and when the image data V1 does not contain data for controlling a color in the second step, the fourth step is selected (see (U2) in FIG. 20). Note that multicolor or full-color image data contains data for controlling a color. Furthermore, single-color or monochrome image data contains data for controlling brightness.

For example, whether the image data V1 contains data for controlling a color can be determined for every file displayed on the data processing device. Specifically, whether a metafile contains data for controlling a color may be determined for every metafile containing the image data V1 displayed on the data processing device, and the metafile can be used for the judgement.

For example, whether the image data V1 contains data for controlling a color may be determined for every frame displayed on the data processing device. Specifically, whether the image data V1 contains data for controlling a color may be determined for every frame, and the image data V1 can be used for the judgement.

For example, whether the image data V1 contains data for controlling a color may be determined for every pixel for performing display in the data processing device. Specifically, whether the image data V1 contains data for controlling a color may be determined for every pixel, and a judgment can be made.

<<Third Step>>

In the third step, the control data SS is set to the second status (see (U3) in FIG. 20).

On the basis of the second-status control data SS, the selection circuit 239 supplies the background data VBG and the image data V1 to the first driver circuit SD1 and the second driver circuit SD2, respectively (see FIG. 19).

<<Fourth Step>>

In the fourth step, the control data SS is set to the first status (see (U4) in FIG. 20).

On the basis of the first-status control data SS, the selection circuit 239 supplies the image data V1 and the background data VBG to the first driver circuit SD1 and the second driver circuit SD2, respectively (see FIG. 19).

<<Fifth Step>>

When a termination instruction is supplied in a fifth step, a sixth step is selected, and when the termination instruction is not supplied in the fifth step, the first step is selected (see (U5) in FIG. 20).

Note that the termination instruction may be supplied using the interrupt processing.

<<Sixth Step>>

In the sixth step, the program is terminated (see (U6) in FIG. 20).

Thus, the status of the control data can be determined on the basis of the sensing data such as illuminance and the image data. As a result, the reflective display element or the light-emitting element is selected, and the image data can be displayed using the selected reflective display element or light-emitting element.

When the data processing device 200 is used in a dim or dark environment, the image data can be displayed using the light-emitting element. Thus, the image data can be favorably displayed even in a dark environment.

When the data processing device 200 is used in a bright environment, multicolor or full-color image data can be displayed using the light-emitting element. Thus, an image can be displayed with favorable color reproducibility. In addition, an image can be displayed with a high contrast. Alternatively, with the reflective display element, single-color or monochrome image data can be displayed. Thus, power consumed for displaying can be reduced.

Note that this embodiment can be combined with any of the other embodiments in this specification as appropriate.

Embodiment 7

Figure 21A:
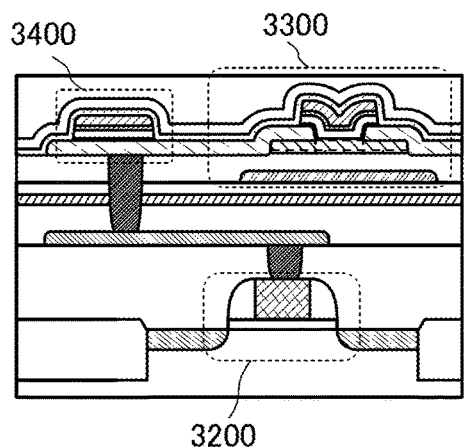
FIGS. 21A to 21C are a cross-sectional view and circuit diagrams each illustrating a structure of a semiconductor device of an embodiment.
Figure 21B:
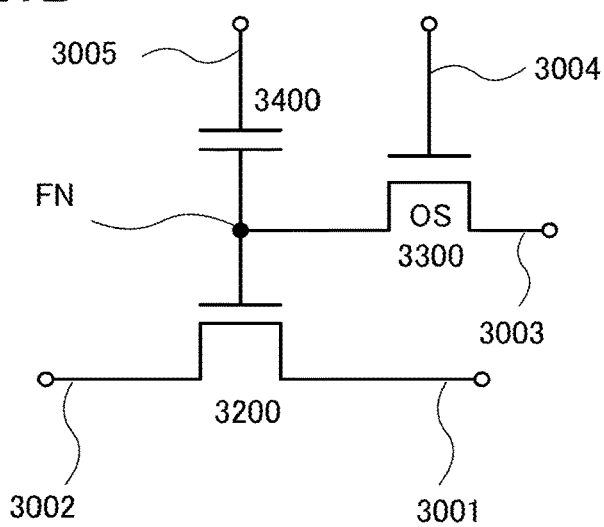
Figure 21C:
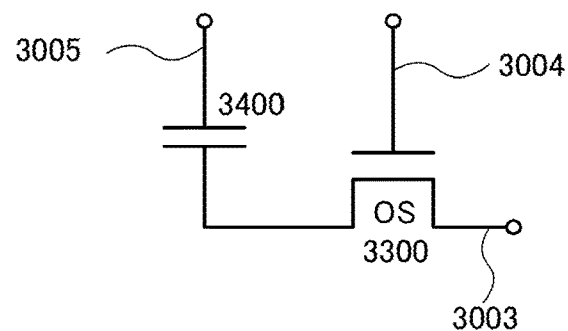

In this embodiment, a semiconductor device (memory device) that can retain stored data even when not powered and that has an unlimited number of write cycles, and a CPU including the semiconductor device are described. The CPU described in this embodiment can be used for the data processing device described in Embodiment 6, for example.
<Memory Device>
An example of a semiconductor device (memory device) that can retain stored data even when not powered and that has an unlimited number of write cycles is shown in FIGS. 21A to 21C. Note that FIG. 21B is a circuit diagram of the structure in FIG. 21A.

The semiconductor device illustrated in FIGS. 21A and 21B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. On the other hand, a transistor including an oxide semiconductor has a low off-state current.

The transistor 3300 is a transistor in which a channel is formed in a semiconductor layer including an oxide semiconductor. Since the off-state current of the transistor 3300 is small, stored data can be retained for a long period. In other words, power consumption can be sufficiently reduced because a semiconductor memory device in which refresh operation is unnecessary or the frequency of refresh operation is extremely low can be provided.

In FIG. 21B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 21A has a feature that the potential of the gate electrode of the transistor 3200 can be retained, and thus enables writing, retaining, and reading of data as follows.

Writing and retaining of data are described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate electrode of the transistor 3200 (writing). Here, one of two kinds of charges providing different potential levels (hereinafter referred to as a low-level charge and a high-level charge) is supplied. After that, the potential of the fourth wiring 3004 is set to a potential at which the transistor 3300 is turned off, so that the transistor 3300 is turned off. Thus, the charge supplied to the gate electrode of the transistor 3200 is held (retaining).

Since the off-state current of the transistor 3300 is extremely small, the charge of the gate electrode of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate electrode of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 that is needed to turn on the transistor 3200. Thus, the potential of the fifth wiring 3005 is set to a potential $V_0$ that is between $V_{th\_H}$ and $V_{th\_L}$, whereby charge supplied to the gate electrode of the transistor 3200 can be determined. For example, in the case where the high-level charge is supplied to the gate electrode of the transistor 3200 in writing and the potential of the fifth wiring 3005 is $V_0$ ($>V_{th\_H}$), the transistor 3200 is turned on. In the case where the low-level charge is supplied to the gate electrode of the transistor 3200 in writing, even when the potential of the fifth wiring 3005 is $V_0$ ($<V_{th\_L}$), the transistor 3200 remains off. Thus, the data retained in the gate electrode of the transistor 3200 can be read by determining the potential of the second wiring 3002.

Note that in the case where memory cells are arrayed, it is necessary that only data of a designated memory cell(s) can be read. For example, the fifth wiring 3005 of memory cells from which data is not read may be supplied with a potential at which the transistor 3200 is turned off regardless of the potential supplied to the gate electrode, that is, a potential lower than $V_{th\_H}$, whereby only data of a designated memory cell(s) can be read. Alternatively, the fifth wiring 3005 of the memory cells from which data is not read may be supplied with a potential at which the transistor 3200 is turned on regardless of the potential supplied to the gate electrode, that is, a potential higher than $V_{th\_L}$, whereby only data of a designated memory cell(s) can be read.

The semiconductor device illustrated in FIG. 21C is different from the semiconductor device illustrated in FIG. 21A in that the transistor 3200 is not provided. Also in this case, writing and retaining operation of data can be performed in a manner similar to those of the semiconductor device illustrated in FIG. 21A.

Next, reading of data of the semiconductor device illustrated in FIG. 21C is described. When the transistor 3300 is turned on, the third wiring 3003 that is in a floating state and the capacitor 3400 are electrically connected to each other, and the charge is redistributed between the third wiring 3003 and the capacitor 3400. As a result, the potential of the third wiring 3003 is changed. The amount of change in the potential of the third wiring 3003 varies depending on the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, $C_B$ is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the third wiring 3003 in the case of retaining the potential $V_1$ ($=(C_B \times V_{B0} + C \times V_1)/(C_B + C)$) is higher than the potential of the third wiring 3003 in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor including the first semiconductor material may be used for a driver circuit for driving a memory cell, and a transistor including the second semiconductor material may be stacked over the driver circuit as the transistor 3300.

When including a transistor in which a channel formation region is formed using an oxide semiconductor and which has an extremely small off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

The above memory device can also be used in an LSI such as a digital signal processor (DSP), a custom LSI, or a programmable logic device (PLD) and a radio frequency identification (RF-ID) tag, in addition to a central processing unit (CPU), for example.

<CPU>

A CPU including the above memory device is described below.

Figure 22:
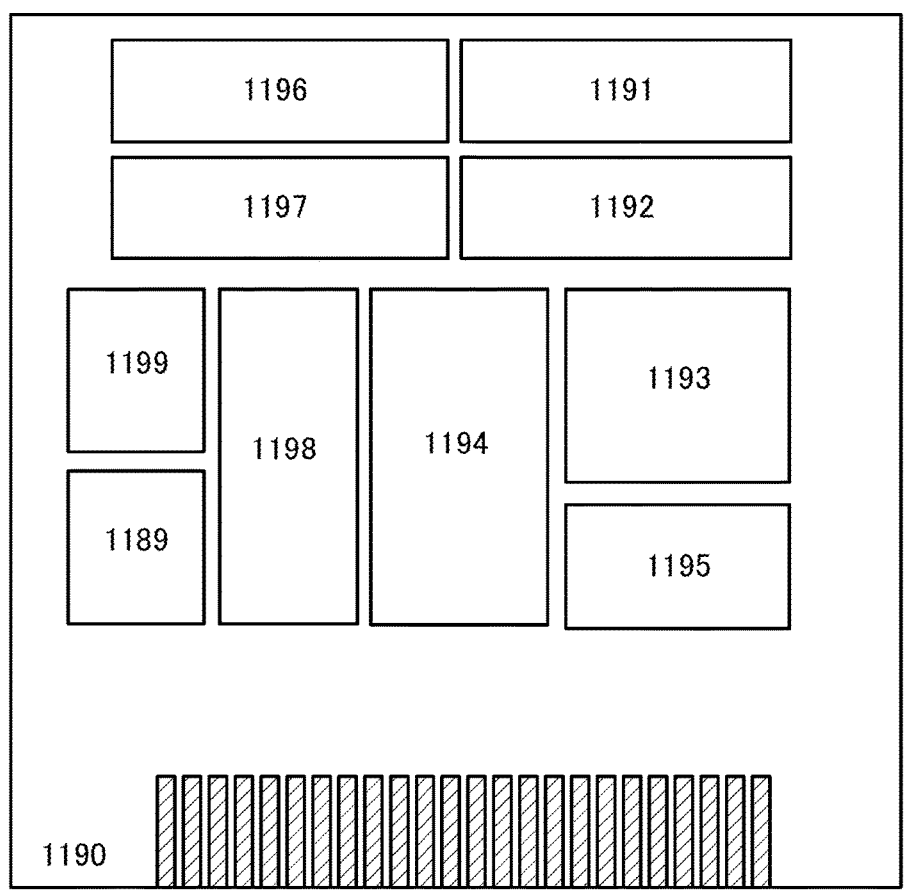
FIG. 22 is a block diagram illustrating a structure of a CPU of an embodiment.

FIG. 22 is a block diagram illustrating a structural example of the CPU including the above memory device.

The CPU illustrated in FIG. 22 includes, over a substrate 1190, an arithmetic logic unit (ALU) 1191, an ALU controller 1192, an instruction decoder 1193, an interrupt controller 1194, a timing controller 1195, a register 1196, a register controller 1197, a bus interface (BUS I/F) 1198, a rewritable ROM 1199, and a ROM interface (ROM I/F) 1189. A semiconductor substrate, an SOI substrate, a glass substrate, or the like is used as the substrate 1190. The ROM 1199 and the ROM interface 1189 may be provided over a separate chip. Needless to say, the CPU in FIG. 22 is just an example in which the structure is simplified, and an actual CPU may have a variety of structures depending on the application. For example, the CPU may have the following structure: a structure including the CPU illustrated in FIG. 22 or an arithmetic circuit is considered as one core; a plurality of such cores are included; and the cores operate in parallel. The number of bits that the CPU can process in an internal arithmetic circuit or in a data bus can be, for example, 8, 16, 32, or 64.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 processes an interrupt request from an external input/output device or a peripheral circuit depending on its priority or a mask state. The register controller 1197 generates an address of the register 1196, and reads/writes data from/to the register 1196 depending on the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal on the basis of a reference clock signal, and supplies the internal clock signal to the above circuits.

In the CPU illustrated in FIG. 22, a memory cell is provided in the register 1196.

In the CPU illustrated in FIG. 22, the register controller 1197 selects operation of retaining data in the register 1196 in accordance with an instruction from the ALU 1191. That is, the register controller 1197 selects whether data is retained by a flip-flop or by a capacitor in the memory cell included in the register 1196. When data retaining by the flip-flop is selected, a power supply voltage is supplied to the memory cell in the register 1196. When data retaining by the capacitor is selected, the data is rewritten in the capacitor, and supply of the power supply voltage to the memory cell in the register 1196 can be stopped.

Figure 23:
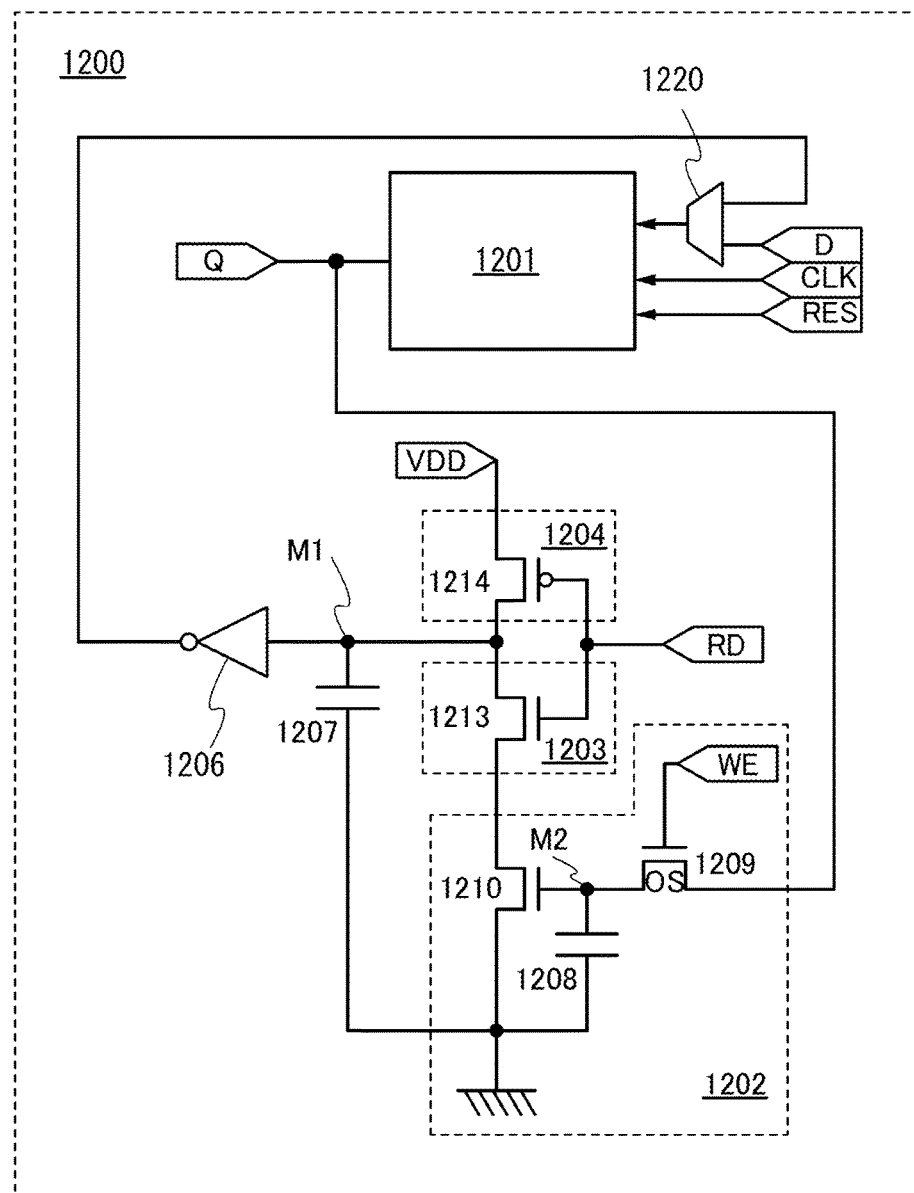
FIG. 23 is a circuit diagram illustrating a structure of a memory element of an embodiment.

FIG. 23 is an example of a circuit diagram of a memory element that can be used for the register 1196. A memory element 1200 includes a circuit 1201 in which stored data is volatile when power supply is stopped, a circuit 1202 in which stored data is nonvolatile even when power supply is stopped, a switch 1203, a switch 1204, a logic element 1206, a capacitor 1207, and a circuit 1220 having a selecting function. The circuit 1202 includes a capacitor 1208, a transistor 1209, and a transistor 1210. Note that the memory element 1200 may further include another element such as a diode, a resistor, or an inductor, as needed.

Here, the above-described memory device can be used as the circuit 1202. When supply of a power supply voltage to the memory element 1200 is stopped, a ground potential (0 V) or a potential at which the transistor 1209 in the circuit 1202 is turned off continues to be input to a gate of the transistor 1209. For example, the gate of the transistor 1209 is grounded through a load such as a resistor.

Shown here is an example in which the switch 1203 is a transistor 1213 having one conductivity type (e.g., an n-channel transistor) and the switch 1204 is a transistor 1214 having a conductivity type opposite to the one conductivity type (e.g., a p-channel transistor). A first terminal of the switch 1203 corresponds to one of a source and a drain of the transistor 1213, a second terminal of the switch 1203 corresponds to the other of the source and the drain of the transistor 1213, and conduction or non-conduction between the first terminal and the second terminal of the switch 1203 (i.e., the on/off state of the transistor 1213) is selected by a control signal RD input to a gate of the transistor 1213. A first terminal of the switch 1204 corresponds to one of a source and a drain of the transistor 1214, a second terminal of the switch 1204 corresponds to the other of the source and the drain of the transistor 1214, and conduction or non-conduction between the first terminal and the second terminal of the switch 1204 (i.e., the on/off state of the transistor 1214) is selected by the control signal RD input to a gate of the transistor 1214.

One of a source and a drain of the transistor 1209 is electrically connected to one of a pair of electrodes of the capacitor 1208 and a gate of the transistor 1210. Here, the connection portion is referred to as a node M2. One of a source and a drain of the transistor 1210 is electrically connected to a wiring that can supply a low power supply potential (e.g., a GND line), and the other thereof is electrically connected to the first terminal of the switch 1203 (the one of the source and the drain of the transistor 1213). The second terminal of the switch 1203 (the other of the source and the drain of the transistor 1213) is electrically connected to the first terminal of the switch 1204 (the one of the source and the drain of the transistor 1214). The second terminal of the switch 1204 (the other of the source and the drain of the transistor 1214) is electrically connected to a wiring that can supply a power supply potential VDD. The second terminal of the switch 1203 (the other of the source and the drain of the transistor 1213), the first terminal of the switch 1204 (the one of the source and the drain of the transistor 1214), an input terminal of the logic element 1206, and one of a pair of electrodes of the capacitor 1207 are electrically connected to each other. Here, the connection portion is referred to as a node M1. The other of the pair of electrodes of the capacitor 1207 can be supplied with a constant potential. For example, the other of the pair of electrodes of the capacitor 1207 can be supplied with a low power supply potential (e.g., GND) or a high power supply potential (e.g., VDD). The other of the pair of electrodes of the capacitor 1207 is electrically connected to the wiring that can supply a low power supply potential (e.g., a GND line). The other of the pair of electrodes of the capacitor 1208 can be supplied with a constant potential. For example, the other of the pair of electrodes of the capacitor 1208 can be supplied with a low power supply potential (e.g., GND) or a high power supply potential (e.g., VDD). The other of the pair of electrodes of the capacitor 1208 is electrically connected to the wiring that can supply a low power supply potential (e.g., a GND line).

The capacitor 1207 and the capacitor 1208 are not necessarily provided as long as the parasitic capacitance of the transistor, the wiring, or the like is actively utilized.

A control signal WE is input to a first gate (first gate electrode) of the transistor 1209. As for each of the switch 1203 and the switch 1204, a conduction state or a non-conduction state between the first terminal and the second terminal is selected by the control signal RD that is different from the control signal WE. When the first terminal and the second terminal of one of the switches are in the conduction state, the first terminal and the second terminal of the other of the switches are in the non-conduction state.

A signal corresponding to data retained in the circuit 1201 is input to the other of the source and the drain of the transistor 1209. FIG. 23 illustrates an example in which a signal output from the circuit 1201 is input to the other of the source and the drain of the transistor 1209. The logic value of a signal output from the second terminal of the switch 1203 (the other of the source and the drain of the transistor 1213) is inverted by the logic element 1206, and the inverted signal is input to the circuit 1201 through the circuit 1220.

In the example of FIG. 23, a signal output from the second terminal of the switch 1203 (the other of the source and the drain of the transistor 1213) is input to the circuit 1201 through the logic element 1206 and the circuit 1220; however, one embodiment of the present invention is not limited thereto. The signal output from the second terminal of the switch 1203 (the other of the source and the drain of the transistor 1213) may be input to the circuit 1201 without its logic value being inverted. For example, in the case where the circuit 1201 includes a node in which a signal obtained by inversion of the logic value of a signal input from the input terminal is retained, the signal output from the second terminal of the switch 1203 (the other of the source and the drain of the transistor 1213) can be input to the node.

In FIG. 23, the transistors included in the memory element 1200 except for the transistor 1209 can each be a transistor in which a channel is formed in a layer formed using a semiconductor other than an oxide semiconductor or in the substrate 1190. For example, the transistor can be a transistor whose channel is formed in a silicon layer or a silicon substrate. Alternatively, a transistor in which a channel is formed in an oxide semiconductor film can be used for all the transistors in the memory element 1200. Further alternatively, in the memory element 1200, a transistor in which a channel is formed in an oxide semiconductor film can be included besides the transistor 1209, and a transistor in which a channel is formed in a layer formed using a semiconductor other than an oxide semiconductor or the substrate 1190 can be used for the rest of the transistors.

As the circuit 1201 in FIG. 23, for example, a flip-flop circuit can be used. As the logic element 1206, for example, an inverter or a clocked inverter can be used.

In a period during which the memory element 1200 is not supplied with the power supply voltage, the semiconductor device described in this embodiment can retain data stored in the circuit 1201 by the capacitor 1208 that is provided in the circuit 1202.

The off-state current of a transistor in which a channel is formed in an oxide semiconductor film is extremely small. For example, the off-state current of a transistor in which a channel is formed in an oxide semiconductor film is significantly smaller than that of a transistor in which a channel is formed in silicon having crystallinity. Thus, when the transistor in which a channel is formed in an oxide semiconductor film is used as the transistor 1209, a signal is retained in the capacitor 1208 for a long time also in a period during which the power supply voltage is not supplied to the memory element 1200. The memory element 1200 can accordingly retain the stored content (data) also in a period during which the supply of the power supply voltage is stopped.

Since the memory element performs pre-charge operation with the switch 1203 and the switch 1204, the time required for the circuit 1201 to retain original data again after the supply of the power supply voltage is restarted can be shortened.

In the circuit 1202, a signal retained by the capacitor 1208 is input to the gate of the transistor 1210. Thus, after supply of the power supply voltage to the memory element 1200 is restarted, the state (the on state or the off state) of the transistor 1210 is determined in accordance with the signal retained by the capacitor 1208 and can be read from the circuit 1202. Consequently, an original signal can be accurately read even when a potential corresponding to the signal retained by the capacitor 1208 changes to some degree.

By using the above-described memory element 1200 in a memory device such as a register or a cache memory included in a processor, data in the memory device can be prevented from being lost owing to the stop of the supply of the power supply voltage. Furthermore, shortly after the supply of the power supply voltage is restarted, the memory device can be returned to the same state as that before the power supply is stopped. Thus, the power supply can be stopped even for a short time in the processor or one or a plurality of logic circuits included in the processor, resulting in lower power consumption.

Although the memory element 1200 is used in a CPU in this embodiment, the memory element 1200 can also be used in an LSI such as a digital signal processor (DSP), a custom LSI, or a programmable logic device (PLD), and a radio frequency identification (RF-ID) tag.

At least part of this embodiment can be implemented in combination with any of the other embodiments described in this specification as appropriate.

Embodiment 8

In this embodiment, a display module and electronic devices that include a display panel of one embodiment of the present invention are described with reference to FIGS. 24A to 24H.

FIGS. 24A to 24G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 24A:
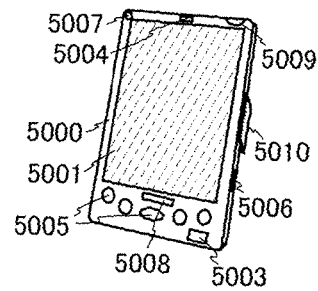
FIGS. 24A to 24H each illustrate a structure of an electronic device of an embodiment.
Figure 24B:
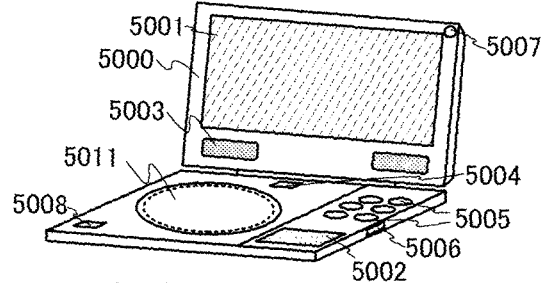
Figure 24C:
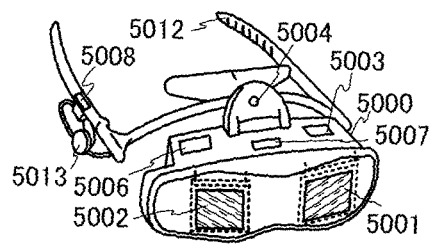
Figure 24D:
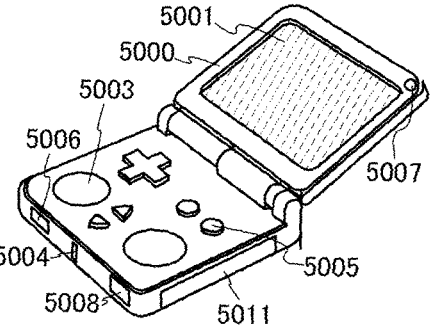
Figure 24E:
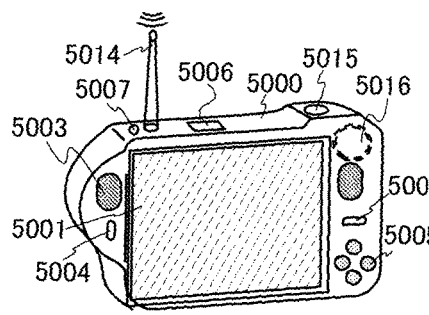
Figure 24F:
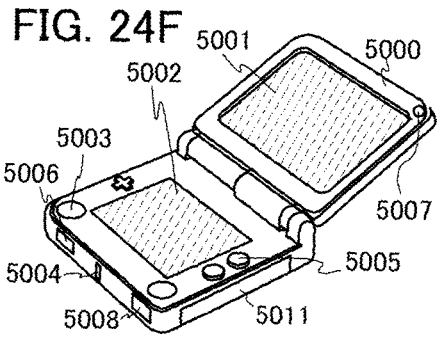
Figure 24G:
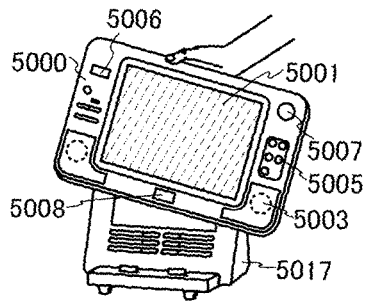

FIG. 24A illustrates a mobile computer that can include a switch 5009, an infrared port 5010, and the like in addition to the above components. FIG. 24B illustrates a portable image reproducing device (e.g., a DVD reproducing device) provided with a recording medium, and the portable image reproducing device can include a second display portion 5002, a recording medium reading portion 5011, and the like in addition to the above components. FIG. 24C illustrates a goggle-type display that can include the second display portion 5002, a support portion 5012, an earphone 5013, and the like in addition to the above components. FIG. 24D illustrates a portable game console that can include the recording medium reading portion 5011 and the like in addition to the above components. FIG. 24E illustrates a digital camera with a television reception function, and the digital camera can include an antenna 5014, a shutter button 5015, an image receiving portion 5016, and the like in addition to the above components. FIG. 24F illustrates a portable game console that can include the second display portion 5002, the recording medium reading portion 5011, and the like in addition to the above components. FIG. 24G illustrates a portable television receiver that can include a charger 5017 capable of transmitting and receiving signals, and the like in addition to the above components.

The electronic devices in FIGS. 24A to 24G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 24A to 24G are not limited thereto, and the electronic devices can have a variety of functions.

Figure 24H:

FIG. 24H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 24H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path." Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

REFERENCE NUMERALS

ANO: wiring, BR(g, h): conductive film, CSCOM: wiring, C(g): first electrode, M(h): second electrode, CL(g): control line, ML(h): signal line, DC: detection circuit, OSC: oscillator circuit, CP: conductive material, ACF1: conductive material, ACF2: conductive material, AF1: alignment film, AF2: alignment film, FPC1: flexible printed circuit, FPC2: flexible printed circuit, C1: capacitor, C1B: capacitor, C1G: capacitor, C1R: capacitor, C2B: capacitor, C2G: capacitor, C2R: capacitor, C2W: capacitor, CF2B: coloring film, CF2G: coloring film, CF2R: coloring film, G1: scan line, G2: scan line, GD: driver circuit, GDA: driver circuit, GDB: driver circuit, KB1: structure body, M1: node, M2: node, MB: transistor, MG: transistor, MR: transistor, MW: transistor, MD: transistor, MB2: transistor, MD2: transistor, P1: positional data, P2: sensing data, S1: signal line, S2: signal line, S3: signal line, S4: signal line, S5: signal line, SD: driver circuit, S131: driver circuit, SD2: driver circuit, SW1: switch, SW1B: switch, SW1B2: switch, SW1G: switch, SW1R: switch, SW2B: switch, SW2G: switch, SW2R: switch, SW2W: switch, V1: image data, V11: data, V12: data, SS: control data, VBG: background data, VCOM1: wiring, VCOM2: wiring, 100: transistor, 102: substrate, 104: conductive film, 106: insulating film, 107: insulating film, 108: oxide semiconductor film, 108a: oxide semiconductor film, 108b: oxide semiconductor film, 108c: oxide semiconductor film, 112a: conductive film, 112b: conductive film, 114: insulating film, 116: insulating film, 118: insulating film, 120a: conductive film, 120b: conductive film, 200: data processing device, 210: arithmetic device, 211: arithmetic portion, 212: memory portion, 214: transmission path, 215: input/output interface, 220: input/output device, 230: display portion, 230B: display portion, 231: display region, 239: selection circuit, 240: input portion, 250: sensor portion, 290: communication portion, 501A: insulating film, 501C: insulating film, 504: conductive film, 505: bonding layer, 506: insulating film, 508: semiconductor film, 508A: region, 508B: region, 508C: region, 511B: conductive film, 511C: conductive film, 511D: conductive film, 512A: conductive film, 512B: conductive film, 516: insulating film, 518: insulating film, 519B: terminal, 519C: terminal, 519D: terminal, 520: functional layer, 521: insulating film, 522: connection portion, 524: conductive film, 528: insulating film, 530(i, j): pixel circuit, 530(i, j)2: pixel circuit, 530(i, j)3: pixel circuit, 530(i, j)4: pixel circuit, 550: display element, 551(i, j)B: electrode, 551(i, j)G: electrode, 551(i, j)R: electrode, 552: electrode, 553(j)B: layer containing a light-emitting material, 553(j)G: layer containing a light-emitting material, 553(j)R: layer containing a light-emitting material, 570: substrate, 591A: opening, 591B: opening, 591C: opening, 592A: opening, 592B: opening, 592C: opening, 700: display panel, 700TP1: input/output device, 700TP2: input/output device, 702: pixel, 705: sealing material, 706: insulating film, 709: bonding layer, 710: substrate, 719: terminal, 720: functional layer, 750: display element, 751(i, j): first electrode, 751HB: opening, 751HG: opening, 751HR: opening, 751HB2: region, 751HG2: region, 751HR2: region, 752: second electrode, 753: layer containing a liquid crystal material, 754A: intermediate film, 754B: intermediate film, 754C: intermediate film, 754D: intermediate film, 770: substrate, 770D: functional film, 770P: functional film, 771: insulating film, 775: sensing element, 1189: ROM interface, 1190: substrate, 1191: ALU, 1192: ALU controller, 1193: instruction decoder, 1194: interrupt controller, 1195: timing controller, 1196: register, 1197: register controller, 1198: bus interface, 1199: ROM, 1200: memory element, 1201: circuit, 1202: circuit, 1203: switch, 1204: switch, 1206: logic element, 1207: capacitor, 1208: capacitor, 1209: transistor, 1210: transistor, 1213: transistor, 1214: transistor, 1220: circuit, 3001: wiring, 3002: wiring, 3003: wiring, 3004: wiring, 3005: wiring, 3200: transistor, 3300: transistor, 3400: capacitor, 5000: housing, 5001: display portion, 5002: display portion, 5003: speaker, 5004: LED lamp, 5005: operation keys, 5006: connection terminal, 5007: sensor, 5008: microphone, 5009: switch, 5010: infrared port, 5011: recording medium reading portion, 5012: support portion, 5013: earphone, 5014: antenna, 5015: shutter button, 5016: image receiving portion, 5017: charger, 7302: housing, 7304: display panel, 7305: icon, 7306: icon, 7311: operation button, 7312: operation button, 7313: connection terminal, 7321: band, 7322: clasp.

This application is based on Japanese Patent Application serial no. 2015-208559 filed with Japan Patent Office on Oct. 23, 2015, the entire contents of which are hereby incorporated by reference.

The invention claimed is:
1. A display panel comprising:
a signal line; and
a pixel electrically connected to the signal line,
wherein the pixel comprises:
a first conductive film;
a second conductive film;
an insulating film;
a first display element electrically connected to a first transistor;
a second display element electrically connected to a second transistor; and
a third display element electrically connected to a third transistor,
wherein the first conductive film is reflective and used as a first electrode of the first display element,
wherein the first electrode of the first display element has a region overlapping with the second conductive film with a region of the insulating film positioned therebetween,
wherein the second conductive film is electrically connected to the first electrode of the first display element through an opening provided in the region of the insulating film, wherein the second conductive film is used as one of a source electrode and a drain electrode of the first transistor, wherein the first electrode of the first display element is provided over the second display element and the third display element, and wherein the first electrode of the first display element has a shape comprising a region that does not block light emitted from the second display element or light emitted from the third display element.

2. The display panel according to claim 1, wherein the first electrode of the first display element comprises a single opening or a plurality of openings, wherein the second display element is configured to emit light toward the single opening or the plurality of openings, and wherein the third display element is configured to emit light toward the single opening or the plurality of openings.

3. The display panel according to claim 1, wherein the second display element is provided so that display using the second display element can be seen from part of a region from which display using the first display element can be seen, and wherein the third display element is provided so that display using the third display element can be seen from part of the region from which display using the first display element can be seen.

4. The display panel according to claim 1, wherein the third display element is configured to display a color different from a color displayed by the second display element.

5. The display panel according to claim 4, wherein the pixel further comprises a fourth display element, wherein the fourth display element is electrically connected to a fourth transistor, wherein the fourth display element is provided under the first electrode of the first display element, wherein the fourth display element is configured to display a color different from the color displayed by the second display element, wherein the fourth display element is configured to display a color different from the color displayed by the third display element, wherein the second display element is configured to display blue, green, or red, wherein the third display element is configured to display blue, green, or red, and wherein the fourth display element is configured to display blue, green, or red.

6. The display panel according to claim 4, wherein the first electrode of the first display element comprises a first opening and a second opening, wherein the first opening transmits light emitted from the second display element, wherein the second opening transmits light emitted from the third display element, and wherein the second opening is provided neither on a line that extends in a row direction through the first opening nor on a line that extends in a column direction through the first opening.

7. The display panel according to claim 5, wherein the first electrode of the first display element comprises a first opening, a second opening, and a third opening, wherein the first opening transmits light emitted from the second display element, wherein the second opening transmits light emitted from the third display element, wherein the third opening transmits light emitted from the fourth display element, wherein the third opening is provided on a first line that extends in a row direction or a column direction through the first opening, and wherein the second opening is provided on a second line that is perpendicular to the first line and intersects the first line at a point between the first opening and the third opening.

8. The display panel according to claim 1, comprising:

a first group of pixels provided in a row direction;

a second group of pixels provided in a column direction that intersects the row direction; and a scan line, wherein the first group of pixels comprise the pixel, wherein the second group of pixels comprise the pixel, wherein the first group of pixels are electrically connected to the scan line, and wherein the second group of pixels are electrically connected to the signal line.

9. An input/output device comprising:

the display panel according to claim 1; and an input portion comprising a region overlapping with the display panel, wherein the input portion is configured to detect an object that comes in the vicinity of the region overlapping with the display panel, wherein the input portion comprises a control line extending in a row direction, a signal line extending in a column direction that intersects the row direction, and a sensing element having a light-transmitting property, wherein the sensing element comprises a first electrode electrically connected to the control line and a second electrode electrically connected to the signal line extending in the column direction, and wherein the second electrode is provided so that an electric field part of which is blocked by an object that comes in the vicinity of the region overlapping with the display panel is generated between the second electrode and the first electrode of the sensing element.

10. A data processing device comprising:

one or more of a keyboard, a hardware button, a pointing device, a touch sensor, an illuminance sensor, an imaging device, an audio input device, a viewpoint input device, and an attitude determination device; and the display panel according to claim 1.

11. The display panel according to claim 1, wherein the first display element is a liquid crystal display element, wherein the second display element is a first organic EL element, and wherein the third display element is a second organic EL element.

12. The display panel according to claim 1, wherein a gate insulating film of the first transistor and a gate insulating film of the second transistor are the same layer.

13. The display panel according to claim 1, wherein a gate of the first transistor and a gate of the second transistor are in contact with the insulating film.

14. The display panel according to claim 1, wherein the first, second, and third transistors each comprise an oxide semiconductor layer.

15. A display panel comprising:
a signal line; and
a pixel electrically connected to the signal line,
wherein the pixel comprises:
a first conductive film;
a second conductive film;
an insulating film;
a first display element electrically connected to a first transistor;
a second display element electrically connected to a second transistor; and
a third display element electrically connected to a third transistor,
wherein the first conductive film is reflective and used as a first electrode of the first display element,
wherein the first electrode of the first display element has a region overlapping with the second conductive film with a region of the insulating film positioned therebetween,
wherein the second conductive film is electrically connected to the first electrode of the first display element through an opening provided in the region of the insulating film,
wherein the second conductive film is used as one of a source electrode and a drain electrode of the first transistor,
wherein the first electrode of the first display element is provided over the second display element and the third display element,
wherein the first electrode of the first display element comprises a first opening and a second opening,
wherein the first opening transmits light emitted from the second display element, and
wherein the second opening transmits light emitted from the third display element.

16. The display panel according to claim 15,
wherein the second display element is provided so that display using the second display element can be seen from part of a region from which display using the first display element can be seen, and
wherein the third display element is provided so that display using the third display element can be seen from part of the region from which display using the first display element can be seen.

17. The display panel according to claim 15,
wherein the third display element is configured to display a color different from a color displayed by the second display element.

18. The display panel according to claim 17,
wherein the pixel further comprises a fourth display element,
wherein the fourth display element is electrically connected to a fourth transistor,
wherein the fourth display element is provided under the first electrode of the first display element,
wherein the fourth display element is configured to display a color different from the color displayed by the second display element,
wherein the fourth display element is configured to display a color different from the color displayed by the third display element,
wherein the second display element is configured to display blue, green, or red,
wherein the third display element is configured to display blue, green, or red, and
wherein the fourth display element is configured to display blue, green, or red.

19. The display panel according to claim 18,
wherein the first electrode of the first display element further comprises a third opening,
wherein the third opening transmits light emitted from the fourth display element,
wherein the third opening is provided on a first line that extends in a row direction or a column direction through the first opening, and
wherein the second opening is provided on a second line that is perpendicular to the first line and intersects the first line at a point between the first opening and the third opening.

20. The display panel according to claim 15, comprising:
a first group of pixels provided in a row direction;
a second group of pixels provided in a column direction that intersects the row direction; and
a scan line,
wherein the first group of pixels comprise the pixel,
wherein the second group of pixels comprise the pixel,
wherein the first group of pixels are electrically connected to the scan line, and
wherein the second group of pixels are electrically connected to the signal line.

21. An input/output device comprising:
the display panel according to claim 15; and
an input portion comprising a region overlapping with the display panel,
wherein the input portion is configured to detect an object that comes in the vicinity of the region overlapping with the display panel,
wherein the input portion comprises a control line extending in a row direction, a signal line extending in a column direction that intersects the row direction, and a sensing element having a light-transmitting property,
wherein the sensing element comprises a first electrode electrically connected to the control line and a second electrode electrically connected to the signal line extending in the column direction, and
wherein the second electrode is provided so that an electric field part of which is blocked by an object that comes in the vicinity of the region overlapping with the display panel is generated between the second electrode and the first electrode of the sensing element.

22. A data processing device comprising:
one or more of a keyboard, a hardware button, a pointing device, a touch sensor, an illuminance sensor, an imaging device, an audio input device, a viewpoint input device, and an attitude determination device; and
the display panel according to claim 15.

23. The display panel according to claim 15,
wherein the first display element is a liquid crystal display element,
wherein the second display element is a first organic EL element, and
wherein the third display element is a second organic EL element.

24. The display panel according to claim 15,
wherein a gate insulating film of the first transistor and a gate insulating film of the second transistor are the same layer.

25. The display panel according to claim 15,
wherein a gate of the first transistor and a gate of the second transistor are in contact with the insulating film.

26. The display panel according to claim 15, wherein the first, second, and third transistors each comprise an oxide semiconductor layer.

\* \* \* \* \*